US011537593B2

(12) United States Patent
Baird, III et al.

(10) Patent No.: US 11,537,593 B2
(45) Date of Patent: Dec. 27, 2022

(54) METHODS AND APPARATUS FOR EFFICIENTLY IMPLEMENTING A FAST-COPYABLE DATABASE

(71) Applicant: Hedera Hashgraph, LLC, Richardson, TX (US)

(72) Inventors: Leemon C. Baird, III, Richardson, TX (US); Mance Harmon, College Station, TX (US)

(73) Assignee: Hedera Hashgraph, LLC, Richardson, TX (US)

( * ) Notice: Subject to any disclaimer, the term of this patent is extended or adjusted under 35 U.S.C. 154(b) by 31 days.

(21) Appl. No.: 16/686,796

(22) Filed: Nov. 18, 2019

(65) Prior Publication Data
US 2020/0097459 A1    Mar. 26, 2020

Related U.S. Application Data

(62) Division of application No. 16/176,125, filed on Oct. 31, 2018, now Pat. No. 10,489,385.
(Continued)

(51) Int. Cl.
*G06F 16/23* (2019.01)
*G06F 16/18* (2019.01)
(Continued)

(52) U.S. Cl.
CPC ...... *G06F 16/2365* (2019.01); *G06F 16/1873* (2019.01); *G06F 16/2471* (2019.01); *G06F 16/90335* (2019.01); *H04L 9/30* (2013.01)

(58) Field of Classification Search
CPC ............. G06F 16/2365; G06F 16/2471; G06F 16/1873; G06F 16/90335; H04L 9/30
See application file for complete search history.

(56) References Cited

U.S. PATENT DOCUMENTS

| 4,309,569 A | 1/1982 | Merkle |
| 5,701,480 A | 12/1997 | Raz |

(Continued)

FOREIGN PATENT DOCUMENTS

| CA | 2845306 A1 | 2/2013 |
| CN | 102567453 A | 7/2012 |

(Continued)

OTHER PUBLICATIONS

Extended European Search Report issued by the European Patent Office for Application No. 18874680.4, dated Dec. 23, 2020, 9 pages.
(Continued)

*Primary Examiner* — Huawen A Peng
(74) *Attorney, Agent, or Firm* — Cooley LLP

(57) ABSTRACT

A fast-copyable database apparatus includes a processor and a memory in electronic communication with the processor. The memory stores a database table with multiple records each having a compound key including a version identifier. The memory also stores instructions executable to cause the processor to generate a first virtual clone of the database table and a second virtual clone of the database table, receive a query at the first virtual clone, and modify the query so that it includes a version identifier of the first virtual clone. The processor can query the database table using the modified query to generate a response based in part on each record from the set of records having a version identifier associated with an ancestral path of the version identifier of the first virtual clone, and send the response. Each compound key includes a version identifier and a data portion.

21 Claims, 21 Drawing Sheets

Related U.S. Application Data

(60) Provisional application No. 62/580,056, filed on Nov. 1, 2017.

(51) Int. Cl.
*G06F 16/903* (2019.01)
*H04L 9/30* (2006.01)
*G06F 16/2458* (2019.01)

(56) References Cited

U.S. PATENT DOCUMENTS

| | | | |
|---|---|---|---|
| 5,991,414 | A | 11/1999 | Garay et al. |
| 6,446,092 | B1 | 9/2002 | Sutter |
| 6,457,007 | B1 | 9/2002 | Kikuchi et al. |
| 6,584,476 | B1 | 6/2003 | Chatterjee et al. |
| 6,594,328 | B1 | 7/2003 | Chen et al. |
| 6,966,836 | B1 | 11/2005 | Rush et al. |
| 7,062,490 | B2 | 6/2006 | Adya et al. |
| 7,240,060 | B2 | 7/2007 | Adya et al. |
| 7,555,516 | B2 | 6/2009 | Lamport |
| 7,558,883 | B1 | 7/2009 | Lamport |
| 7,590,632 | B1 | 9/2009 | Caronni et al. |
| 7,797,457 | B2 | 9/2010 | Lamport |
| 7,844,745 | B1 | 11/2010 | Darbyshire et al. |
| 7,849,223 | B2 | 12/2010 | Malkhi et al. |
| 7,890,508 | B2 | 2/2011 | Gerber et al. |
| 8,037,279 | B2 * | 10/2011 | Schuba ................ G06F 12/109 711/147 |
| 8,112,452 | B2 | 2/2012 | Adya et al. |
| 8,285,689 | B2 | 10/2012 | Du et al. |
| 8,423,678 | B2 | 4/2013 | Darbyshire et al. |
| 8,478,114 | B1 | 7/2013 | Beach et al. |
| 8,533,169 | B1 | 9/2013 | Bailey et al. |
| 8,533,582 | B2 | 9/2013 | Rao et al. |
| 8,571,519 | B2 | 10/2013 | Ginzboorg |
| 8,600,944 | B2 | 12/2013 | Bryant et al. |
| 8,612,386 | B2 | 12/2013 | Tien et al. |
| 8,654,650 | B1 | 2/2014 | Vermeulen et al. |
| 8,713,038 | B2 | 4/2014 | Cohen et al. |
| 8,732,140 | B2 | 5/2014 | Bird et al. |
| 8,766,980 | B2 | 7/2014 | Miyashita et al. |
| 8,775,464 | B2 | 7/2014 | Bulkowski et al. |
| 8,799,248 | B2 | 8/2014 | Bulkowski et al. |
| 8,862,617 | B2 | 10/2014 | Kesselman |
| 8,868,467 | B2 | 10/2014 | Serebrennikov |
| 8,880,486 | B2 | 11/2014 | Driesen et al. |
| 8,886,601 | B1 | 11/2014 | Landau et al. |
| 8,914,333 | B2 | 12/2014 | Bird et al. |
| 9,189,342 | B1 | 11/2015 | Von Thenen et al. |
| 9,244,717 | B2 | 1/2016 | Pissay et al. |
| 9,251,235 | B1 | 2/2016 | Hurst et al. |
| 9,280,591 | B1 | 3/2016 | Kharatishvili et al. |
| 9,390,154 | B1 | 7/2016 | Baird, III |
| 9,407,516 | B2 | 8/2016 | Gordon |
| 9,529,923 | B1 | 12/2016 | Baird, III |
| 9,568,943 | B1 | 2/2017 | Carman |
| 9,646,029 | B1 | 5/2017 | Baird, III |
| 9,842,031 | B1 | 12/2017 | Kharatishvili |
| 10,097,356 | B2 | 10/2018 | Zinder |
| 10,318,505 | B2 | 6/2019 | Baird, III |
| 10,354,325 | B1 | 7/2019 | Skala et al. |
| 10,375,037 | B2 | 8/2019 | Baird, III et al. |
| 10,489,385 | B2 | 11/2019 | Baird, III et al. |
| 10,572,455 | B2 | 2/2020 | Baird, III |
| 10,747,753 | B2 | 8/2020 | Baird, III |
| 10,887,096 | B2 | 1/2021 | Baird, III |
| 11,222,006 | B2 | 1/2022 | Baird, III |
| 11,232,081 | B2 | 1/2022 | Baird, III |
| 11,256,832 | B2 | 2/2022 | Rorato et al. |
| 2001/0025351 | A1 | 9/2001 | Kursawe et al. |
| 2002/0129087 | A1 | 9/2002 | Cachin et al. |
| 2002/0143800 | A1 * | 10/2002 | Lindberg ............. G06F 16/972 |
| 2002/0186848 | A1 | 12/2002 | Shaik |
| 2003/0147536 | A1 | 8/2003 | Andivahis et al. |
| 2004/0012630 | A1 | 1/2004 | Carels et al. |
| 2004/0172421 | A1 | 9/2004 | Saito et al. |
| 2005/0038831 | A1 | 2/2005 | Souder et al. |
| 2005/0102268 | A1 | 5/2005 | Adya et al. |
| 2005/0114666 | A1 | 5/2005 | Sudia |
| 2006/0047720 | A1 | 3/2006 | Xiao et al. |
| 2006/0136369 | A1 | 6/2006 | Douceur et al. |
| 2006/0168011 | A1 | 7/2006 | Lamport |
| 2007/0050415 | A1 | 3/2007 | Amangau et al. |
| 2007/0165865 | A1 | 7/2007 | Talvitie |
| 2008/0220873 | A1 | 9/2008 | Lee et al. |
| 2008/0256078 | A1 | 10/2008 | Bhashyam |
| 2008/0298579 | A1 | 12/2008 | Abu-Amara |
| 2009/0150566 | A1 | 6/2009 | Malkhi et al. |
| 2009/0158413 | A1 | 6/2009 | Gentry et al. |
| 2009/0248624 | A1 | 10/2009 | Lammel et al. |
| 2010/0172504 | A1 | 7/2010 | Allen et al. |
| 2010/0198914 | A1 | 8/2010 | Gehrke et al. |
| 2010/0257198 | A1 | 10/2010 | Cohen et al. |
| 2011/0029689 | A1 | 2/2011 | Darbyshire et al. |
| 2011/0173455 | A1 | 7/2011 | Spalka et al. |
| 2011/0191251 | A1 | 8/2011 | Al-Herz et al. |
| 2011/0196834 | A1 | 8/2011 | Kesselman |
| 2011/0196873 | A1 | 8/2011 | Kesselman |
| 2011/0250974 | A1 | 10/2011 | Shuster |
| 2012/0078847 | A1 | 3/2012 | Bryant et al. |
| 2012/0131093 | A1 | 5/2012 | Hamano et al. |
| 2012/0150802 | A1 | 6/2012 | Popov et al. |
| 2012/0150844 | A1 | 6/2012 | Lindahl et al. |
| 2012/0198450 | A1 | 8/2012 | Yang et al. |
| 2012/0209822 | A1 | 8/2012 | Prabhakar et al. |
| 2012/0233134 | A1 | 9/2012 | Barton et al. |
| 2012/0278293 | A1 | 11/2012 | Bulkowski et al. |
| 2012/0303631 | A1 | 11/2012 | Bird et al. |
| 2013/0110767 | A1 | 5/2013 | Tatemura et al. |
| 2013/0145426 | A1 | 6/2013 | Wright et al. |
| 2013/0263119 | A1 | 10/2013 | Xiao et al. |
| 2013/0290249 | A1 | 10/2013 | Merriman et al. |
| 2013/0311422 | A1* | 11/2013 | Walker ................. G06F 16/219 707/609 |
| 2014/0012812 | A1 | 1/2014 | Zunger |
| 2014/0025443 | A1* | 1/2014 | Onischuk ............... G07C 13/00 705/12 |
| 2014/0108415 | A1 | 4/2014 | Bulkowski et al. |
| 2014/0222829 | A1 | 8/2014 | Bird et al. |
| 2014/0310243 | A1 | 10/2014 | McGee et al. |
| 2014/0324905 | A1 | 10/2014 | Matsumoto |
| 2015/0067002 | A1 | 3/2015 | Shvachko et al. |
| 2015/0067819 | A1 | 3/2015 | Shribman et al. |
| 2015/0074050 | A1 | 3/2015 | Landau et al. |
| 2015/0172412 | A1 | 6/2015 | Escriva et al. |
| 2015/0200774 | A1 | 7/2015 | Le Saint |
| 2015/0242478 | A1 | 8/2015 | Cantwell et al. |
| 2015/0281344 | A1 | 10/2015 | Grootwassink et al. |
| 2015/0294308 | A1 | 10/2015 | Pauker et al. |
| 2016/0085772 | A1 | 3/2016 | Vermeulen et al. |
| 2016/0088424 | A1 | 3/2016 | Polo et al. |
| 2016/0091988 | A1 | 3/2016 | Letourneau |
| 2016/0140548 | A1 | 5/2016 | Ahn |
| 2016/0205218 | A1 | 7/2016 | Tan et al. |
| 2016/0218875 | A1 | 7/2016 | Le Saint et al. |
| 2016/0241392 | A1 | 8/2016 | Vandervort |
| 2016/0283920 | A1 | 9/2016 | Fisher et al. |
| 2016/0292213 | A1 | 10/2016 | Stanfill |
| 2016/0342976 | A1 | 11/2016 | Davis |
| 2017/0006097 | A1 | 1/2017 | Johnson |
| 2017/0048261 | A1 | 2/2017 | Gmach et al. |
| 2017/0075938 | A1 | 3/2017 | Black et al. |
| 2017/0116095 | A1 | 4/2017 | Schatz et al. |
| 2017/0132257 | A1 | 5/2017 | Baird, III |
| 2017/0180367 | A1 | 6/2017 | Warren |
| 2017/0300550 | A1 | 10/2017 | Emberson et al. |
| 2017/0308548 | A1 | 10/2017 | Baird, III |
| 2018/0005186 | A1 | 1/2018 | Hunn |
| 2018/0006820 | A1 | 1/2018 | Arasu et al. |
| 2018/0018370 | A1 | 1/2018 | Feiks et al. |
| 2018/0026782 | A1 | 1/2018 | Xiao et al. |
| 2018/0101777 | A1* | 4/2018 | Benja-Athon ......... G06N 3/004 |
| 2018/0173747 | A1 | 6/2018 | Baird, III |
| 2019/0020629 | A1 | 1/2019 | Baird, III et al. |

(56) References Cited

U.S. PATENT DOCUMENTS

| | | | |
|---|---|---|---|
| 2019/0034517 | A1 | 1/2019 | Byrd |
| 2019/0042619 | A1 | 2/2019 | Baird, III |
| 2019/0129893 | A1 | 5/2019 | Baird, III et al. |
| 2019/0235946 | A1 | 8/2019 | Guo et al. |
| 2019/0268147 | A1 | 8/2019 | Baird, III |
| 2019/0286623 | A1 | 9/2019 | Baird, III |
| 2020/0012676 | A1 | 1/2020 | Singh Narang et al. |
| 2020/0073758 | A1 | 3/2020 | Natarajan et al. |
| 2020/0097459 | A1 | 3/2020 | Baird, III et al. |
| 2020/0125538 | A1 | 4/2020 | Baird, III et al. |
| 2020/0145387 | A1 | 5/2020 | Baird, III et al. |
| 2020/0320064 | A1 | 10/2020 | Baird, III |
| 2020/0372015 | A1 | 11/2020 | Baird, III |
| 2021/0126780 | A1 | 4/2021 | Baird, III |
| 2021/0209885 | A1 | 7/2021 | Lundin et al. |
| 2022/0107960 | A1 | 4/2022 | Baird et al. |
| 2022/0129438 | A1 | 4/2022 | Baird et al. |
| 2022/0027312 | A1 | 7/2022 | Baird et al. |

FOREIGN PATENT DOCUMENTS

| | | |
|---|---|---|
| CN | 102819585 A | 12/2012 |
| CN | 106789095 A | 5/2017 |
| JP | H09-509268 A | 9/1997 |
| JP | 2003-202964 | 7/2003 |
| JP | 2005216167 A | 8/2005 |
| JP | 2010033227 A | 2/2010 |
| JP | 2010-225148 A | 10/2010 |
| JP | 2012-27685 A | 2/2012 |
| JP | 5211342 B | 6/2013 |
| JP | 2014506345 A | 3/2014 |
| JP | 2016096547 A | 5/2016 |
| JP | 2016519379 A | 6/2016 |
| JP | 2017510002 A | 4/2017 |
| KR | 20100014941 A | 2/2010 |
| RU | 2376635 C2 | 12/2009 |
| RU | 2417426 C2 | 4/2011 |
| RU | 2449358 C1 | 4/2012 |
| RU | 2510623 | 4/2014 |
| RU | 2560810 C2 | 8/2015 |
| RU | 2595493 C2 | 8/2016 |
| WO | WO 95/14279 A1 | 5/1995 |
| WO | WO 2014/037901 | 3/2014 |
| WO | WO 2015/008377 A1 | 1/2015 |
| WO | WO-2015094329 A1 | 6/2015 |
| WO | WO 2017/040313 A1 | 3/2017 |
| WO | WO-2017176523 A1 | 10/2017 |

OTHER PUBLICATIONS

Office Action issued by the Korean Patent Office for Application No. 10-2020-7014386, dated Jun. 2, 2020, 4 pages including English translation.
Office Action issued by the Chinese Patent Office for Application No. 201910908046.6, dated Jun. 2, 2020,19 pages including English translation.
Advisory Action issued by The United States Patent and Trademark Office for U.S. Appl. No. 16/405,069, dated Jul. 16, 2020, 10 pages.
Bitcoin—"you-need-to-know" archived Sep. 5, 2015 and retrieved from https://web.archive.org/web/20150905115130/https:// bitcoin.org/en/you-need-to-know on Jul. 13, 2020, 2 pages.
International Search Report and Written Opinion issued by the International Searching Authority for Application No. PCT/US20/34197, dated Jul. 13, 2020, 13 pages.
Office Action issued by the Australian Patent Office for Application No. 2018300147, dated Jan. 15, 2020 2 pages.
International Preliminary Report on Patentability issued by the International Searching Authority for Application No. PCT/US18/41625, dated Jan. 14, 2020, 7 pages.
Examination Report No. 1 issued by the Australian Patent Office for Application No. 2020200149, dated Jan. 29, 2020, 2 pages.
Final Office Action issued by The United States Patent and Trademark Office for U.S. Appl. No. 16/405,069, dated Mar. 6, 2020, 16 pages.
Office Action issued by the Korean Patent Office for Application No. KR10-2020-7003982, dated Feb. 24, 2020, 3 pages, Non-English.
Office Action, Ex Parte Quayle, issued by The United States Patent and Trademark Office for U.S. Appl. No. 15/906,668, dated Apr. 22, 2020, 7 pages.
International Preliminary Report on Patentability issued by the International Searching Authority for Application No. PCT/US2018/058432, dated May 5, 2020, 7 pages.
Extended European Search Report issued by the European Patent Office for Application No. 17883223.4, dated May 15, 2020, 14 pages.
Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].
Wikipedia webpage for Merkle Tree, Retrieved from the Internet: https://en.wikipedia.org/wiki/Merkle_tree, dated May 17, 2020, 5 pages.
Extended European Search Report issued by the European Patent Office for Application No. 17870565.3, dated May 25, 2020, 8 pages.
Office Action issued by the Russian Patent Office for Application No. 2020100003, dated May 29, 2020, 10 pages including English translation.
https://web.archive.org/web/20150811233709/https://en.wikipedia.org/wiki/Paxos_(computer_science). Jun. 17, 2015, 15 pages.
Knutsson et al., *"Peer-to-Peer Support for Massively Multiplayer Games"*, Department of Computer and Information Science, University of Pennsylvania, IEEE INFOCOM 2004.
GauthierDickey, Chris, et al. "Low latency and cheat-proof event ordering for peer-to-peer games." Proceedings of the $14^{th}$ international workshop on Network and operating systems support for digital audio and video. ACM, 2004.
GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.
Lumezanu, Cristian, Neil Spring, and Bobby Bhattacharjee. "Decentralized message ordering for publish/subscribe systems." Proceedings of the ACM/IFIP/USENIX 2006 International Conference on Middleware. Springer-Verlag New York, Inc., 2006.
Moser, Louise E., and Peter M. Melliar-Smith, "Byzantine-resistant total ordering algorithms." Information and Computation 150.1 (1999): 75-111.
Défago, Xavier, et al., "Total Order broadcast and multicast algorithms: Taxonomy and survey." ACM Computing Surveys (CSUR) 36.4 (2004): 372-421.
U.S. Office Action dated Sep. 20, 2016 for U.S. Appl. No. 15/153,011, 18 pages.
Moser, Louise E., and Peter M. Melliar-Smith, "Total Ordering Algorithms for Asynchronous Byzantine Systems," International Workshop on Distributed Algorithms, 1995.
International Search Report and Written Opinion dated Jan. 5, 2017 for International Application No. PCT/US2016/049067, 16 pages.
U.S. Office Action dated May 30, 2017 for U.S. Appl. No. 15/205,688, 9 pages.
U.S. Office Action dated Oct. 26, 2017 for U.S. Appl. No. 15/205,688, 12 pages.
Lamport, Leslie, Robert Shostak, and Marshall Pease. "The Byzantine generals problem." ACM Transactions on Programming Languages and Systems (TOPLAS) 4(3): 382-401 (1982).
Wikipedia, Copy-on-write, Jul. 31, 2015, accessed Oct. 20, 2017 at https://en.wikipedia.org/w/index.php?title=Copy-on-write&oldid=673938951, 3 pages.
International Search Report and Written Opinion dated Feb. 1, 2018 for International Application No. PCT/US17/61135, 14 pages.
International Search Report and Written Opinion dated Mar. 8, 2018 for International Application No. PT/US1767329, 13 pages.
First Office Action issued by the Australian Patent Office for Patent Application No. 2016316777, dated Mar. 29, 2018, 5 pages.

(56) References Cited

OTHER PUBLICATIONS

Office Action issued by the Canadian Patent Office for Application No. 2,996,714, dated Apr. 11, 2018, 7 pages.
Non-Final Office Action issued by The United States Patent and Trademark Office for U.S. Appl. No. 15/205,688, dated Apr. 13, 2018, 9 pages.
Extended European Search Report issued by the European Patent Office for Application No. 16842700.3, dated May 14, 2018, 15 pages.
Reed, "Bitcoin Cooperative Proof-of-Stake," May 21, 2014 (May 21, 2014, Retrieved from the Internet: URL:https://arxiv.org/ftp/arxiv/papers/1405/1405.5741.pdf [retrieved on May 2, 2018], 16 pages.
Nakamoto: "Bitcoin: A Peer-to-Peer Electronic Cash System," Jan. 13, 2009 (Jan. 13, 2009), Retrieved from the Internet: URL:https://web.archive.org/web/20090131115053/http://www.bitcoin.org/bitcoin.pdf [retrieved on Jun. 30, 2017], 9 pages.
Extended European Search Report issued by the European Patent Office dated Jul. 31, 2018, 12 pages.
Kwon, J., "Tendermint: Consensus without Mining," Mar. 19, 2015, Retrieved from the Internet: URL:https://web.archive.org/web/2015031903 5333if/http://tendermint.com:80/docs/tendermint.pdf [retrieved on Jul. 19, 2018], 11 pages.
Bonneau et al., SoK: Research Perspectives and Challenges for Bitcoin and Cryptocurrencies, International Association for Cryptologic Research vol. 20150323:173252, 18 pages. (2015), DOI: 10.1109/SP.2015.14 [retrieved on Mar. 23, 2015].
Extended European Search Report issued by the European Patent Office for Application No. 18177124.7 , dated Jul. 31, 2018, 14 pages.
Extended European Search Report issued by the European Patent Office for Application No. 18177127.0, dated Jul. 31, 2018, 10 pages.
Extended European Search Report issued by the European Patent Office for Application No. 18177129.6, dated Aug. 31, 2018, 12 pages.
Office Action issued by the Korean Patent Office for Application No. 10-2018-7008784, dated Aug. 22, 2018, received Sep. 6, 2018, non-English, 4 pages. including English translation summary of OA.
Office Action issued by the Japanese Patent Office for Application No. 2018-521625, dated Sep. 26, 2018, 11 pages. including English translation.
Invitation to Pay Additional Fees issued by the International Searching Authority for Application No. PCT/US18/41625, dated Sep. 18, 2018, 3 pages.
Non-Final Office Action issued by The United States Patent and Trademark Office for U.S. Appl. No. 16/032,652, dated Oct. 12, 2018, 32 pages.
Examination Report No. 2 issued by the Australian Patent Office for Application No. 2016316777, dated Oct. 30, 2018, 5 pages.
Notice of Eligibility for Grant and Supplementary Examination Report issued by the Intellectual Property Office of Singapore for Application No. 11201801311T, dated Nov. 26, 2018, 5 pages.
International Search Report and Written Opinion issued by the International Searching Authority for Application No. PCT/US18/41625, dated Nov. 20, 2018, 18 pages.
Examination Report No. 3 issued by the Australian Patent Office for Application No. 2016316777, dated Dec. 20, 2018, 5 pages.
Alfred V. Aho, John E. Hopcroft, and Jeffrey Ullman. 1983. Data Structures and Algorithms (1st ed.). Addison-Wesley Longman Publishing Co., Inc., Boston, MA, USA, 620 pages.
Notice of Preliminary Rejection issued by the Korean Patent Office for Application 10-2018-7008784, dated Dec. 28, 2018, 4 pages, including English translation.
Office Action issued by the Canadian Patent Office for Application No. 3,027,398, dated Jan. 7, 2019, 7 pages.
Invitation to Pay Additional Fees issued by the International Searching Authority for Application No. PCT/US2018/058432, dated Jan. 16, 2019, 2 pages.

Notice of eligibility for Grant and Supplementary Examination Report issued by the Intellectual Property Office of Singapore for Application No. 10201805466S, dated Jan. 28, 2019, 5 pages.
Notice of Acceptance issued by the Australian Patent Office for Patent Application No. 2016316777, dated Feb. 19, 2019, 3 pages.
Notification of the First Office Action issued by the Chinese Patent Office for Patent Application No. 201680061456.6, dated Feb. 1, 2019, 18 pages. including English translation.
Sompolinsky, Yonatan and Zohar, Aviv, "Secure High-Rate Transaction Processing in Bitcoin," International Conference on Financial Cryptography and Data Security (FC 2015), Springer,2015, 31 pages, cited as 7(16):507-527,<DOI: 10.1007/978-3-662-47854-7_32>.
International Search Report and Written Opinion issued by the International Searching Authority for Application No. PCT/US18/58432, dated Mar. 29, 2019, 11 pages.
Supplementary Examination Report and Notice of Eligibility issued by the Singapore Patent Office for Application No. 10201805458P, dated Apr. 8, 2019, 5 pages.
Office Action issued by the European Patent Office for Application No. 16842700.3, dated Apr. 12, 2019, 10 pages.
Office Action issued by the European Patent Office for Application No. 18177122.1, dated Apr. 12, 2019, 9 pages.
Office Action issued by the Russian Patent Office for Application No. 2018110579, dated Apr. 4, 2019, 14 pages, including English translation.
Non-final Office Action issued by The United States Patent and Trademark Office for U.S. Appl. No. 16/176,125, dated Apr. 26, 2019, 15 pages.
Boneh, "Functional Encryption: A New Vision for Public-Key Cryptography, "Communication of the ACM 55:56-64 (2012).
Office Action issued by the Australian Patent Office for Application No. 2019202138, dated May 15, 2019, 4 pages.
International Preliminary Report on Patentability dated Jun. 25, 2019 for International Application No. PCT/US1767329, 7 pages.
Office Action issued by the European Patent Office for Application No. 18177124.7, dated Jul. 15, 2019, 9 pages.
Office Action issued by the European Patent Office for Application No. 18177127.0, dated Jul. 15, 2019, 7 pages.
Non-Final Office Action issued by The United States Patent and Trademark Office for U.S. Appl. No. 16/405,069, dated Aug. 6, 2019, 13 pages.
Office Action issued by the Canadian Patent Office for Application No. 3,027,398, dated Aug. 12, 2019, 4 pages.
Non-Final Office Action issued by The United States Patent and Trademark Office for U.S. Appl. No. 15/366,584, dated Sep. 12, 2019, 6 pages.
Office Action issued by the Japanese Patent Office for Application No. 2019-081303, dated Oct. 23, 2019, 4 pages, including English translation.
Office Action issued by the European Patent Office for Application No. 16842700.3, dated Nov. 4, 2019, 10 pages.
Office Action issued by the European Patent Office for Application No. 18177122.1, dated Nov. 4, 2019, 9 pages.
Baird, "Hashgraph Consensus: Fair, Fast Byzantine Fault Tolerance," Swirlds Tech Report TR-2016-01, dated May 31, 2016, 24 pages.
Baird et al., "Hedera: A Governing Council & Public Hashgraph Network," Whitepaper, v.1.4, dated Oct. 17, 2018, 76 pages.
Baird, "Hashgraph Concensus: Detailed Examples," Swirlds Tech Report Swirlds-TR-2016-02, dated Dec. 11, 2016, 29 pages.
Non-Final Office Action issued by The United States Patent and Trademark Office for U.S. Appl. No. 15/846,402, dated Aug. 24, 2020, 17 pages.
Office Action issued by the Russian Patent Office for Application No. 2019115233, dated Sep. 24, 2020, 13 pages including English translation.
Office Action issued by the Russian Patent Office for Application No. 2020113415, dated Oct. 5, 2020, 11 pages including English translation.
Examination Report No. 1 issued by the Australian Patent Office for Application No. 2020201827, dated Oct. 13, 2020, 4 pages.

(56) References Cited

OTHER PUBLICATIONS

Office Action issued by the Japanese Patent Office for Application No. 2020-065934, dated Oct. 13, 2020, 5 pages including English translation.

Office Action issued by the Canadian Patent office for Application No. 3,027,398, dated Nov. 12, 2020, 5 pages.

Office Action issued by the Chinese Patent Office for Application No. 201880069335.5, dated Nov. 4, 2011, 11 pages including English translation.

Office Action issued by the Indian Patent Office for Application No. 201817007410, dated Nov. 23, 2020, 8 pages.

Non-Final Office Action issued by The United States Patent and Trademark Office for U.S. Appl. No. 16/430,646, dated Dec. 2, 2020, 10 pages.

Tseng, et al., Exact Byzantine Consensus in Directed Graphs. ArXiv, abs/1208.5075. A1 (2014), 33 pages.

Vaidya et al., "Iterative approximate Byzantine consensus in arbitrary directed graphs," In Proceedings of the 2012 ACM symposium on Principles of distributed computing, pp. 365-374 (2012).

Office Action issued by the Korean Patent Office for Application No. 10-2019-7021248, dated Nov. 18, 2020, 10 pages (including English translation).

Office Action issued by the Russian Patent Office for Application No. 2019118333, dated Oct. 2, 2020, 18 pages including English translation.

Baird et al., "Hedera: A Public Hashgraph Network and Governing Council," WhitePaper V 2.0, Aug. 29, 2019, available from http://tokeninsight.com/api/upload/content/whitepaper/HBAR_en.pdf(Year: 2019), 97 pages.

Office Action for Japanese Application No. 2020-191399, dated Aug. 31, 2021, 6 pages including English translation.

Office Action issued by the Australian Patent Office for Application No. 2020204053, dated May 13, 2021, 4 pages.

Office Action issued by the Canadian Patent Office for Application No. 3,076,257, dated Apr. 29, 2021, 4 pages.

Office Action issued by the Indian Patent Office for Application No. 202017012940, dated Jul. 9, 2021, 6 pages.

Tang et al., "Improved Hybrid Consensus Scheme with Privacy-Preserving Property," IACR, International Association for Cryptologic Research 2010407:004100, pp. 1-8 (2017).

Kshemkalyani et al., "Consensus and agreement algorithms," Distributed computing: principles, algorithms, and systems. Cambridge University Press, pp. 510-531 (2011).

Office Action issued by the Russian Patent Office for Application No. 2020134660, dated Mar. 22, 2022, 6 pages.

Shirriff, Ken: "Bitcoins the hard way: Using the raw Bitcoin protocol," Oct. 14, 2016 (Oct. 14, 2016), pp. 1-31, Retrieved from the Internet: URL:https://web.archive.org/web/2016101400 2912/ http://www.righto.com/2014/02/bitcoin s-hard-way-using-raw-bitcoin.html [retrieved on Apr. 12, 2022].

Anonymous: "SAMMANTICS," Oct. 30, 2016 (Oct. 30, 2016), pp. 1-164, Retrieved from the Internet: URL:https://web.archive.org/web/2016103018 2822/https://web.archive.org/web/2016103018 [retrieved on Apr. 11, 2022].

Office Action for Japanese Application No. JP20200191399 dated Jun. 24, 2022, 5 pages.

Office Action for Canadian Patent Application No. 3,076,257, dated Oct. 6, 2022, 4 pages.

\* cited by examiner

340
Database Table
230a

| FID | Item | Fruit | Version |
|-----|------|-------|---------|
| 1001 | Pie | Apple | V1 |
| 1001 | Pie | Pear | V3 |
| 1002 | Bread | Banana | V2 |
|  |  |  |  |

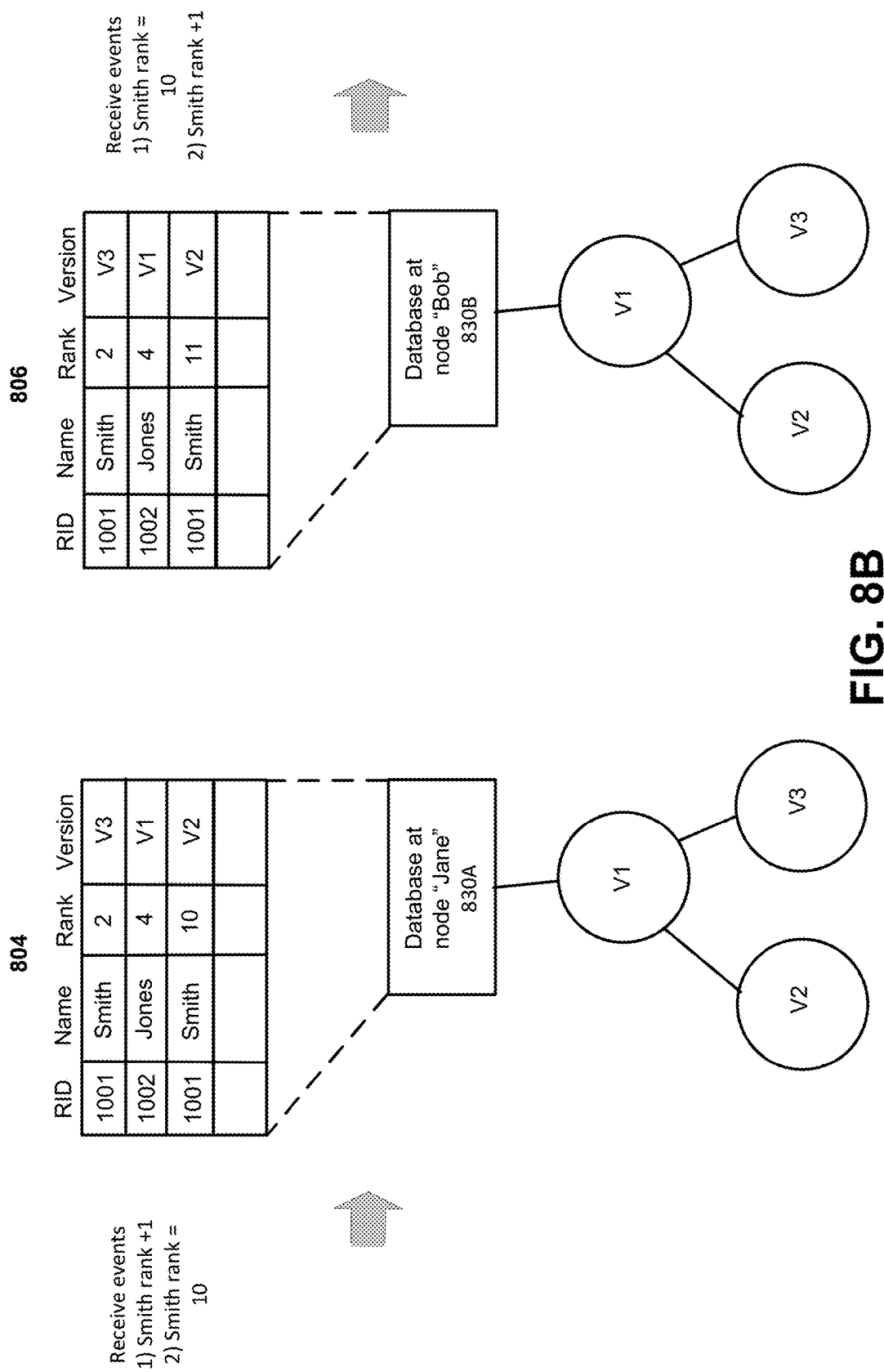

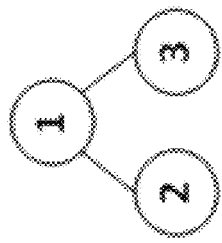
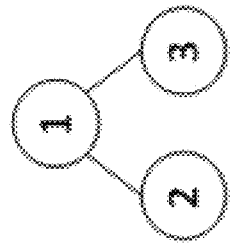
| People_ | | | | |
|---|---|---|---|---|
| id_ | name_ | age_ | state_ | version_ |
| 123 | Alice | 20 | AZ | 1 |
| 456 | Bob | 30 | OH | 1 |
| 789 | Carol | 40 | CO | 1 |
FIG. 9A
| People_ | | | | |
|---|---|---|---|---|
| id_ | name_ | age_ | state_ | version_ |
| 123 | Alice | 20 | AZ | 1 |
| 456 | Bob | 30 | OH | 1 |
| 789 | Carol | 40 | CO | 1 |
| 890 | Dave | 50 | DE | 3 |
FIG. 9B

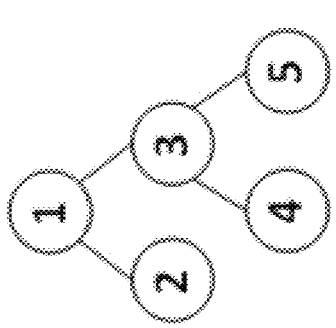
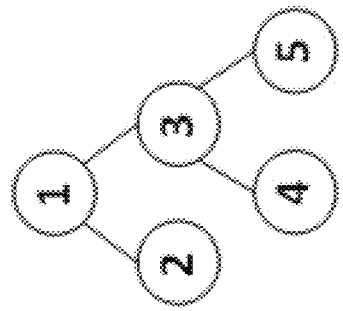
| People_: | | | | |
|---|---|---|---|---|
| id_ | name_ | age_ | state_ | version_ |
| 123 | Alice | 20 | AZ | 1 |
| 456 | Bob | 30 | OH | 1 |
| 789 | Carol | 40 | CO | 1 |
| 890 | Dave | 50 | DE | 3 |
FIG. 9C
| People_: | | | | |
|---|---|---|---|---|
| id_ | name_ | age_ | state_ | version_ |
| 123 | Alice | 20 | AZ | 1 |
| 456 | Bob | 30 | OH | 3 |
| 789 | Carol | 40 | CO | 1 |
| 890 | Dave | 50 | DE | 3 |
| 456 | Bobbie | 30 | OH | 2 |
FIG. 9D

| People_: | | | | |
|---|---|---|---|---|
| id_ | name_ | age_ | state_ | version_ |
| 123 | Alice | 20 | AZ | 1 |
| 456 | Bob | 30 | OH | 1 |
| 789 | Carol | 40 | CO | 2 |
| 890 | Dave | 50 | DE | 3 |
| 456 | Bobbie | 30 | OH | 2 |
| 789 | Carol | 40 | CO | 5 |

METHODS AND APPARATUS FOR EFFICIENTLY IMPLEMENTING A FAST-COPYABLE DATABASE

CROSS-REFERENCE TO RELATED APPLICATIONS

This application is a divisional of U.S. patent application Ser. No. 16/176,125, filed Oct. 31, 2018 and titled "Methods and Apparatus for Efficiently Implementing a Fast-Copyable Database," which claims priority to and benefit of U.S. Provisional Application No. 62/580,056, titled "Methods and Apparatus for Efficiently Implementing a Distributed Database within a Network" and filed on Nov. 1, 2017; the disclosures of each of the foregoing applications are incorporated herein by reference in their entireties.

BACKGROUND

Embodiments described herein relate generally to methods and apparatuses for implementing an increased-efficiency database system.

SUMMARY

In some embodiments, a fast-copyable database apparatus includes a processor and a memory in electronic communication with the processor. The memory stores a database table with multiple records each having a compound key including a version identifier. The memory also stores instructions executable to cause the processor to generate a first virtual clone of the database table and a second virtual clone of the database table, receive a query at the first virtual clone, and modify the query so that the query includes a version identifier of the first virtual clone. The processor can query the database table using the modified query to generate a response based in part on each record from the set of records having a version identifier associated with an ancestral path of the version identifier of the first virtual clone, and send the response. Each compound key includes a version identifier and a data portion.

BRIEF DESCRIPTIONS OF THE DRAWINGS

Figure 3A:
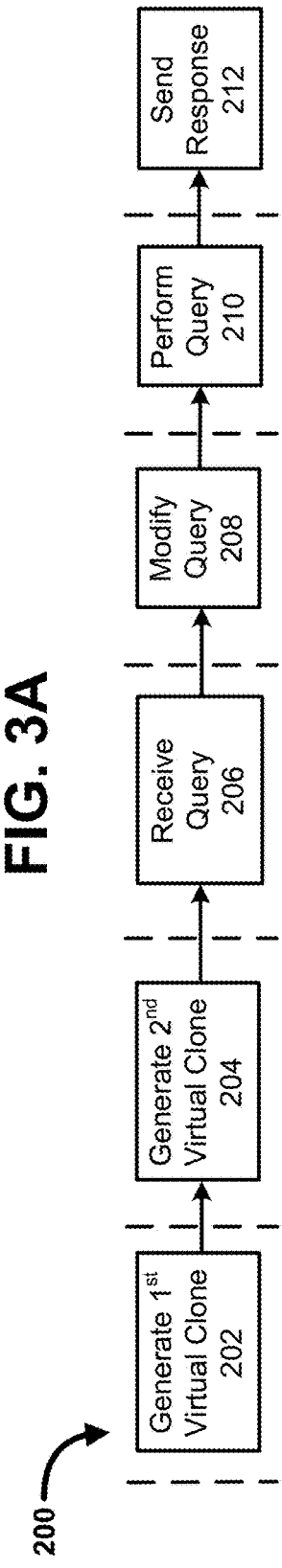
FIG. 3A is a flow diagram illustrating a method for generating and interacting with virtual clones of a hierarchical tree, according to an embodiment.
Figure 3B:
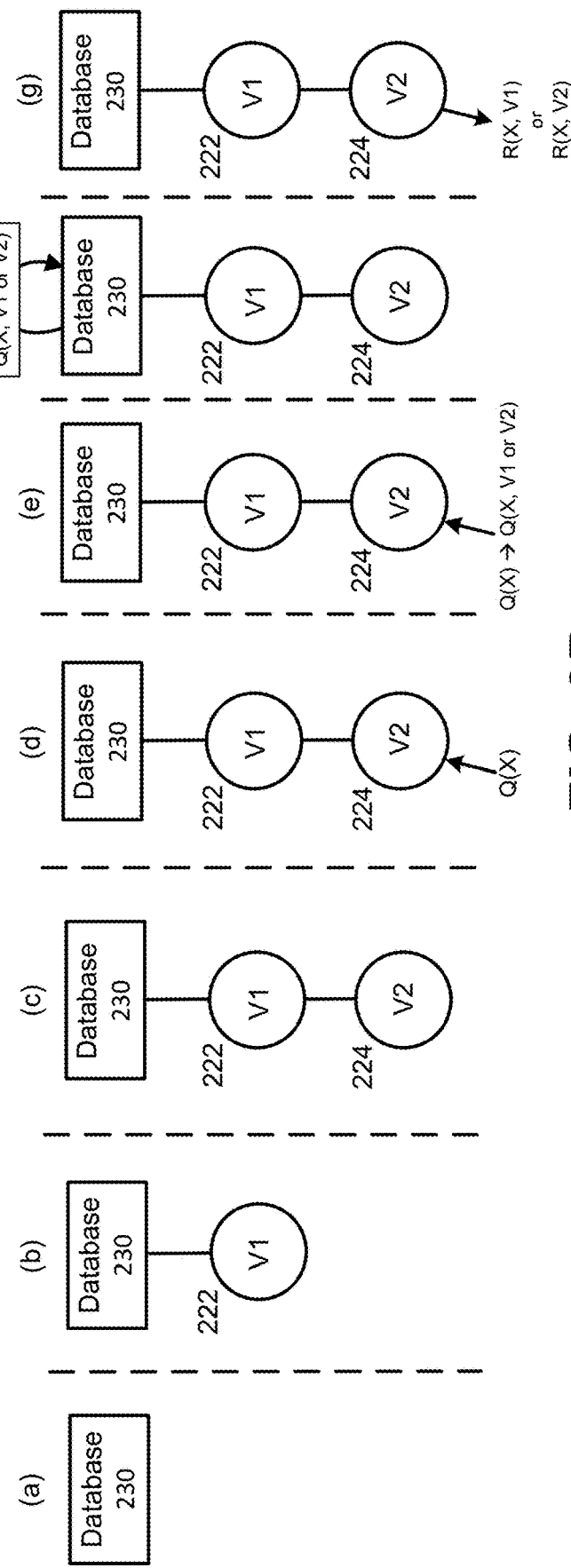

FIG. 3B includes a series of diagrams illustrating the temporal evolution of and interaction with a database table via the hierarchical tree of FIG. 3A.

FIGS. 4A-4F include diagrams illustrating the temporal evolution of a hierarchical tree, including representations of virtual clones, and an associated database table, according to an embodiment.

Figure 4A:
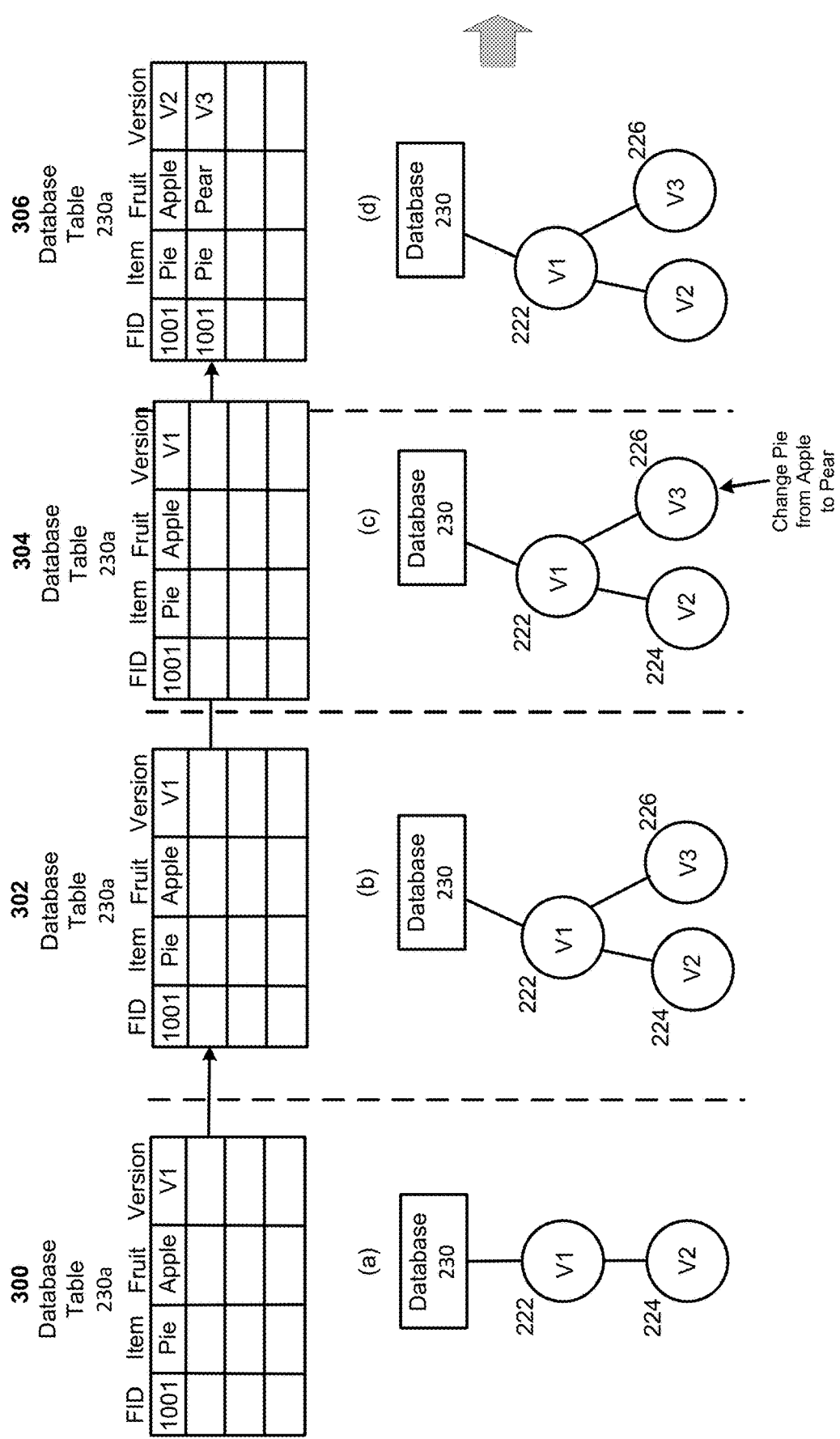
Figure 4B:
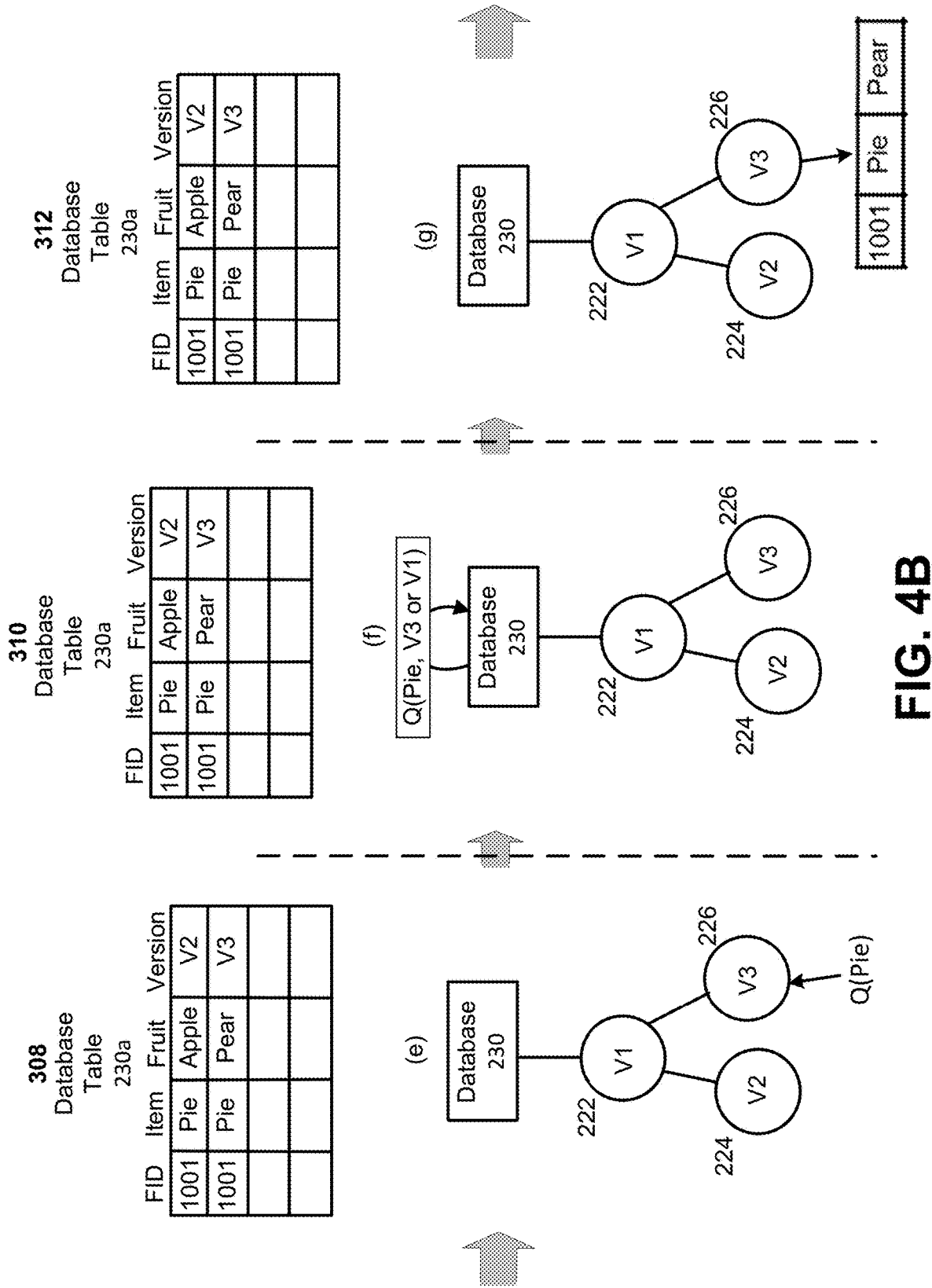
Figure 4C:
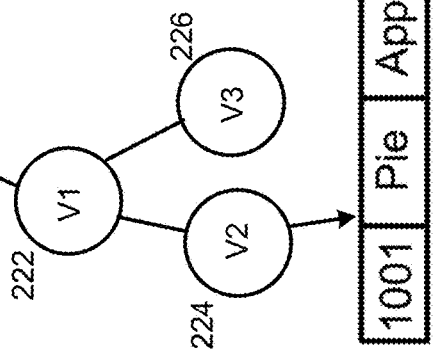
Figure 4C:
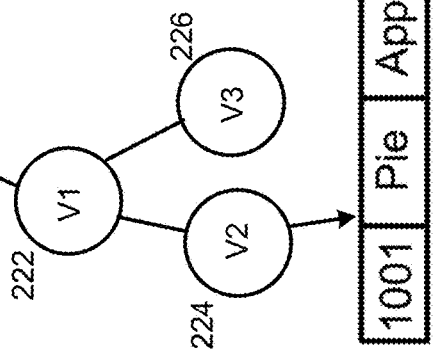
Figure 4C:
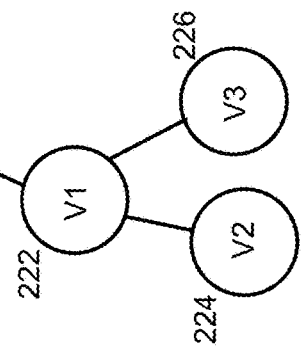
Figure 4C:
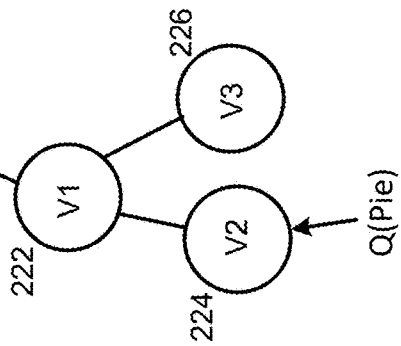
Figure 4D:
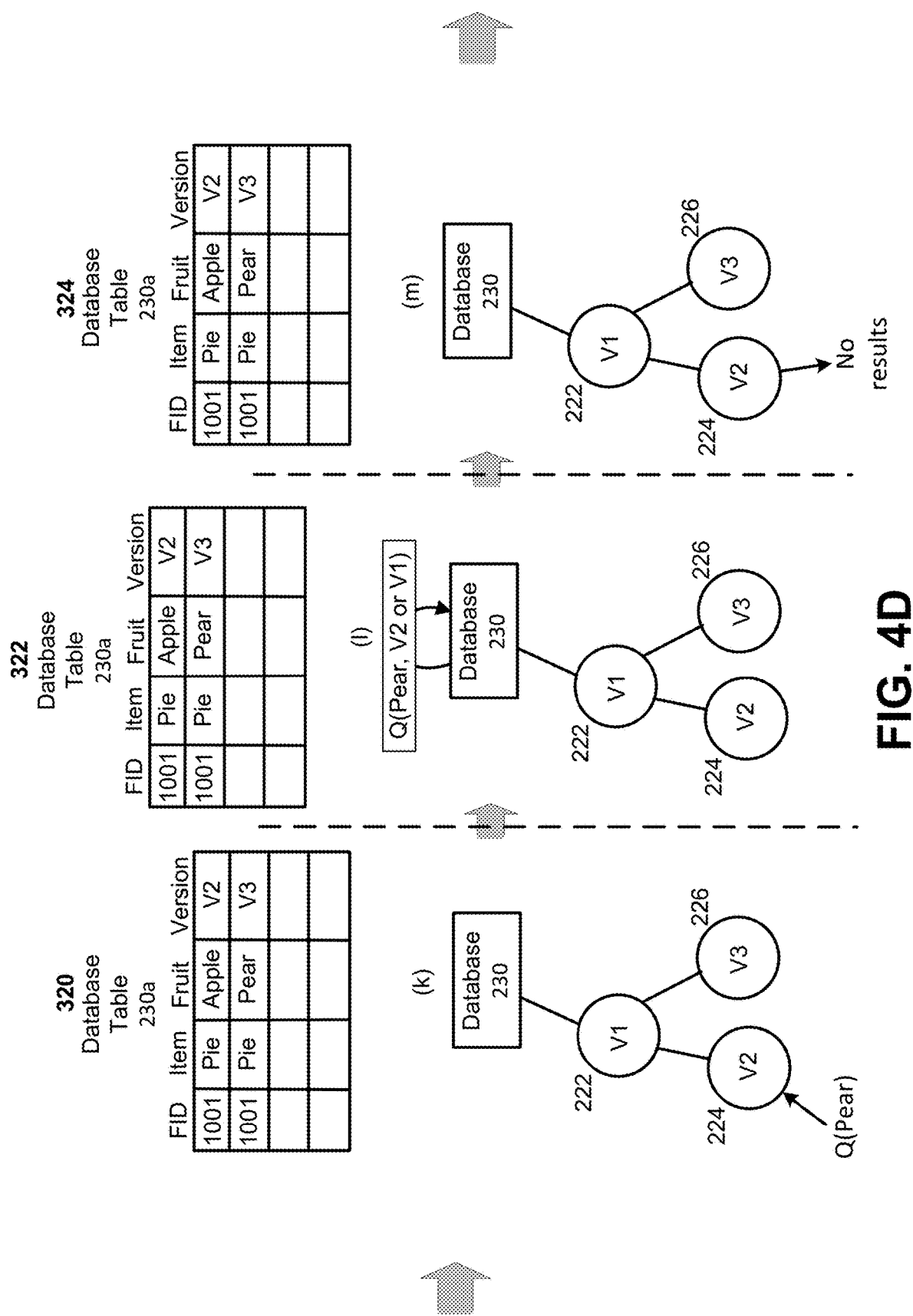
Figure 4E:
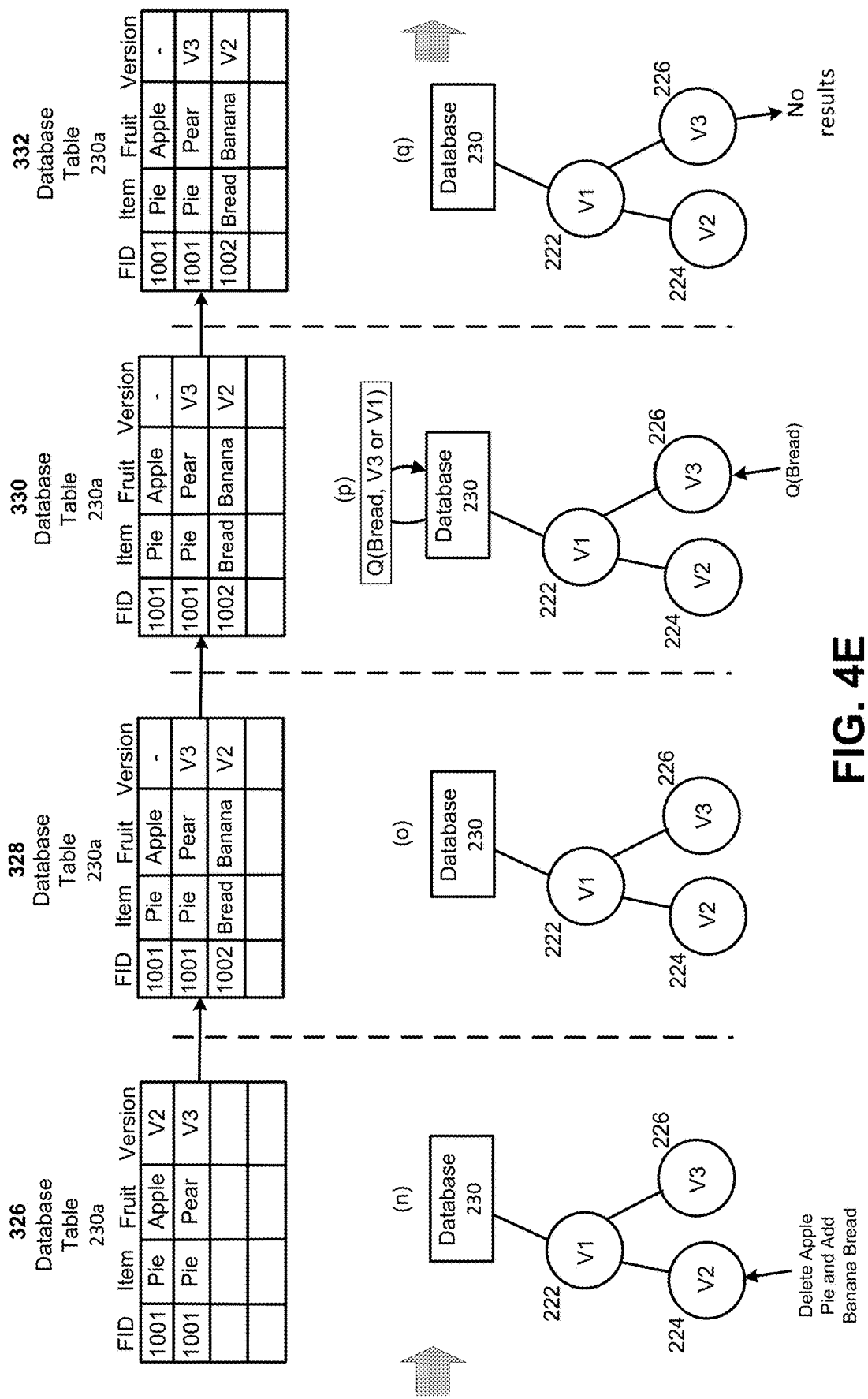
Figure 4F:
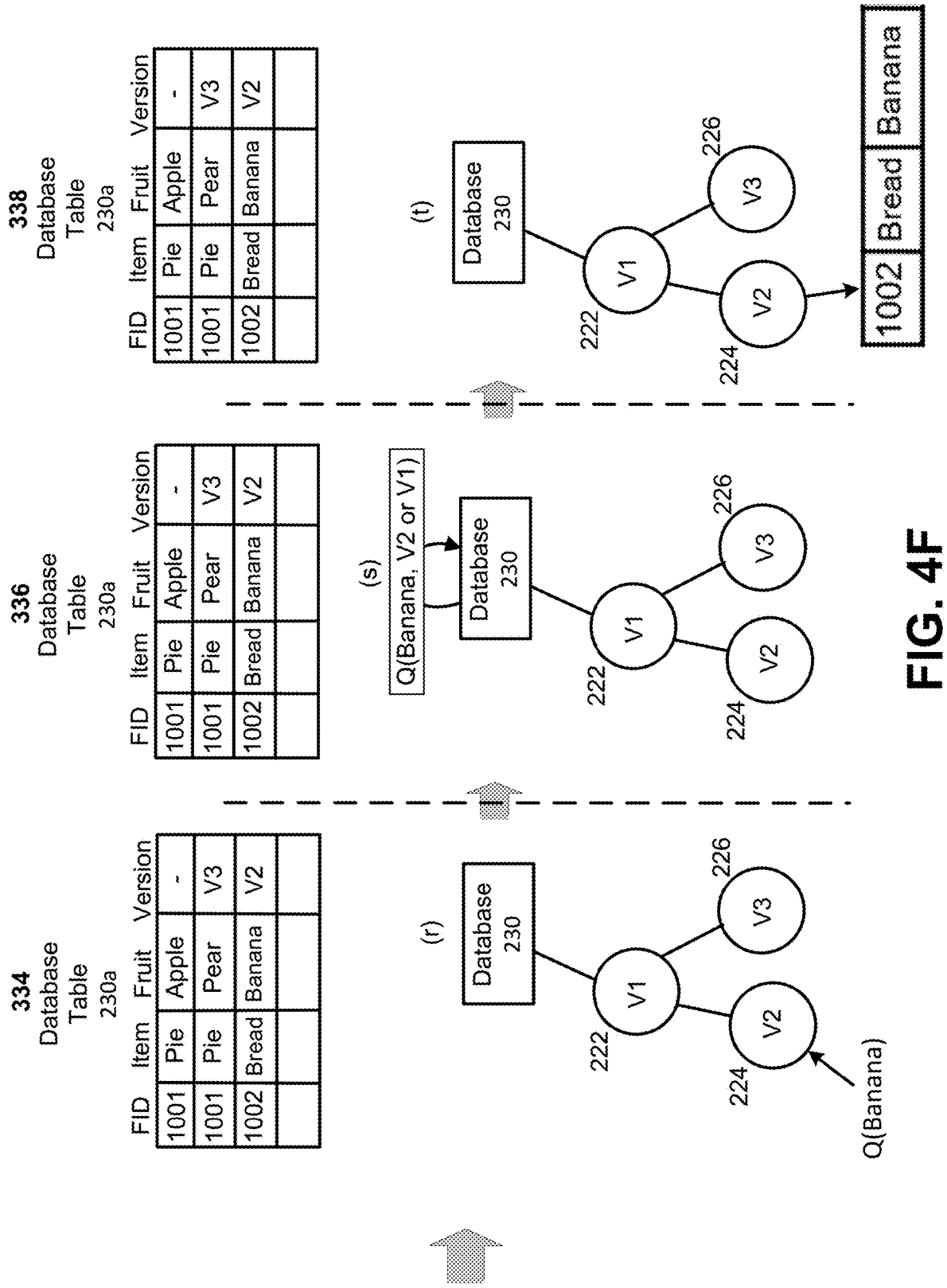
Figure 4G:
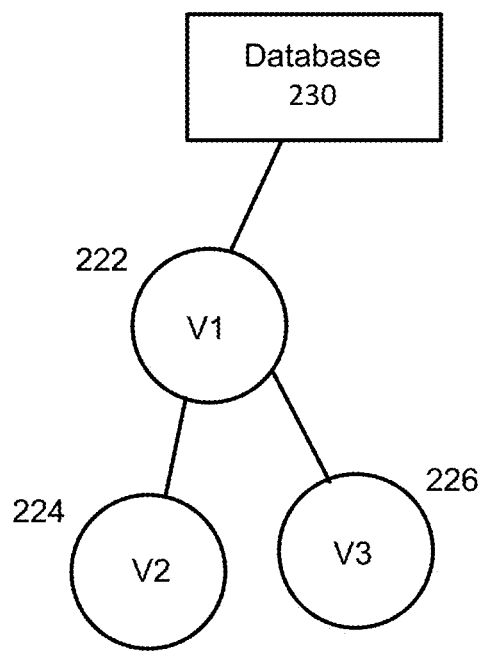

FIG. 4G includes a diagram illustrating a querying process, according to an embodiment.

Figure 5:
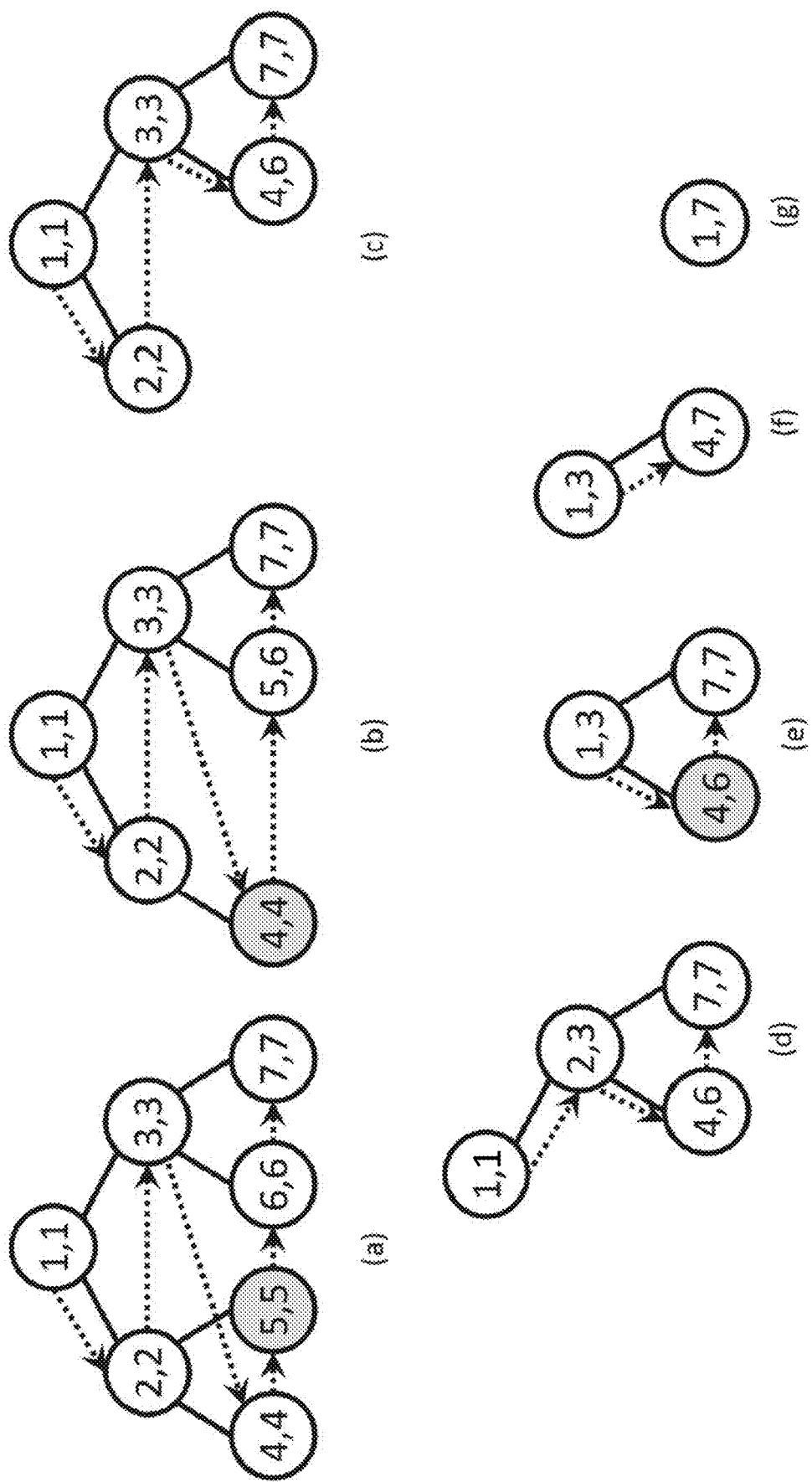

FIG. 5 includes a series of diagrams illustrating an incremental garbage collection process, according to an embodiment.

Figure 6:
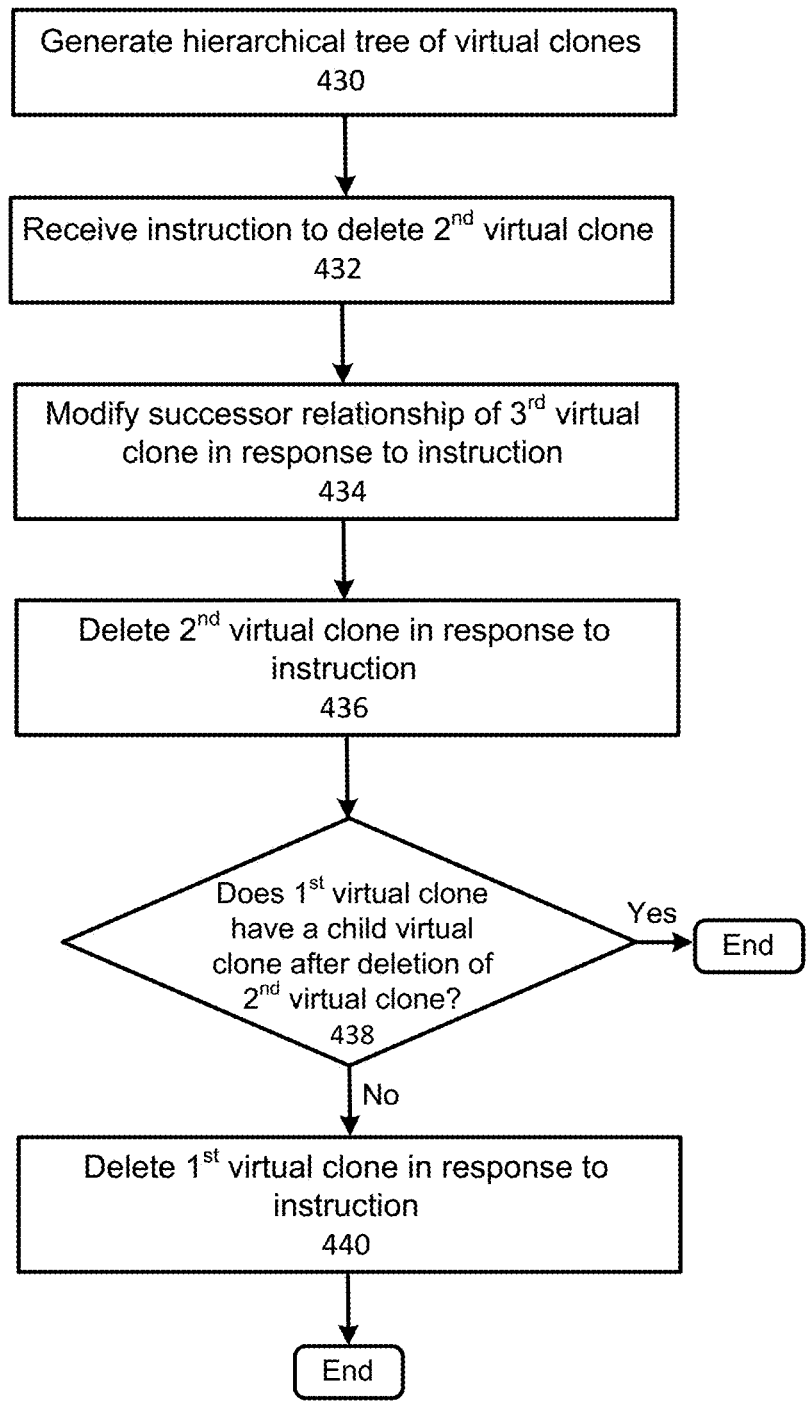

FIG. 6 is a process flow diagram for a processor-implemented garbage collection (or cascading deletion) method for a fast-copy database, according to an embodiment.

Figure 7:
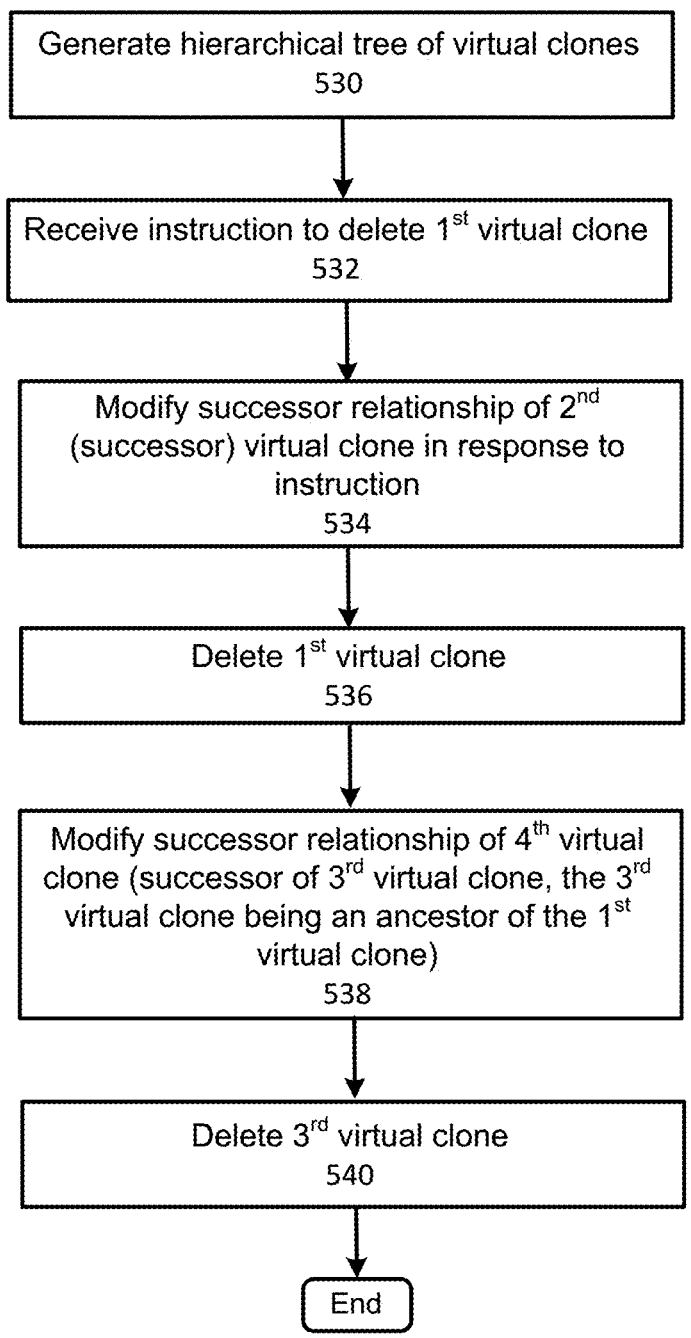

FIG. 7 is a process flow diagram for a processor-implemented garbage collection (or cascading deletion) method for a fast-copy database, according to an embodiment.

FIGS. 8A-8D are diagrams illustrating an implementation of a fast-copyable database system, according to an embodiment.

FIG. 9A shows a fast copyable table and a hierarchical tree at a first time, according to an embodiment.

FIG. 9B shows the fast copyable table and the hierarchical tree of FIG. 9A at a second time, after the addition of a new record.

FIG. 9C shows the fast copyable table and the hierarchical tree of FIG. 9A at a third time, after a fast copy has been performed of version 3.

FIG. 9D shows the fast copyable table and the hierarchical tree of FIG. 9A at a fourth time, after a record modification has been performed through virtual clone 2.

Figure 9E:
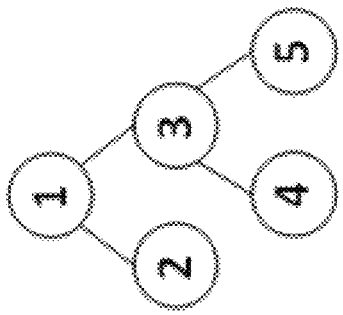

FIG. 9E shows the fast copyable table and the hierarchical tree of FIG. 9A at a fifth time, after a deletion has been performed through virtual clone 4.

Figure 10:
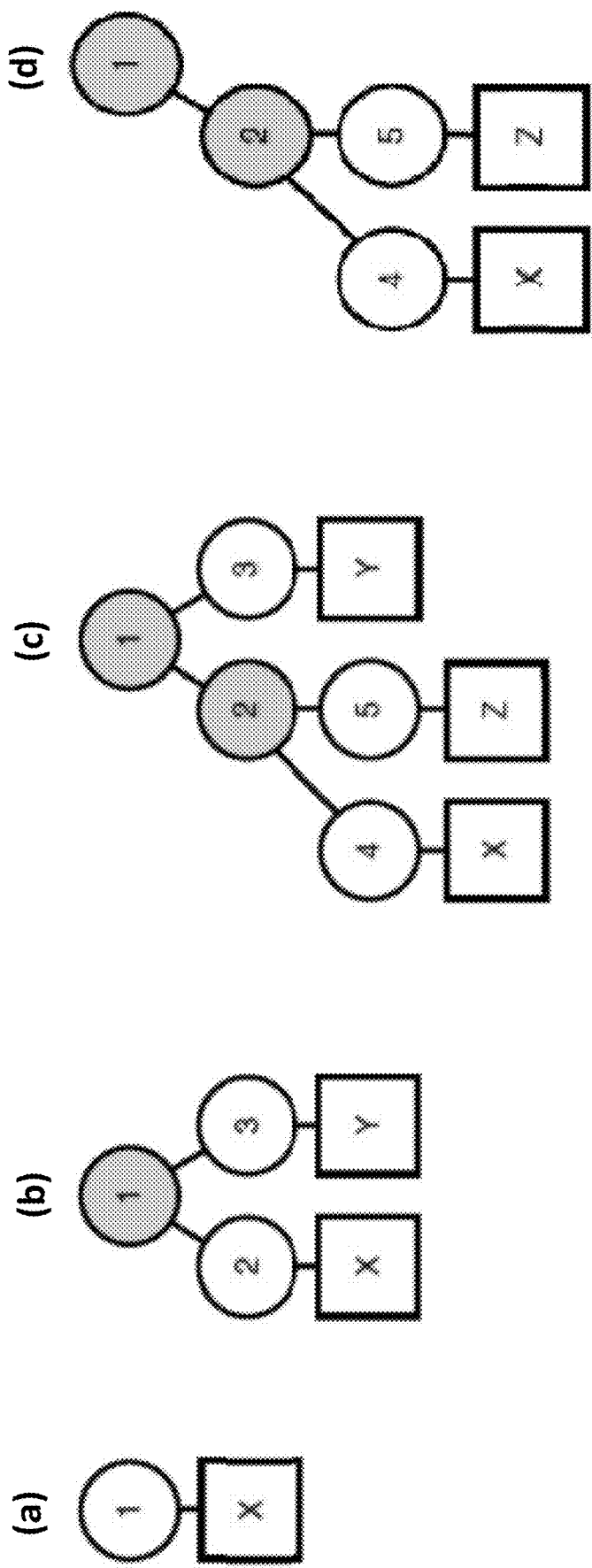

FIG. 10 includes a series of diagrams illustrating fast-copy operations, according to an embodiment.

DETAILED DESCRIPTION

High-efficiency database systems of the present disclosure include one or more physical relational databases (including and/or used interchangeably herein with "a database table") each stored in non-transitory, processor-readable memory, and one or more associated dynamic hierarchical trees each including multiple virtual clones through which data of the relational database can, under predetermined conditions and/or within predefined time periods, be accessed and/or modified. Methods of database implementation and management set forth herein are considerably faster and more efficient than known methods of database replication and interaction. Relational databases described herein, when implemented according to the present disclosure, may be termed "fast-copyable," since many different "copies" can be quickly created and/or defined via the instantiation of a new virtual clone, where each different "copy" refers to a "virtual" copy—the contents as perceived from the point-of-view of, and accessible from, a different associated virtual clone. Stated another way, the relational database may be said to be "wrapped" in a class that converts the relational database to a fast-copyable database.

In some implementations, high-efficiency database systems of the present disclosure can be described as "leaderless," in that there are multiple physical relational databases (i.e., "instances" of the relational database), with associated dynamic hierarchical trees, at multiple associated, geographically disperse locations, optionally each with a different associated administrator, but no centralized "master" or "leader" copy of the relational database. In other words, different changes can be applied, in different orders and/or at different times, at each of the multiple physical relational databases. Not having a leader in a distributed database system can increase the security of the distributed database system. For example, with a leader there is a single point of attack and/or failure. If malicious software infects the leader and/or a value in a database table of the leader is maliciously altered such that it has an incorrect value, the infection and/or incorrect value can propagate throughout the network of database instances, or be transferred to another distributed database instance. By contrast, in leaderless systems of the present disclosure, there is not a single point of attack and/or failure. Leaderless distributed database systems described herein can also increase the speed of convergence of one or more consensus algorithms, while reducing an amount of data transmitted between devices. Distributed database systems described herein are also "fast copyable" through the generation of virtual clones that can be used to track disparate incremental changes to the contents of a database table. As used herein, a "fast copy" has the same meaning as the phrase "virtual clone." As such, unlike some known distributed database, updates can be accomplished without using replication and duplication, which can be resource-intensive and time-consuming, particularly when the corpus of data being managed is large.

In some embodiments, each virtual clone from a set of virtual clones of a hierarchical tree can serve as a "virtual database," in that data of a relational database can be accessed by a user (e.g., via queries) interacting with that virtual clone, such that it appears to that user that the data is stored and/or is being searched locally at that virtual clone, though it is not (i.e., the storage and querying occur on the relational database/table). Modifications to a data table of the relational database can be applied at multiple virtual clones from the set of virtual clones, and can be associated with that virtual clone within the relational database using a "compound key" (e.g., using an attribute added to the database table plus the database table's legacy key field). The compound key can include at least two values: a version identifier ("version ID") associated with at least one virtual clone, and a field that refers to a property of the database table being referenced (e.g., a row (i.e., "records" or "tuples") identifier or name, column (i.e., "attribute") identifier or name, data label, data value, etc.), such as that database table's legacy key field (also referred to herein as a "virtual primary key field"). Example attributes include, but are not limited to, virtual primary key name, value (e.g., balance, debit, credit, transfer amount), currency, description, date, quantity, tally, version, duration, order, etc. The portions of the compound keys can be stored as part of database table records, such that edits made by one virtual clone do not affect the data of the database table from the point-of-view of any other virtual clone. In some embodiments, multiple instances of a given compound key are not permitted to co-exist within the database table at any given time (i.e., there can only be one instance of a given compound key within the database table). Modifications to a data table of the relational database made by a particular virtual clone are associated with that virtual clone, via the version identifier of that virtual clone, such that subsequent queries or modifications made via that virtual clone can be applied to the most recent form of the relational database as defined by the cumulative interactions made to the database table via that virtual clone/version ID. Modifications to the database table made by a particular virtual clone are not, however, apparent or accessible from the point-of-view of other virtual clones. Implementing changes in this distributed manner, with attribution of changes to the changes' associated modifying virtual clones based on the virtual clones' associated version IDs, eliminates the need to replicate, distribute and locally store (e.g., at each of a set of server nodes hosting the virtual clones) multiple copies of the data of each relational database. Methods set forth herein can obviate the need to transmit the entire contents of the relational database multiple times to many machines in response to each change made by each machine in network communication therewith.

Fast-Copyable Database System

Figure 1:
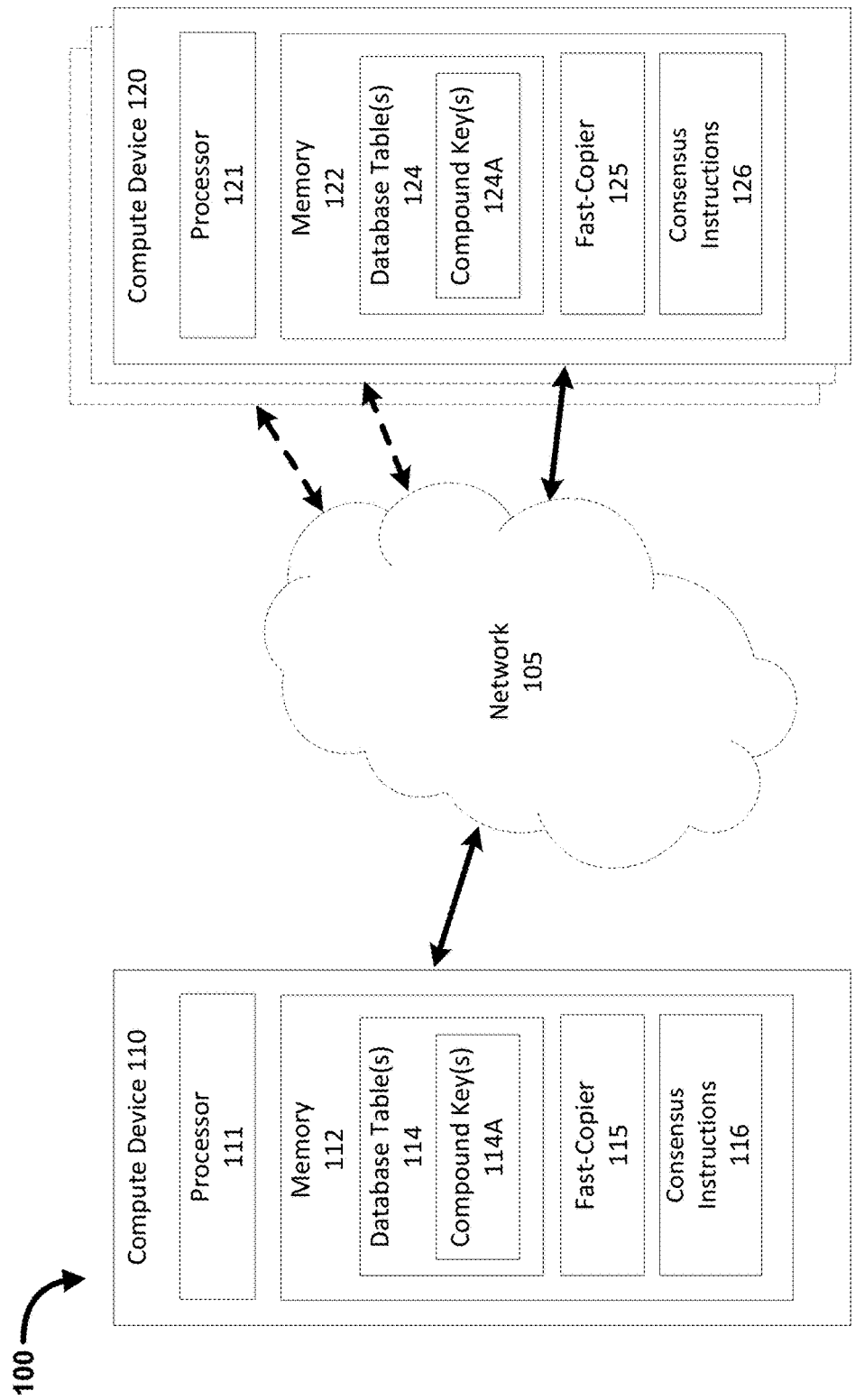
FIG. 1 is a block diagram illustrating a system for implementing a fast-copyable database, according to an embodiment.

FIG. 1 is a system diagram showing components of a fast-copyable database system 100, according to some embodiments. As shown in FIG. 1, the system 100 includes a first compute device 110 in wireless or wired communication with a network 105, and one or more additional compute devices 120, which are also in wireless or wired communication with the network 105. The first compute device 110 includes a processor 111, in operable communication with an onboard memory 112 and a display 113. The memory 112 stores one or more database tables 114 (i.e., instance(s) of a relational database), a fast-copier 115, and consensus instructions 116 (e.g., that cause the processor to implement a consensus algorithm). Each database table 114 includes one or more compound keys 114A, described in greater detail below. Each compute device from the one or more further compute devices 120 includes a processor 121, in operable communication with an onboard memory 122, and optionally one or more interfaces (e.g., a display, a graphical user interface (GUI), a wireless transceiver, etc.) (not shown). The memory 122 includes one or more database tables 124 (i.e., instance(s) of a relational database), a fast-copier 125, and consensus instructions (e.g., that cause the processor to implement a consensus algorithm) 126.

Each of processors 111 and 121 can include one or more of: a general purpose processor, a central processing unit (CPU), a microprocessor, a digital signal processor (DSP), a controller, a microcontroller, a state machine, and/or the like. Under some circumstances, a "processor," as used herein, may refer to an application specific integrated circuit (ASIC), a programmable logic device (PLD), a field programmable gate array (FPGA), etc. The term "processor" may refer to a combination of processing devices, e.g., a combination of a DSP and a microprocessor, multiple microprocessors, one or more microprocessors in conjunction with a DSP core or any other such configuration.

Each of memories 112 and 122 can include any electronic component capable of storing electronic information such as data and code (e.g., instructions). The term memory may refer to various types of non-transitory, processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in operable or electronic communication with a processor if the processor can read information from and/or write information to the memory. Memory that is integral to a processor is in electronic communication with the processor. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processors; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Fast-copyable database systems of the present disclosure can be implemented, in some embodiments, as hardware or as software, e.g., a "fast-copier," as shown and described below with reference to FIG. 1, or other form of software stored in a non-transitory memory and including instructions executable by a processor in operable communication with the memory. The memory can also store (and/or the processor can access) a relational database. The fast-copier can be a "wrapper class" (also referred to as a "wrapper pattern" or "wrapper function") that "wraps" the relational database with which it is associated. For example, when the software is running and a Structured Query Language (SQL) query is received at the processor, the processor can send/pass the SQL query to the relational database by calling a method in the wrapper class, which can modify the query before sending the query on to the relational database. Results returned by the relational database in response to the SQL query can then be returned/sent by the method in the wrapper class. The fast-copy software can be configured to perform one or more of the following, in any combination: intercept calls to the relational database, intercept calls from the relational database, add a field to the relational database (e.g., "version," as discussed below), modify a field of the relational database, delete a field of the relational database, modify the structure of the relational database (e.g., add or remove a record/row or an attribute/column), or any function shown and described below with reference to FIGS. 2-7.

In some embodiments, a fast-copyable database system includes a single machine (or "node") or multiple machines, or "nodes," each including a processor operably coupled to a non-transitory memory hosting an instance of the relational database and the fast-copy software. Initially (i.e., before any changes are applied), each instance of the relational database is the same. The nodes can be geographically separated from one another and/or associated with different administrator individuals and/or entities. Each node can generate and/or store an associated hierarchical tree and/or subsequent portions of the hierarchical tree (or representation of a hierarchical tree) including one or more virtual clones (also referred to herein as "objects" or "virtual objects") through which the relational database can be modified and/or queried. Generating the hierarchical tree can be performed multiple times as the underlying hierarchical tree is expanded and/or modified. For example, each node can generate at least two virtual clones—a first virtual clone and a second virtual clone. The first virtual clone can be used to apply changes to fields of the relational database, for example as activity data is received at that node (e.g., from another node). These changes can be applied automatically and/or by an administrator, for example in response to receiving the activity data and/or based on the activity data. The activity data can include data related to one or more events or transactions occurring, or purported to have occurred, within a network of nodes to which the receiving node is a party. Changes applied by the first virtual clone can be viewed as collectively representing a "running tally" of as-received activity data associated with one or more transactions or events.

In some implementations, the activity data is received at a given node as a consequence of a "synchronization" event initiated by one or more of the nodes and/or automatically implemented by the fast-copy software (e.g., triggered by a detected change within the network of nodes and/or according to a predefined temporal schedule). During synchronization, at least two nodes from the network of nodes exchange data from their associated database tables. The data can be, for example, activity data or a portion thereof. The data exchanged between/among the at least two nodes can represent a subset, or partial view, of the aggregate activity within the node network. In some such instances, changes applied to a node's database table via the first virtual clone are "tentative changes," a consensus ordering and/or validity of which has not been reached, and/or a determination as to whether intervening changes are missing from the database table has not yet been made (i.e., consensus has not yet been reached/satisfied for those changes). Records within the database table that are modified at a node via the first virtual clone can include a compound key that includes a first version ID associated with the first virtual clone.

In some implementations, a synchronization process includes (1) repeatedly updating a "current state" of the database table (e.g., as captured by a database state variable defined by a node) based on one or more events (e.g., including one or more transactions) or transactions that are received during syncing, and (2) repeatedly rebuilding that current state (e.g., rearranging the order of events) whenever new information about the sequencing of the events or transactions is received, e.g., by going back to a copy of an earlier state, and recalculating the current state by processing the events or transactions in the new order. Thus, for example, each compute device can maintain two versions of a state—one that is updated as new events and transactions are received (e.g., as embodied by the first virtual clone, discussed above), and one that is updated only after consensus is achieved (e.g., as embodied by the second virtual clone, discussed above). At some point (e.g., after a predetermined period of time, after a predetermined number of events have been defined and/or received, etc.), the version of the state that is updated as new events and transactions are received can be discarded or deleted from the hierarchical tree, and a new copy of the state that is updated after consensus is achieved can be generated, as a new version of the state that is updated as new events and transactions are received (e.g., as embodied by the third virtual clone, discussed above). The foregoing approach can ensure synchronization of both states. In some instances, the state (including different copies of the state) can be stored in any suitable data structure such as, for example, a "fast copyable" arrayList (also referred to herein as a fast clone arrayList, a fast clone array or fast copyable array), a "fast copyable" hash table, a "fast copyable" relational database, or a "fast copyable" file system (also referred to herein as a fast clone file system and/or a fast copyable filesystem), optionally with a separate file being created and/or defined on a host operating system for each N-byte (e.g., 4096-byte or 1024-byte) portion of a file in the fast copyable file system.

As used herein, "consensus" refers to a determination, reached using the consensus algorithm, that the one or more changes being considered by the consensus algorithm are correctly ordered, are not duplicates, are not missing any intervening changes, and/or are legitimate (i.e., not malicious or fraudulent). Consensus can be said to be reached, for example, when all or at least a predefined threshold number of nodes agree, or have concluded with at least a predefined threshold level of certainty, that the changes are correctly ordered, are not duplicates, are not missing any intervening changes, and/or are valid. For example, a sequence of changes for which consensus has been reached may be said to reflect a "true" or accurate representation of a sequence of events and/or transactions. In some implementations, consensus is reached in "rounds," within a predetermined time frame, after a predetermined number of iterations of the consensus algorithm, and/or according to a predefined schedule.

After consensus has been reached for a change or set of changes applied via the first virtual clone, that change or set of changes can be applied to the database table via the second virtual clone, and each affected record of the database table can correspondingly include a compound key that includes a second version ID associated with the second virtual clone. After the change or set of changes can be applied to the database table via the second virtual clone, and optionally automatically and/or in response to those changes being applied, the first virtual clone can be deleted, and at least two further virtual clones (e.g., a third virtual clone and a fourth virtual clone) that are descendants of the second virtual clone can be generated. The fast-copy process can then proceed, with tentative changes to the database table being made via the third virtual clone, and post-consensus changes to the database table being made via the fourth virtual clone, in a manner similar to that described above.

In some implementations, a consensus algorithm or method can be implemented by a platform (i.e., a software program executing on a processor of a compute device and/or system, such as the consensus instructions 116 stored in memory 112 and executed by processor 111 of compute device 110 of FIG. 1). The platform can collect, disseminate, order transactions, and perform other suitable tasks associated with consensus processes.

In some implementations, queries can no longer be made via a virtual clone and/or its associated node once one or more descendant nodes, depending therefrom (i.e., extending directly therefrom, moving downward in the hierarchical tree), have been generated, even if and after the one or more descendant nodes are deleted or removed from the hierarchical tree.

Figure 2A:
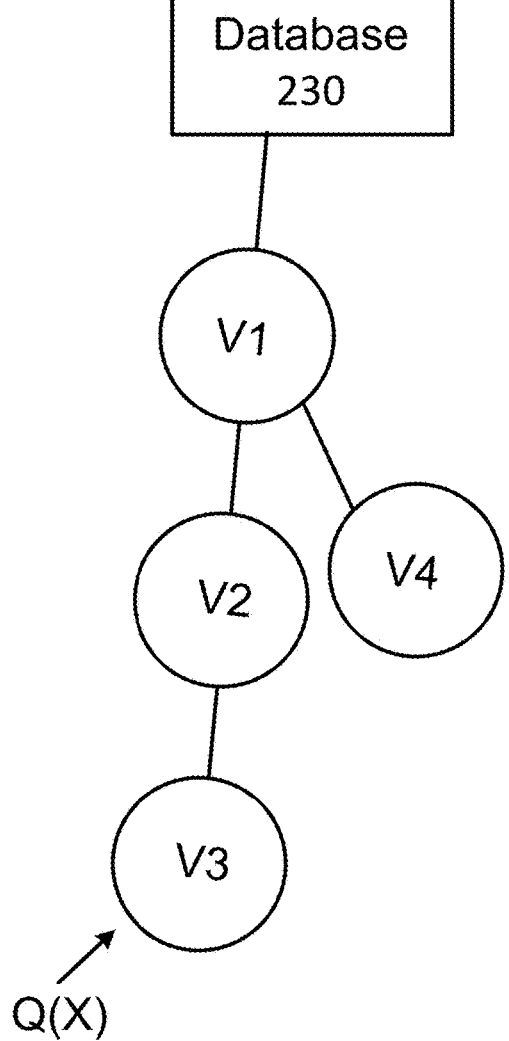
FIG. 2A is a diagram of a queryable hierarchical tree and an associated database table, according to an embodiment.
Figure 2B:
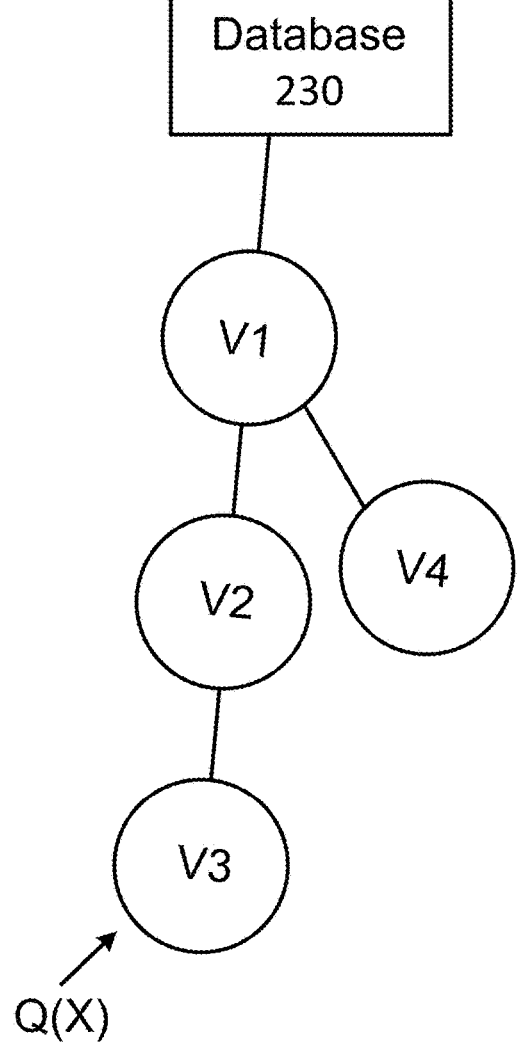
FIG. 2B is a diagram of a queryable hierarchical tree and an associated database table with a conflict constraint enforced, according to an embodiment.

In some implementations, one or more database table(s) of the present disclosure can be queried via one or more virtual clones. FIGS. 2A and 2B show diagrams of a queryable hierarchical tree (also referred to herein as a "version tree"), according to an embodiment. In some implementations, the hierarchical tree (also referred to herein as a "version tree") and/or a representation of the hierarchical tree is kept and/or stored in non-transitory memory. As shown in FIGS. 2A and 2B, the queryable hierarchical tree includes a relational database instance 230 and multiple virtual clones thereof, V1, V2, V3 and V4. The serial presentation of virtual clones V1, V2 and V3 indicates that virtual clone V1 was generated first (and, optionally, changes were made to the database 230 via V1), virtual clone V2 (a "descendant" virtual clone of V1) was generated second (and, optionally, changes were made to the database 230 via V2), and virtual clone V3 (a "descendant" virtual clone of V2) was generated third (and, optionally, changes were made to the database 230 via V3). V3 is a "leaf node," in that V3 has no child nodes extending/depending from V3. Note that, in some implementations, once a descendant virtual clone has been generated, changes to the database 230 can no longer be made via the direct-lineage ancestor virtual clones. In other words, once virtual clone V3 has been generated, changes to database 230 can no longer be applied via virtual clone V2 or virtual clone V1.

In an embodiment (shown in FIG. 2A), a query received at V3 can be implemented/performed in a sequential manner, as follows: Suppose that the database 230 contains a record having the same virtual primary key as an ancestor version of that record (also in database 230). For example, the database table of FIG. 2A includes attributes record ID (RID) (a virtual primary key), Name, Rank, and Version, and there is: (1) a record in database 230 with compound key (1001, V3), (2) a record in database 230 with compound key (1001, V2), and (3) a record in database 230 with compound key (1001, V1). In such an implementation, if the version tree is as shown in FIG. 2A (where V3 is a descendant virtual clone of V2, and V2 is a descendant virtual clone of V1) and a query is received via virtual clone V3 for virtual primary key RID=1001, the processor will first search for a record with a compound key of (1001, V3). If a record is found with such a compound key (which it will, in the example of FIG. 2A), this record is returned and the query ends. If, however, a record were not found in database 230 with the compound key (1001, V3), based on the version tree, the processor will next query the database 230 for the compound key (1001, V2). If a record is found in database 230 with such a compound key, that record is returned and the query ends. Otherwise, the processor queries the database 230 for the compound key (1001, V1). Thus, a query can be performed by first referencing the highest-numbered version in the version tree, and work its way up the version tree, in a stepwise/sequential manner, if results are not returned. The foregoing query process can be described as a query process in which a conflict constraint is not enforced. In other words, records can co-exist within the database 230 having compound keys with the same virtual primary key and a version ID within the same ancestral chain/branch of the hierarchical tree.

If instead, given the hierarchical tree shown in FIG. 2A, a query is received via virtual clone V4 (a descendant virtual clone of V1) for virtual primary key 1001, the processor will first search for a record with a compound key of (1001, V4). If a record is found with such a compound key (which it will, in the example of FIG. 2A), this record is returned and the query ends. If, however, a record were not found in database 230 with the compound key (1001, V4), based on the version tree, the processor will next query the database 230 for the compound key (1001, V1), since V1 is the ancestor virtual clone of V4. If a record is found in database 230 with such a compound key, that record is returned and the query ends. Otherwise, the processor returns a response of "null" or "no results found."

Although the foregoing description refers to queries for a virtual primary key, queries can be structured in a wide variety of other ways. For example, a query can request all records having a value for a specified attribute (e.g., all records having a value for the attribute "Name" of "Smith"), all records matching values for two or more specified attributes (e.g., all records having a value for the attribute "Name" of "Smith" and a Rank of "4"), all records having a specified primary virtual key and a value for a specified attribute (e.g., all records having a primary virtual key of "1001" and a value for the attribute "Name" of "Smith"), etc. In some implementations, a query does not include a reference to a virtual primary key.

In another embodiment (shown in FIG. 2B), a query received at V3 can be implemented/performed with a conflict constraint enforced. The conflict constraint can include a rule specifying and/or a database architecture that mandates that, for a given compound key including a virtual primary key and version ID for virtual clone "X," there is no other compound key present in the database 230 having the same virtual primary key and a version ID that is associated with an ancestor of X. Stated another way, when the conflict constraint is applied/enforced/followed, for any given virtual primary key, only one compound key having that virtual primary key and a version ID associated with any virtual clone on a given "branch" of the hierarchical tree can be stored within the database table at a given time. Thus, there cannot be multiple compound keys, each referencing the virtual primary key and a version ID associated with a virtual clone along an ancestral path of the hierarchical tree. A query may be implemented/performed with a conflict constraint enforced, by way of example, as follows: Suppose that the version tree and database 230 are as shown in FIG. 2B. If a query is received via virtual clone V3 for virtual primary key RID=1001, the processor searches for and finds records with RID=1001 and (Version=3 or Version=2 or Version=1). Note that the query, as initially received via V3, may not include a version ID reference, or may only reference version ID V3. The processor (e.g., running the fast-copy software) can modify the query such that each of version IDs V3, V2 and V1 are included. Note that if the database satisfies the conflict constraint, then the resulting set of records will not contain two entries with the same virtual primary key, because the results have records with versions coming from a single path in the version tree, so if two records had the same virtual primary key, they would violate the conflict constraint. A table of results can be generated, and the version attribute (column) can be deleted (e.g., by a processor) from the table of results before the table of results is returned as the result of the search.

If instead, given the hierarchical tree shown in FIG. 2B, a query is received via virtual clone V4 for virtual primary key 1001, the processor (e.g., running the fast-copier) can modify the query such that each of version IDs V4 and V1 are included. The processor then searches for and finds records with RID=1001 and (Version=V4 or Version=V1). If the processor does not find any records matching the modified query, the processor returns a response of "null" or "no results found."

As noted above, although the foregoing description of FIG. 2B refers to queries for a virtual primary key, queries can be structured in a wide variety of other ways. For example, a query can request all records having a value for a specified attribute (e.g., all records having a value for the attribute "Name" of "Smith"), all records matching values for two or more specified attributes (e.g., all records having a value for the attribute "Name" of "Smith" and a Rank of "4"), all records having a specified primary virtual key and a value for a specified attribute (e.g., all records having a primary virtual key of "1001" and a value for the attribute "Name" of "Smith"), etc. In some implementations, a query does not include a reference to a virtual primary key.

FIG. 3A is a flow diagram illustrating a method for generating and interacting with virtual clones of a hierarchical tree. FIG. 3B includes a series of diagrams illustrating the temporal evolution of, and interaction with a database table via, a hierarchical tree according to the method of FIG. 3A. To aid in understanding, FIGS. 3A and 3B may be read and understood together. As shown in FIG. 3B, a database 230, including one or more database tables, exists prior to the commencing of the method 200 of FIG. 3A. In FIG. 3A, at 202, the method 200 includes generating a first virtual clone. Correspondingly and contemporaneously, at (b), a first virtual clone of at least one database table of the database 230 is defined, thereby initiating a hierarchical tree, as represented as "V1" at 222. Subsequently, at 204, the method 200 includes generating a second virtual clone, and correspondingly and contemporaneously, at (c), a second virtual clone "V2" (224) is added to the hierarchical tree. Although shown in FIG. 3B to emanate and/or originate from V1 (thus being a "child," or "descendant" virtual clone of V1, and making V1 an "ancestor" or "predecessor" virtual clone of V2), in other instances, V2 can emanate and/or originate directly from the database 230, such that it has no predecessor virtual clone (in which case V1 and V2 would be referred to as sibling virtual clones within the hierarchical tree). Continuing with the method 200, at 206, a query is received via V2, as depicted in (d) of FIG. 3B. The query Q(X) is received via V2, and references record ID "X." In response to receiving the query, the processor running the fast-copy software (e.g., fast-copier 115 in FIG. 1) modifies the query, at 208 of FIG. 3A, to generate a modified query Q(X, V1 or V2) that references record ID "X" as well as a version or multiple versions (in this case, V1 or V2, as shown at (e) of FIG. 3B). The modified query causes the relational database to be searched for database table records matching the requested record ID "X" and having a version identifier associated with either V1 or V2 (since both virtual clones are in the direct ancestral line emanating from the database 230). At 210, the modified Q(X, V1 or V2) query is performed, as represented at (f) in FIG. 3B, and the result of the query (the response) R(X, V1) or R(X, V2) is returned and sent, at 212, via V2, as shown at (g) of FIG. 3B. As shown at (g), either a response associated with record ID X and V1 or a response associated with record ID X and V2 is returned. If no modifications to record ID X have yet been made via virtual clone V2, there will be no record referencing record ID X and V2, and the most up-to-date form of the record associated with record ID X will have a version ID associated with V1.

FIGS. 4A-4F include representations of virtual clones, and an associated database table, illustrating the temporal evolution of a hierarchical tree (steps (a) through (t)) with a conflict constraint applied. At the beginning (300) of FIG. 4A, a database table 230a includes attributes "FID" ("Fruit ID," which serves as a record ID and/or key to the underlying database table), "Item," "Fruit," and "Version," and a single populated record (FID=1001, Item=Pie, Fruit=Apple and Version=V1). Also at 300, virtual clones V1 and V2 (a direct descendant of V1) already exist (as represented by the hierarchical tree shown at (a)). Subsequently, at 302, a new virtual clone V3 (226) is instantiated and added to the hierarchical tree, with no changes yet made to the database table 230a. Subsequently, at 304, a request is received via V3 to change the record for Pie so that the value for Fruit is "Pear." In response to receiving this request, at 306, a new record with version V3 is added to the database table 230a. As shown in FIG. 4A, the second record associated with FID 1001 retains the value "Pie" for the Item attribute, includes "Pear" instead of "Apple" for the Fruit attribute, and has an associated version identifier of V3—the virtual clone via which the change was requested. In addition, since the conflict constraint is followed, the value for the Version attribute in the first record in the database table 230a is changed from V1 to V2 (as shown at 306), to ensure that the conflict constraint is satisfied. Note that if the conflict constraint were not in force, no such change would need to be made to the first record. Note that multiple records (as shown at 306 in FIG. 4A) can have the same FID (or "virtual primary key"), since the compound key includes both the FID and the Version attribute. In other words, the first record at 306 has a compound key of FID=1001 and Version=V2, and the second record at 306 has a compound key of FID=1001 and Version=V3, so the compound keys are still unique and distinguishable from one another.

Continuing to FIG. 4B, and subsequent to the modification of the database table 230a at 306, a query Q(Pie) is received, at 308, via V3, referencing the value "Pie." At 310, the query is modified Q(Pie, V3 or V1) so as to reference both the value "Pie" and "V3 or V1," since, similar to the discussion above, virtual clones V3 and V1 share a common ancestral line emanating and/or originating from the database 230. The modified query is then run against the database table 230a. Since the only record in database table 230 matching both "Pie" and "V3 or V1" is the record with FID 1001 and version V3, the query returns that record (as shown at 312). Thus, because the query originated from V3, records associated with V1 and V3 are searched, but not records associated with V2, which is not in the same ancestral line as V3.

Note that, in implementations that do not follow the conflict constraint at 310 in FIG. 4B, the query would not be modified. Instead, the processor would first search for a record matching the values "Pie" and "V3." If such a record is found (which it will be, in the example of 310 at FIG. 4B), that record (FID=1001; Item=Pie; Fruit=Pear) is returned and the query ends. If, however, a record were not found in database 230 matching the values "Pie" and "V3," based on the version tree, the processor will next query the database 230 for records matching the values "Pie" and "V1" (i.e., working its way up the version tree). If a record is found in database 230 with such a compound key, that record is returned and the query ends. Otherwise, the processor returns a response of "null" or "no response found."

Continuing to FIG. 4C, a further query Q(Pie) is received, at 314, via V2 and referencing an attribute value "Pie." Again, the query is modified so as to reference both the value "Pie" and "V2 or V1," Q(Pie, V2 or V1) since virtual clones V2 and V1 share a common ancestral line emanating and/or originating from the database 230. The modified query is then run, at 316, against the database table 230a. Since the only record in database table 230a matching both "Pie" and "V2 or V1" is the record with FID 1001, and version V2, the query returns that record (as shown at 318). Because the query originated from V2, records associated with V1 and V2 are searched, but not records associated with V3, which is not in the same ancestral line as V2. Accordingly, V2 and V3 can both have different versions of the same record 1001 in the database table 230a.

Continuing to FIG. 4D, a further query Q(Pear) is received, at 320, again via V2, but this time referencing an attribute value "Pear." Again, the query is modified Q(Pear, V2 or V1) so as to reference both the value "Pear" and "V2 or V1," since virtual clones V2 and V1 share a common ancestral line emanating from the database 230. The modified query is then run, at 322, against the database table 230a. Since there is no record in database table 230a matching both "Pear" and "V2 or V1," no results are returned, at 324 (e.g., a signal and/or notification is returned that no records matching the query can be found). In other words, the modification to the database table data made via V3 is not accessible via, and does not affect the queryable data of, V2.

Continuing to 326 of FIG. 4E, a request is received, at 326, via V2 to delete records with Apple for the Fruit attribute and Pie for the Item attribute from the database table 230a, and to add a record with Banana for the Fruit attribute and Bread for the Item attribute. At 328, and in response to the request received via V2 at 326, the record referencing attribute values "Apple" and "Pie" is identified, and one or more of the following is performed: the record referencing attribute values "Apple" and "Pie" is deleted from the database table 230a, its Version ID is removed (ensuring that it will not subsequently be accessible via V2), or an attribute representing a "deleted" flag is added to the database table 230a and set to "true" for that record. Also at 328, a new record, having an FID of 1002, an Item attribute value of "Bread," a Fruit attribute value of "Banana," and a Version ID of V2, is added to the database table 230a. Subsequently, at 330, a query is received via V3 searching for a record with the Item attribute having a value of Bread Q(Bread). Similar to the discussion above, the query is first modified such that it references both the Item attribute value of Bread and version ID "V3 or V1" Q(Bread, V3 or V1). Since there is no record in database table 230a matching both "Bread" and "V3 or V1," no results are returned, at 332 (e.g., a signal and/or notification is returned that no records matching the query can be found).

As demonstrated in FIG. 4E, in some implementations, a deletion of a record from the database table 230a is accomplished by eliminating the version attribute from the record (i.e., such that no subsequent queries, made via any virtual clone associated with the database table 230a, will return the record or any part thereof). Deletions can be accomplished in this manner, for example, when the record being deleted has a version ID that exists in the ancestral path to which the virtual clone requesting the deletion belongs. If, however, a request for deletion references a record having a version ID that is shared by the ancestral path of the requesting virtual clone and another path that is not requesting deletion, the deletion may be accomplished by deleting the referenced record from the database table 230a and by adding one or more new records to the database 230, the one or more new records having associated version IDs referencing the other path (or paths) that is not requesting deletion (i.e., such that the associated data remains accessible to virtual clones along the other path(s)).

In other implementations, to accomplish deletion of a record in the database table 230a, a "deleted" attribute (taking values of true or false) can be added to each record of the database table 230a, such that (1) deleting a record for a version ID that only exists on the ancestral path of the virtual clone requesting deletion is accomplished by changing the "deleted" attribute to "true" for that record, and (2) deleting a record having a version ID that is shared by the ancestral path of the virtual clone requesting deletion and another path is accomplished by: (i) defining a new record in the database table 230a with the version ID of the virtual clone requesting deletion and setting the "deleted" attribute of the newly-created record to "true"; and (ii) defining a new record in the database table 230a with the version ID of virtual clone on the other path and setting the "deleted" attribute of the newly-created record to "false."

Continuing to FIG. 4F, a request is received, at 334 and via V2, searching for a record with the Fruit attribute having a value of Banana Q(Banana). At 336, the query is modified such that it references both the Item attribute value of Banana and version ID "V2 or V1" Q(Banana, V2 or V1), and the modified query is run against the database table 230a. Since the only record in database table 230a matching both "Banana" and "V2 or V1" is the record with FID 1002 and version V2, the query returns that record (as shown at 338).

FIG. 4G shows the version tree of FIG. 4F, with the database table 230a, at 340, including records for each of virtual clones V1, V2 and V3 (and shown with record FID=1001 and Version=V1 not deleted). The database table 230a at 340 could result, for example, if the database table 230a were not implemented with the conflict constraint, and starting at 304 in FIG. 4A: (1) the request to change "Pie" from "Apple" to "Pear" resulted in an addition of the new record having FID=1001, a value for the "Fruit" attribute of "Pear" and a value for the "Version" attribute of V3 (shown at 306) and the retention of the record (shown at 304) having FID=1001, a value for the "Fruit" attribute of "Apple" and a value for the "Version" attribute of V1, and (2) a request to add Banana Bread were made via V2 (causing addition of the record having FID=1002, a value for the "Item" attribute of "Bread," a value for the "Fruit" attribute of "Banana" and a value for the "Version" attribute of V2 to the database table 230a).

Continuing with the assumption that the implementation of database table 230a at 340 does not follow the conflict constraint, a query received at V2 referencing a value, for the "Item" attribute, of "Pie," will not be modified by the processor to search both V2 and V1 at the same time. Instead, the processor would first search for a record matching the values "Pie" and "V2." Since no such record is present in database table 230a at 340, the processor will next query the database 230 for records matching the values "Pie" and "V1" (i.e., working its way up the version tree). A single record (FID=1001; Item=Pie; Fruit=Apple; Version=V1) is found in database table 230a, and that record is returned and the query ends. A similar query made to V3 would return the record (FID=1001; Item=Pie; Fruit=Pear; Version=V3) because V3 would be searched first, and since a record was identified, the query would end and would not proceed with searching V1 along the ancestral path. If, instead, a query were received at V3 for "all pies," the processor would first search the database table 230a for a record matching the values "Pie" and "V3," and would thereby identify a first record (FID=1001; Item=Pie; Fruit=Pear; Version=V3). The processor would then continue by searching V1 (along the ancestral path) for any further records including a value of "Pie" for the "Item" attribute, and would identify a second record (FID=1001; Item=Pie; Fruit=Apple; Version=V1). Since the FIDs of the first record and the second record match (e.g., as detected by the processor based on a comparison of the record FIDs), however, the record having version V1 will be excluded from the query results because the search of V3 already identified a record with FID=1001. If, instead, additional records were identified upon searching V1 matching the value "Pie" but having an FID different from 1001, those records would be returned as part of the query response.

Garbage Collection

In some implementations, a hierarchical tree (also referred to herein as a "version tree") and/or a representation of a hierarchical tree is kept and/or stored in non-transitory memory in a reduced and/or more optimal form, through a form of incremental garbage collection performed by a processor (e.g., such as processor 111 running a fast-copier 115 of FIG. 1) operably and communicably coupled to the memory. In such implementations, each node of the hierarchical tree is associated with a virtual clone and two sequence IDs that represent endpoints of a string of multiple integer sequence IDs. By way of example, a series of sequence IDs 10, 11, 12, and 13 can be represented by the sequence ID pair (10,13). A node associated only with sequence ID 42 would be designated the sequence ID pair (42, 42). As used herein, a sequence ID is defined differently from a version ID. A sequence ID relates to the sequential order in which the virtual clones of a hierarchical tree were generated. As such, a sequence ID and version ID for a particular virtual clone may have the same value, or they may differ. In some such implementations, as illustrated in diagrams (a)-(g) of FIG. 5, the version tree initially, prior to expanding to the tree at (a), includes only the single node (1,1). Each time a fast copy event triggers the creation and/or definition of a new node in the version tree, that new node is assigned a sequence ID of the next integer, in sequential order. As such, a second node added to the version tree is assigned sequence ID (2,2), and an Nth node is assigned sequence ID (N, N). As used herein, a node X has a "successor" node Y, if X is designated the sequence ID pair (A, B) and Y is designated the sequence ID pair (B+1,C). In other words, Y represents a sequence ID range that comes immediately after the sequence ID range of X. The data structure in memory (and in the database) may store, for each node of the version tree, a reference to the node(s) that is its successor. Successor relationships are represented as dashed lines in FIG. 5. Note that "succession" and "descendancy," as used herein, are different (though not mutually exclusive) concepts. For example, a node that is a successor of an earlier node is not necessarily a descendant of that earlier node (e.g., at (a) in FIG. 5, node (6,6) is a successor of node (5,5) but is not a descendant on in the ancestral path of node (5,5)), and a descendant node of an earlier node is not necessarily an immediate successor of that earlier node (e.g., at (a) in FIG. 5, node (6,6) is a descendant of node (3,3), but is not an immediate successor of node (3,3)).

In some implementations, a "sequence update" for nodes stored in memory (e.g., involving a node X and its successor Y node) (e.g., to remove redundancy from the version tree, increase performance and efficiency, reduce storage and/or resource consumption, etc.) is performed by a processor running fast-copy software (e.g., fast-copier 115, 125 of FIG. 1), the processor in operable communication with a memory storing the version tree. The sequence update is accomplished as follows: First, suppose that a node X with a sequence ID range of (A,B) has a successor Y with a sequence ID range of (B+1,C), and a sequence of nodes including nodes X and Y is to be updated. A new node Z can be defined, having a sequence ID range of (A,C) (i.e., having the first endpoint of node X and the second endpoint of node Y). Next, any relationships of other nodes in the version tree to node X or node Y (e.g., as represented by solid and dashed lines in FIG. 5) are updated such that they no longer connect to and/or refer to node X or Y, and instead connect to and/or refer to node Z. Nodes X and Y can then be removed/deleted from the version tree (and, correspondingly, either deleted from or annotated as deleted in the associated database table), thereby completing the sequence update event. In some implementations, if a sequence update results in a node having only a single child node that is also that node's successor, another sequence update can be performed, involving that node (e.g., automatically, upon detecting the condition that the node has only a single child node that is also that node's successor) and its single child node, in a manner similar to the foregoing.

In some implementations, deletion of a node X from the version tree is accomplished as follows: First, if node X has a parent node present in the version tree, the relationship (e.g., as represented by a solid line in the version tree, as shown in FIG. 5) between node X and its parent node is removed. Next, if node X has a successor node, that successor node is assigned new sequence IDs, and node X is deleted. Alternatively, if node X does not have a successor node, node X is just deleted. If the former parent node of node X now has no child nodes emanating therefrom, the former parent node is deleted. If there was a node W that had node X as a successor, and node W now has only one child node, and that child is its successor, then node W's child node is assigned new sequence IDs.

Any delete or sequence update event described above may result in a node newly having no children, and so may trigger another delete. Alternatively or in addition, any delete or sequence update event described above may result in a new node having a single child node that is its successor, and so may trigger another sequence update event. There can therefore be a cascade of sequence updates and deletes caused by a single sequence update or delete. In some implementations, a system of the present disclosure is configured to perform cascading-type garbage collection, and other forms of garbage collection are not performed on the version tree. The incremental garbage collection methods described herein (and executed by a processor) can automatically recognize and execute/implement/cause possible/ permissible simplifications (or a predefined subset thereof) in a version tree to be made (e.g., substantially continuously and/or in substantially real-time). A representation of the revised/simplified version tree (e.g., the version tree of FIG. 5(e), which will replace the version tree of FIG. 5(d)) can then be stored in memory for later access.

In some implementations, a deletion event can trigger the incremental garbage collection process. For example, if the version tree is represented as shown in FIG. 5(a), the dashed arrows represent references to successor nodes. In some implementations of a fast-copyable database, only the leaf nodes can be deleted. In other words, the fast-copy software can be configured to delete a "version" only if that version is associated with a "leaf" node. A "leaf node" is defined as a node that has no children (where child nodes are represented by solid lines in FIG. 5). The dashed lines are to be disregarded during the identification of leaf nodes.

Suppose that a user requests deletion of leaf node (5,5), shaded gray at (a) of FIG. 5. The version tree, after deletion of leaf node (5,5), appears as shown at (b) of FIG. 5. The version tree of (b) is the result of a sequence update in which node (6,6) is assigned sequence ID pair (5,6), then updating node (4,4) to reference node (5,6)) as its successor (as represented by the dashed line connecting node (4,4) with node (5,6). Note that the parent node of former node (5,5), which is (2,2), still has a child node (node (4,4)) and does not have its successor node (node (3,3)) as its only child, so the deletion process stops with the version tree shown at (b) of FIG. 5.

Next, suppose that the user requests deletion of node (4,4) (shaded gray at (b) in FIG. 5). This request to delete node (4,4) can trigger several actions. First, since node (4,4) has a parent node (2,2), the relationship between node (2,2) and node (4,4), represented by a solid line in (b) of FIG. 5, is removed. Also, a sequence update is performed such that node (5,6) is assigned sequence ID pair (4,6), as shown at (c) of FIG. 5, now with an updated successor relationship between node (3,3) and node (4,6) (node (4,6) being a successor of node (3,3)). As a consequence of the foregoing actions, node (2,2) no longer has any children nodes (as shown at (c) of FIG. 5). As such and/or in response to this condition, and due to the fact that queries can no longer be made via node (2,2) (as a result of the descendant nodes of node (2,2) having previously been generated, prior to their removal), the deletion process can "cascade" by automatically continuing with the deletion of node (2,2), leading to the version tree as shown at (d) of FIG. 5. At this stage, node (1,1) has only one child (node (2,3)), and that child is its successor node. Accordingly, as discussed above, a sequence update can be performed such that the child node (2,3) is assigned a new sequence ID pair (1,3), resulting in the version tree as shown at (e) of FIG. 5, at which point the cascading ends. In other words, the version tree as shown at (e) of FIG. 5 is the final result of the user's request to delete node (4,4).

Now suppose the user chooses to delete the leaf node (4,6) (shaded gray at (e) of FIG. 5). This deletion event will result in a transformation of the version tree, such that it appears as shown at (f) of FIG. 5, which itself automatically triggers a final sequence update, such that node (4,7) (the child node of node (1,3)) is assigned a new sequence ID pair (1,7), yielding the final result (sole node (1,7)) shown at (g) of FIG. 5. As the garbage collection proceeds, corresponding changes to the associated database table can be made, for example, such that at (g) of FIG. 5, all records include the same version attribute (e.g., "7"). Prior to the stage in which only one node remains (e.g., at (g) of FIG. 5) (i.e., as the version tree is "garbage collected" and reduced in size), records of the database table (e.g., such as database table 230a of FIGS. 4A-4G) can be modified such that they refer to a surviving node, or can be deleted (e.g., in response to the deletion of a node that is uniquely associated with that record).

FIG. 6 is a process flow diagram for a processor-implemented garbage collection (or cascading deletion) method 400 for a fast-copy database, according to an embodiment. As shown in FIG. 6, the method 400 begins with the generation, at 430, of a hierarchical tree of virtual clones. An instruction is subsequently received, at 432, to delete a second virtual clone from the hierarchical tree of virtual clones. In response to the instruction to delete the second virtual clone, at 434, a successor relationship of a third virtual clone is modified. Also in response to the instruction to delete the second virtual clone, at 436, the second virtual clone is deleted. At 438, the processor evaluates whether a first virtual clone of the hierarchical tree of virtual clones has a remaining child virtual clone after the deletion of the second virtual clone. If the first virtual clone of the hierarchical tree of virtual clones does have a remaining child virtual clone after the deletion of the second virtual clone, but that child is not its successor, the process ends. If the first virtual clone of the hierarchical tree of virtual clones does have a remaining child virtual clone after the deletion of the second virtual clone, and that child is its successor, a sequence update can be performed, as discussed above. If the first virtual clone of the hierarchical tree of virtual clones does not have a remaining child virtual clone after the deletion of the second virtual clone, the first virtual clone is deleted, at 440, from the hierarchical tree of virtual clones.

FIG. 7 is a process flow diagram for a further processor-implemented garbage collection (or cascading deletion) method 500 for a fast-copy database, according to an embodiment. As shown in FIG. 7, the method 500 begins with the generation, at 530, of a hierarchical tree of virtual clones. An instruction is subsequently received, at 532, to delete a first virtual clone from the hierarchical tree of virtual clones. In response to the instruction to delete the first virtual clone (e.g., node (4,4) of FIG. 5), and at 534, a successor relationship of a second, successor virtual clone (e.g., node (5,6) of FIG. 5) is modified. At 536, the first virtual clone is deleted. A successor relationship of a fourth virtual clone (e.g., node (3,3) of FIG. 5) is then modified, at 538, where the fourth virtual clone is a successor of a third virtual clone (e.g., node (2,2) of FIG. 5) that is an ancestor of the first virtual clone. The third virtual clone is then deleted, at 540.

Figure 8A:
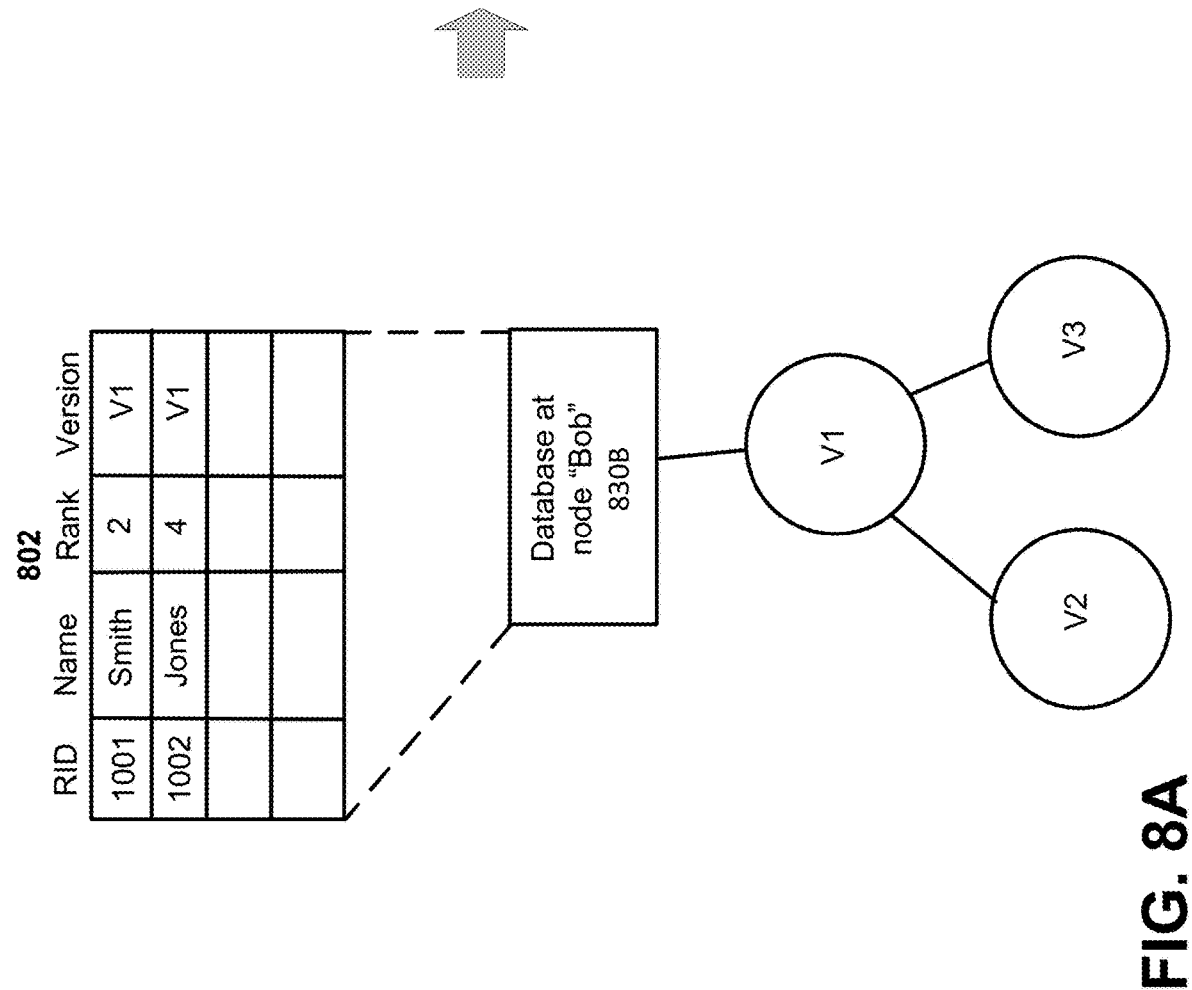
Figure 8A:
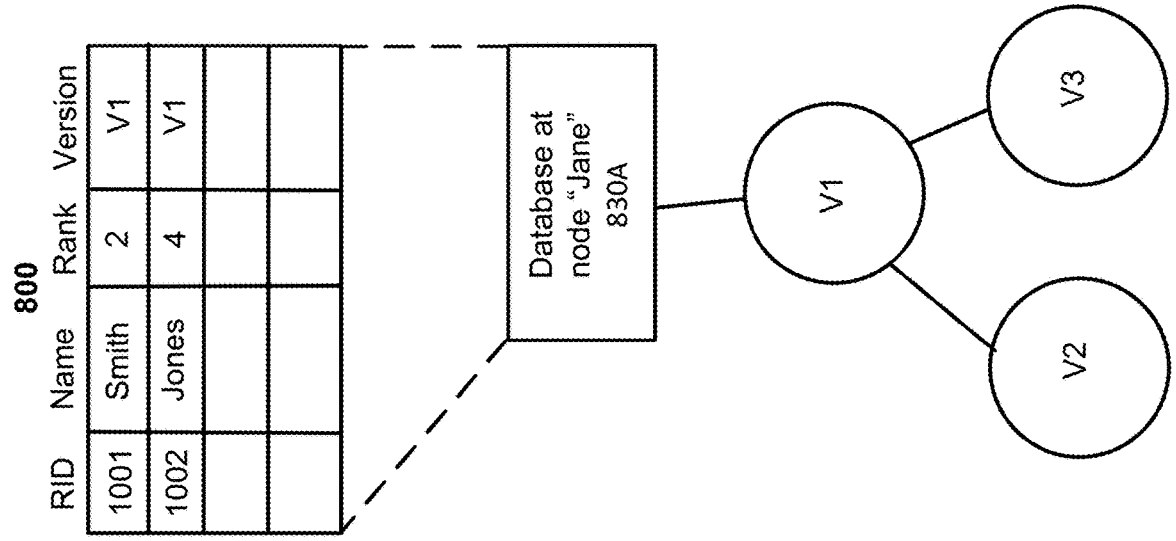

FIGS. 8A-8D are diagrams illustrating an example implementation of a fast-copy database system, according to an embodiment. As shown in FIG. 8A, at 800 (and at an initial time, t=0), a first instance of a database at node "Jane" 830A, forms part of a hierarchical tree including three virtual clones, V1, V2 and V3, depending from the database instance 830A. The database instance at node Jane 830A includes a database table with attributes RID, Name, Rank and Version. There are, at 800, two populated records in the database table—one with Name=Smith and one with Name=Jones. The virtual clone V1 at 800 may be associated with a previous, "first" consensus event. The virtual clone V2 at 800 may be used for making real-time or substantially real-time edits to the database table of database 830A (e.g., such that the database table reflects ongoing tallies or states as new data, such as transaction data, is received), while the virtual clone V3 at 800 may be reserved for making post-consensus edits to the database table of database 830A. Also shown in FIG. 8A, at 802 (and at the initial time, t=0), is a second instance of the database at node "Bob" 803B, which forms part of another hierarchical tree, also including two virtual clones, V1 and V2, each a direct dependent of the database instance 830B. The database instance at node Bob 830B also includes a database table with attributes RID, Name, Rank and Version. There are, at 802, two populated records in the database table 830B—one with Name=Smith and one with Name=Jones. In other words, at a first time t=0, database tables of the database instances at nodes Jane 830A and Bob 830B contain the same records. Note that each of the records in the database tables at node Jane 830A and at node Bob 830B includes a value for the version attribute of V1. The virtual clone V1 at 802 may be associated with a previous, "first" consensus event, which triggered the generation of new child virtual clones V2 and V3. The virtual clone V2 at 802 may be used for making real-time or substantially real-time edits to the database table of database 830B, while the virtual clone V3 at 802 may be reserved for making post-consensus edits to the database table of database 830B.

In FIG. 8B, a synchronization event occurs, during which data (also referred to herein as an "event," e.g., transaction data, which may be received in real-time or substantially real-time, concurrently with the transactions to which they pertain) is exchanged between two or more of node Jane 830A, node Bob 830B, and optionally one or more additional nodes in network communication with node Jane 830A and/or node Bob 830B. During the synchronization, node Jane 830A receives, at a first time, a first event specifying that the value for the attribute "Rank," for the record with a value for the attribute "Name" of "Smith," is to be incremented by 1. In response to receiving the first event, the processor at node Jane 830A generates a new record for "Smith" and including, in that record, a value for the attribute "Version" of V2, a value for the attribute "RID" of 1001, and a value for the attribute "Rank" of 2+1=3 (not shown). Also in response to receiving the first event, the processor at node Jane 830A modifies the first record in the database table such that the value for the version attribute is V3 instead of V1. Also during the synchronization (either during the same or during a separate synchronization event), node Jane 830A receives, at a second time after the first time, a second event specifying that the value for the attribute "Rank," for the record with a value for the attribute "Name" of "Smith," is to be changed to 10. In response to receiving the second event, the processor at node Jane 830A modifies the record having a value for the Name attribute of "Smith" and a value for the Version attribute of "V2," such that the record has a value for the attribute "Rank" of 10 (as shown at 804 in FIG. 8B).

During the synchronization (the same or separate synchronization event as node Jane 830A), node Bob 830B receives the first and second events, but in an opposite order as Jane 830A received the events. More specifically, node Bob 830B receives at a first time, a first event specifying that the value for the attribute "Rank," for the record with a value for the attribute "Name" of "Smith," is to be changed to 10. In response to receiving the first event, the processor at node Bob 830B generates a new record for "Smith" and including, in that record, a value for the attribute "Version" of V2, a value for the attribute "RID" of 1001, and a value for the attribute "Rank" of 10 (not shown). Also in response to receiving the first event, the processor at node Jane 830A modifies the first record in the database table such that the value for the version attribute is V3 instead of V1. Also during the synchronization (either during the same or during a separate synchronization event), node Bob 830B receives, at a second time after the first time, a second event specifying that the value for the attribute "Rank," for the record with a value for the attribute "Name" of "Smith," is to be incremented by 1. In response to receiving the second event, the processor at node Bob 830B modifies the record having a value for the Name attribute of "Smith" and a value for the Version attribute of "V2," such that the record has a value for the attribute "Rank" of 11 (as shown at 806 in FIG. 8B).

Events/data (such as transaction data) received via V2 at node Jane and at node Bob can be stored in associated memories of node Jane and at node Bob, respectively, for example in a distributed acyclic graph (DAG), a hashgraph, a data chain, a blockchain, or any other suitable data structure or format. Additional implementation details, including compatible data structures, are set forth in U.S. Pat. No. 9,646,029, the entire content of which is incorporated herein by reference for all purposes.

Figure 8C:
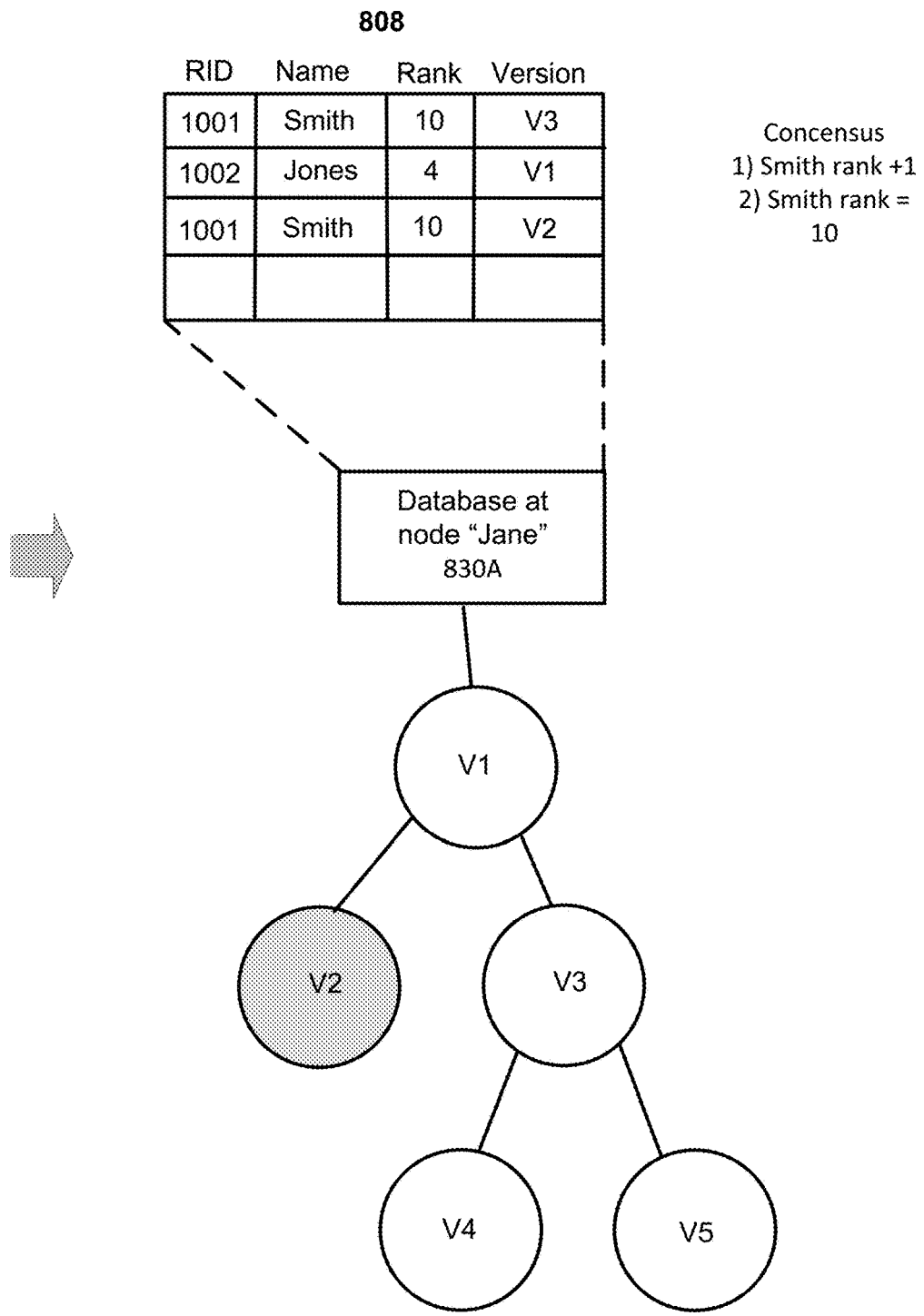

After the synchronization event(s), and as shown at 808 in FIG. 8C, the processors of nodes Jane 830A and Bob 830B reach a consensus (e.g., as a result of the implementation of consensus instructions, such as consensus instructions 116 and 126 in FIG. 1). In other words, a consensus algorithm implemented by a processor of node Jane 830A (running the fast-copy software, stored in that node's memory) and a consensus algorithm implemented by a processor of node Bob 830B (e.g., running the fast-copy software, stored in that node's memory) detects and/or determines that consensus has been reached. Consensus can be reached under one or more of the following conditions, by way of non-limiting example: when a "round" defined by the consensus algorithm has completed, when a predetermined amount of time has elapsed since the hierarchical tree was initiated, when a predetermined amount of time has elapsed since the previous consensus event, when a predetermined number of votes have been received from other nodes for a given record of the database table of that node, when a predetermined number of synchronization events have occurred, etc. As shown in FIG. 8C, the result of consensus was that the correct ordering of the received events is that the rank for Smith was incremented first, and was changed to a value of 10 second. As such, the correct current value for the Rank attribute for the record having a value for the Name attribute of Smith and a value for the version attribute of V2 is "10." Similarly stated, the Rank value for this record is updated via V3 to be "10", as shown at 808. As a consequence of the consensus being reached, a new pair of virtual clones, V4 and V5, depending/descending from virtual clone V3, are generated. Newly-generated virtual clone V4, at 808, can then subsequently be used for making real-time or substantially real-time edits to the database table of the database instance at node Jane 830A, while the virtual clone V5 at 808 may be reserved for making post-consensus edits to the database table of the database instance at node Jane 830A. In other words, new virtual clones V4 and V5 can perform the functions previously performed by virtual clones V2 and V3, respectively. Note that in some implementations, once virtual clones V4 and V5 have been generated, edits to the database table can no longer be made via virtual clone V3 (even if virtual clones V4 and V5 are subsequently deleted).

Figure 8D:
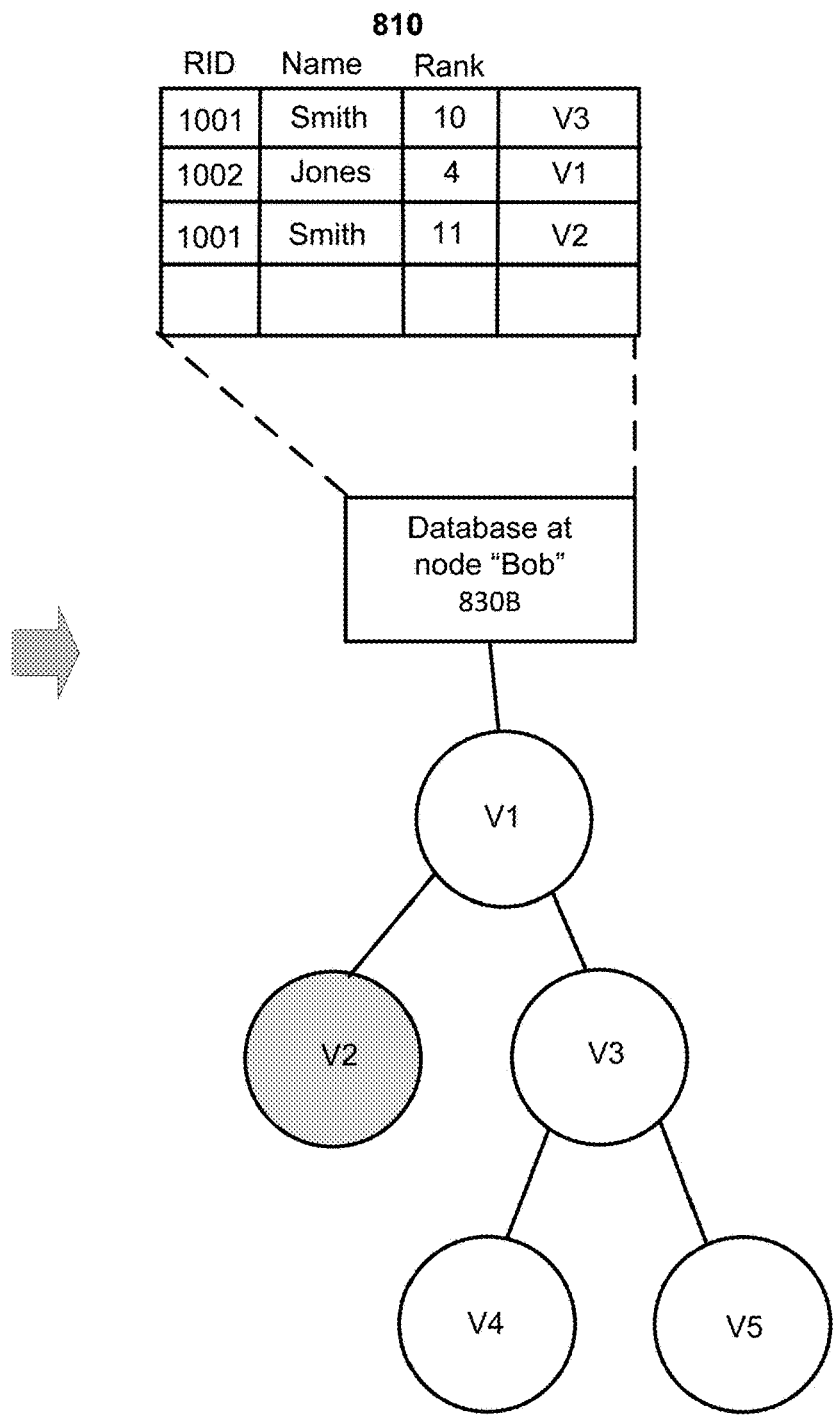

Similar to the discussion of FIG. 8C, at FIG. 8D, node Bob 830B reaches the consensus (e.g., as a result of the implementation of consensus instructions, such as consensus instructions 116 and 126 in FIG. 1). In other words, a consensus algorithm implemented by a processor of node Jane 830A (e.g., running the fast-copy software, stored in that node's memory) and a consensus algorithm implemented by a processor of node Bob 830B (running the fast-copy software, stored in that node's memory) detects and/or determines that consensus has been reached. As shown in FIG. 8D, the database table of the database instance at node Bob 830B now reflects the correct current value for the Rank attribute for the record having a value for the Name attribute of Smith and a value for the version attribute of V2 as "10." Similarly stated, the Rank value for this record is updated via V3 to be "10", as shown at 810. Similar to the discussion of FIG. 8C, and as a consequence of the second consensus being reached, a new pair of virtual clones, V4 and V5, depending/descending from virtual clone V3, are generated. Newly-generated virtual clone V4, at 808, can then subsequently be used for making real-time or substantially real-time edits to the database table of the database instance at node Bob 830B, while the virtual clone V5 at 808 may be reserved for making post-consensus edits to the database table of the database instance at node Bob 830B. In other words, new virtual clones V4 and V5 can perform the functions previously performed by virtual clones V2 and V3, respectively. Note that in some implementations, once virtual clones V4 and V5 have been generated, edits to the database table can no longer be made via virtual clone V3 (even if virtual clones V4 and V5 are subsequently deleted).

Although FIGS. 8A-8D show and describe consensus as determining a correct ordering of events (e.g., transactions) to ensure the accuracy of a running "balance," "tally," or "state" of a record in the database table, alternatively or in addition, consensus can be used to determine a correct ordering of events for the purpose of one or more of: determining a current owner of an asset, determining a correct ordering of records within the database table, determining a chain-of-custody or chain-of-title title of a good, etc.

In some embodiments set forth herein, an apparatus (e.g., compute device 110 and/or compute device(s) 120 of FIG. 1) includes a processor and a memory in electronic communication with the processor. The memory (e.g., memory 112 and/or memory 122 of FIG. 1) stores a database table including a multiple records, with each record from the multiple records including a compound key having a version identifier. The memory includes instructions executable to cause the processor to generate a first virtual clone of the database table and a second virtual clone of the database table. The memory also includes instructions executable to cause the processor to receive a query at the first virtual clone, and to modify the query to define a modified query including a version identifier associated with the first virtual clone based on receiving the query at the first virtual clone. The memory also includes instructions executable to cause the processor to query the database table using the modified query to generate a response including a set of records from the multiple records based on: (1) each record from the set of records satisfying the query; and (2) each record from the set of records having a version identifier associated with an ancestral path of the version identifier associated with the first virtual clone. The memory also includes instructions executable to cause the processor to send the response, including the set of records, as a response to the query. In some such embodiments, the compound key for each record from the multiple records includes the version identifier for that compound key and a data portion. The multiple records can be configured such that only one of: (1) a compound key including a value of the data portion and the version identifier associated with the first virtual clone; or (2) a compound key including the value of the data portion and the version identifier associated with the second virtual clone, is present in the database table at any given time.

In some embodiments, the memory also includes instructions executable to cause the processor to add, in response to an insert instruction received via the first virtual clone, a record to the database table. The record includes data and a compound key having a version identifier associated with the first virtual clone such that: (1) a query subsequently received at the first virtual clone and referencing the data returns the record; and (2) a query subsequently received at a third virtual clone for the data does not return the record.

In some embodiments, the memory also includes instructions executable to cause the processor to add, in response to an instruction to update a value of a field of a first record of the database table from a first value to a second value and received via a third virtual clone, a second record to the database table. The second record includes the second value and a compound key having a version identifier associated with the third virtual clone. The instructions can further be executable to modify, in response to the instruction to update the value of the field of the first record, a compound key of the first record to not include the version identifier associated with the third virtual clone such that a query subsequently received at the third virtual clone and referencing the field returns the second record, and a query received at the first virtual clone and referencing the field returns the first record.

In some embodiments, the memory also includes instructions executable to cause the processor to modify, in response to an instruction to delete a record from the multiple records and received via a third virtual clone, the version identifier of the compound key of the record to not include a version identifier associated with the third virtual clone such that a query for the record, subsequently received at the third virtual clone, does not return the record, and a query for the record, subsequently received at the first virtual clone, returns the record.

In some embodiments, the response is a first response, and the modified query is a first modified query. The instructions can further be executable to cause the processor to generate a second modified query including a version identifier of the second virtual clone if the first response is null, the second virtual clone being an ancestor to the first virtual clone. The instructions can further be executable to cause the processor to query the database table using the second modified query to generate a second response including a set of records from the multiple records based on: (1) each record from the set of records of the second response satisfying the second modified query; and (2) each record from the set of records of the second response having a version identifier associated with an ancestral path of the version identifier of the second virtual clone, and send the second response, including the set of records, as a response to the query.

In some embodiments, the instructions are further executable to cause the processor to store, in the memory, an indication that the first virtual clone is a descendant of the second virtual clone.

In some embodiments, the instructions are further executable to cause the processor to generate a third virtual clone of the database table, the third virtual clone being neither an ancestor nor a descendant of the first virtual clone, the multiple records including a record having a compound key including the value of the data portion and the version identifier associated with the third virtual clone.

In some embodiments, an apparatus includes a processor and a memory in electronic communication with the processor. The memory stores a database table and processor-executable instructions. The processor-executable instructions include instructions to cause the processor to generate a hierarchical tree including representations of multiple virtual clones of the database table, the multiple virtual clones including a first virtual clone (e.g., node (2,2) of FIG. 5), a second virtual clone (e.g., node (4,4) of FIG. 5) that is a child virtual clone of the first virtual clone, and a third virtual clone (e.g., node (5,6) of FIG. 5) that is a successor virtual clone of the second virtual clone. The processor-executable instructions also include instructions to cause the processor to modify a successor relationship associated with the third virtual clone, in response to an instruction to delete the second virtual clone. The processor-executable instructions also include instructions to cause the processor to delete the second virtual clone, in response to the instruction to delete the second virtual clone. The processor-executable instructions also include instructions to cause the processor to delete, in response to the instruction to delete the second virtual clone, the first virtual clone from the multiple virtual clones when the first virtual clone does not have a child virtual clone after the deletion of the second virtual clone.

In some embodiments, the multiple virtual clones further includes a fourth virtual clone that is a successor virtual clone of the first virtual clone. The instructions are further executable to cause the processor to modify a successor relationship associated with the fourth virtual clone, in response to: the instruction to delete the second virtual clone; and a determination that the fourth virtual clone is a sole descendant of the first virtual clone after deletion of the second virtual clone.

In some embodiments, the instructions are further executable to cause the processor to automatically identify a fourth virtual clone from the multiple virtual clones and that does not have a child virtual clone, and to delete the fourth virtual clone based on the automatic identification. Alternatively, the instructions can be further executable to cause the processor to automatically identify a fourth virtual clone from the multiple virtual clones and that does not have a child virtual clone, and, in response to the automatically identifying, (1) modify a successor relationship associated with a fifth virtual clone from the multiple virtual clones, and (2) delete the fourth virtual clone.

In some embodiments, the instructions are further executable to cause the processor to trigger a deletion of at least one further virtual clone from the multiple virtual clones in response to modifying the successor relationship associated with the third virtual clone.

In some embodiments, the successor relationship is a first successor relationship and the memory further stores multiple successor relationships including the first successor relationship.

In some embodiments, the database table includes multiple records and each record from the multiple records includes a compound key including a version identifier associated with a virtual clone from the plurality of virtual clones.

In some embodiments, an apparatus includes a processor and a memory in electronic communication with the processor. The memory stores a database table and instructions executable to cause the processor to generate a hierarchical tree including representations of multiple virtual clones of the database table. The instructions can also be executable, in response to an instruction to delete a first virtual clone (e.g., node (4,4) of FIG. 5) from the multiple virtual clones, to modify a successor relationship associated with a second virtual clone (e.g., node (5,6) of FIG. 5), the second virtual clone being a successor virtual clone of the first virtual clone, delete the first virtual clone, modify a successor relationship associated with a fourth virtual clone (e.g., node (3,3) of FIG. 5), the fourth virtual clone being a successor virtual clone of a third virtual clone (e.g., node (2,2) of FIG. 5), the third virtual clone being an ancestor virtual clone of the first virtual clone, and delete the third virtual clone.

In some embodiments, the instructions are further executable to cause the processor to detect that the second virtual clone is a sole descendant virtual clone and a successor virtual clone of the fourth virtual clone, and to delete the second virtual clone in response to detecting that the second virtual clone is the sole descendant virtual clone and the successor virtual clone of the fourth virtual clone.

In some embodiments, the database table includes multiple records and each record from the multiple records includes a compound key including a version identifier associated with a virtual clone from the multiple virtual clones.

In some embodiments, the instructions are further executable to cause the processor to trigger a deletion of at least one further virtual clone from the multiple virtual clones in response to the instruction to delete the first virtual clone.

In some embodiments, the instructions are further executable to cause the processor to automatically identify a fifth virtual clone from the multiple virtual clones and that does not have a descendant virtual clone. The instructions can also be executable, in response to the automatically identifying, to modify a successor relationship associated with a sixth virtual clone, and to delete the fifth virtual clone.

In some embodiments, the memory further stores multiple successor relationships including the successor relationship associated with the second virtual clone and the successor relationship associated with the fourth virtual clone.

In some implementations, a conflict constraint ensures that if a record exists in the table with a given compound key, such as (1001, N), then the table will not contain any record with a compound key of (1001, M), where M is a version number that is an ancestor of N in the version tree. For example, if the version tree is as shown in FIG. 8C, and if there is a record with key (1001, 4), then there is guaranteed to not be any records with key (1001, V3) or key (1001, V1). There could, however, be a record with key (1001, 2), because V2 is not an ancestor of V4 in the tree.

In some implementations, each record/row of a database table initially includes a version ID of 1. The database table can then grow and shrink as a result of operations that perform a fast-copy, addition, deletion, or modification, as described herein.

In some implementations, a delete operation can be performed as follows. A SQL query received via a virtual clone (or "view") can reference one or more records for deletion. Each such record can be deleted as follows: If a record has version N, then that record is deleted. Next, for each virtual clone along the direct ancestral path from the view to the "root" of the hierarchical tree (i.e., the database table instance), if there are children of those virtual clones that are not on the direct ancestral path, a copy of the deleted record with its version changed to M is added to the database table of those children. For example, given the hierarchical tree of FIG. 4B, if a record with key (Pie, V2) is deleted through V2, then the record is deleted from the table. If a record with key (Pie, V1) is deleted through V2, then the record is deleted, and a copy of the record with version V3 is added to the table, because V3 is a child of V1, and is not on the direct ancestral path from the database 230 to V2. Note that this delete operation ensures that a subsequent read through V2 will not return any record with virtual primary key Pie, and that subsequent reads through V3 will return the same result as before the deletion, once the version number has been removed from the result. In addition, when such delete operations are performed on a table satisfying the conflict constraint, the modified table will continue to satisfy the conflict constraint.

In some implementations, if a deletion instruction instructs deletion of one record and the addition of K new records with different versions, with K>0, this can be implemented by changing the version number of the record to one of the new version numbers, then making K−1 copies (each with a different version number). This optimization saves one addition, which can be beneficial (e.g., increase efficiency of the database) if executing modifications is faster than executing additions for the underlying database.

In other implementations, a Boolean attribute "deleted" can be added to each record. As an example, given the hierarchical tree of FIG. 4B, if a record to be deleted via V2 has a version V2, the deleted attribute for that record can be changed from false to true. If, however, the record to be deleted via V2 has a version 1, the processor can create and/or define a new copy of the record with version V2 and the deleted attribute set to true. If the table does not need to satisfy the conflict constraint, the record with version V1 can remain with its deleted attribute set to false. If, however, the table does need to satisfy the conflict constraint, another copy of the record with version V3 and the deleted attribute set to false can be created and/or defined, and the record with version V1 can be removed from the table.

In some implementations, an insert operation (i.e., to insert a record into the database table) is performed by first performing a deletion of a record matching the virtual primary key of the to-be-inserted record, then inserting the new record with the version number that is the parent of the virtual clone through which an insert instruction triggering the insert operation was received. For example, given the hierarchical tree of FIG. 4B, if a SQL query including an insert instruction (e.g., instructing the insertion of a new record with a virtual primary key value of "Blackberry") is received via V2, the query can be modified to first find and delete any record accessible via V2 (i.e., any record having a value for the version attribute that corresponds with a virtual clone in the ancestral path of V2, i.e., V2 or V1) with the virtual primary key Blackberry, then add a new record with compound key (Blackberry, V2). Note that this addition operation preserves compliance with the conflict constraint.

In some implementations, an insert operation is performed (i.e., a process in response to a request to insert a record into a database table) by first performing a read (or query) of the database table using that virtual primary key. If, during the read, a result is returned that matches the to-be-inserted record, an error message may be returned in response to the request to insert the record. If, on the other hand, no result is returned that matches the to-be-inserted record, the record is inserted into the database table with the version number that is the parent of the virtual clone that received the request. For example, given the hierarchical tree of FIG. 4B, if a SQL insert operation through V2 would insert a record with virtual primary key Blackberry, this insert operation is modified to first perform a read for any record with virtual primary key Blackberry and a value for the version attribute of V2 or V1, using the read operation described above. If the query returns any results to the read, then the processor returns an error message in response to the insert operation, because this is an attempt to add a duplicate record associated with a common ancestral path. If the query does not return a result to the read, then the processor adds the record with compound key (Blackberry, V2). Note that this insert operation preserves compliance with the conflict constraint.

In some implementations, a modification operation on a record X can be implemented by first deleting the old version of X, as described above, then adding/inserting the modified version of X, as described above. Since both deletion and insertion preserve compliance with the conflict constraint, the modification operation also preserves compliance with the conflict constraint.

In some implementations, a version tree, such as the hierarchical tree of FIG. 4B, can be described in a separate table that is added to or associated with the database. The fast-copy database system can also cache that the version tree information in memory, for example so that queries can be translated quickly.

If the version tree is a long chain, with a small tree at the bottom, then the version comparisons can be simplified. For example, instead of comparing the version to a long list of acceptable versions, a subset of that list can be used for the comparison, e.g., by specifying "version<80", rather than a long list of version numbers that are all less than 80. Alternatively, ranges can be used, such as, for example, selection "10<version and version<15" instead of explicitly searching on "version=11 or version=12 or version=13 or version=14". The foregoing can be performed, for example, by parsing the string that represents the original SQL query, modifying the resulting parse tree, then converting back to a string before passing the string on to the actual database.

Alternatively, in other instances the underlying database may support views and stored procedures. If so, then when a fast-copy of the database is created, a view can be defined for each table, which ensures that selections from that version of the table will be performed as defined above. A stored procedure can be created so that writes to the view will convert to the record copying described above.

In some implementations, a system for fast-copyable relational databases (e.g., accessed from Java) includes a user program (e.g., written in Java) that sends SQL queries to the fast copyable database platform (e.g., also written in Java), which translates them before sending them on to the actual database. Suppose, for example, a relational database has the following table, named "people":

| people: | | | |
|---|---|---|---|
| id | name | age | state |
| 123 | Alice | 20 | AZ |
| 456 | Bob | 30 | OH |
| 789 | Carol | 40 | CO |

The virtual primary key is id_, and there are 3 other attributes: name, age, and state. The fast copyable database system (e.g., executing a fast copyable database process via a processor) can convert this to a fast copyable table, by adding one hidden attribute, version_, and adding an underscore to the other attributes and table name:

| people_: | | | | |
|---|---|---|---|---|
| id_ | name_ | age_ | state_ | version_ |
| 123 | Alice | 20 | AZ | 1 |
| 456 | Bob | 30 | OH | 1 |
| 789 | Carol | 40 | CO | 1 |

This new table has a compound key, (id_, version_), and id_ can be referred to as the virtual primary key, as noted above. So it is now possible for two records to have the same id_, as long as their version_ is different. The above example complies with the conflict constraint, and operations with this example can preserve that compliance. If some other table had a foreign key of id, the foreign key will remain unchanged, except that the foreign key will match with the attribute named id_ instead of id. Originally, the foreign key linked to the virtual primary key people.id, which means the foreign key linked to at most a single record in the people table. But now, when the foreign key is used in a query, the foreign key may match the id_ of several records, and so the foreign key will be interpreted as linking to the single record out of that set of records, that has a version that is an ancestor of the view being used to perform the query. In instances that comply with the conflict constraint, there cannot be two such records, because that would violate the conflict constraint. As such, the linking of foreign keys can be compatible with the fast copyable database.

In some implementations, a restriction on the names of tables and attributes created by the user can be enforced. For example, a rule can be implemented that specifies that names and/or attributes have a length of, at most, one character shorter than a typical table/attribute size of the underlying database (e.g., a maximum size of 79 characters instead of 80 characters, or a maximum size of 63 characters instead of 64 characters). Alternatively or in addition, a rule can be implemented that specifies that names and/or attributes cannot end in an underscore. This allows the tables and attributes to be renamed. This also allows the original table name to be used as a view with stored procedures, if it is useful for the specific implementation.

Now suppose, for example, the system (or processor) performs a fast copy operation on version 1, to create versions 2 and 3 (as shown below). The user code (executed by a processor) can provide a version number with each SQL query, both for reads and writes, and that version number will be the version of a leaf in the version tree. At this point, the user code (executed by a processor) can no longer directly read or write version 1, because the reads and writes are done at a leaf of the version tree. The system now looks as shown in FIG. 9A, where operations are described as taking place through the leaf virtual clones (circles).

The fast copy operation didn't change the table at all. It just changed the version tree, which is shown at the right, and which is stored in a special table, which in some implementations could be named versions (e.g., with two underscores at the end), which is not shown here, but which includes two attributes: parent and child.

In some implementations, a user program creates a string, which is a SQL query to be sent to one particular version of the database. The system will parse that string, modify the resulting parse tree, then convert it back to a string, and send that modified string to the actual database as a SQL query. As such, from the user's perspective, it appears as if they are reading/writing to one of many databases copies, when they are actually reading/writing to the single, combined database that represents the fast-copies.

Suppose the user (e.g., using the processor) adds a new record for Dave via virtual clone 3. That will result in the database table shown in FIG. 9B.

Now, queries through version 2 will ignore (i.e., not detect) the newly-created record for Dave, but queries through version 3 will see Dave. Suppose that the user (e.g., using the processor) now performs a fast copy of version 3, yielding the database table shown in FIG. 9C.

The Dave record includes a value for the attribute "version" of 3, so it will be returned by queries made via virtual clones 4 and 5, but not by queries to virtual clone 2. Suppose the user (e.g., using the processor) then changes Bob to Bobbie through virtual clone 2. The resulting database table is as shown in FIG. 9D.

Note that this "change" is implemented as a deletion followed by two additions. The original record (Bob, 1) is deleted, and a copy of the record is added with a version of 3, because 3 is a child of a node on the path from 2 to 1, but is not itself on that path. Then the new record with the change is added with a version of 2, because the record is being modified through virtual clone 2.

There are now two records with id_=456. The copy of the old record is now version 3, and so is still visible to 4 and 5, just as it was before the operation. The new record is version 2, and is visible only via virtual clone 2, because the change was made through version 2. Now, suppose the user (e.g., using the processor) deletes Carol through virtual clone 4. The resulting database table is as shown in FIG. 9E.

This deleted the original (Carol, 1) record, then added two copies of the record with versions 2 and 5, because 2 and 5 are the nodes that are children of nodes on the path from 4 to 1, but are not themselves on that path.

In summary, in some instances, operations performed through virtual clone V are performed as follows:

Delete record: delete the original record with version N, but insert copies of the original record for every child of a node on the path from virtual clone V to virtual clone N that is not itself on that path.

Add record: to avoid duplicate records being associated with the same ancestral path, a previous record, including at least one value (e.g., virtual primary key) common to the to-be-added record and within the same ancestral path, may first be deleted, followed by the addition of the record with version V.

Add record (optional variant): first ensure a read wouldn't return any record with that virtual primary key, then return an error if it would, otherwise add the record with version V.

Modify record: delete the old record, then add the modified version of the record.

Queries, Joins, etc.: for operations involving foreign keys, such as joins, perform them normally, but only join records from two tables where those records have version numbers that would be within the same ancestral path, such that they are accessible via virtual clone V.

Create/Delete a table: ensure the user chose a legal name of the table (short enough, with the last character not underscore), then add an underscore to the table name. Add the version_ attribute.

Create/Delete an attribute: ensure the attribute name is short enough and doesn't end in an underscore, then add an underscore.

Queries of the database table include a version number. In some instances, there is a method (e.g., executed by a processor) to fast-copy a virtual clone. In some instances, there is also a method (e.g., executed by a processor) to delete a virtual clone. In some implementations, the user may only delete a virtual clone if it is a leaf. If a deletion of a virtual clone leaves an interior virtual clone without any children, then that virtual clone can be deleted as well. In such an instance, a non-leaf virtual clone does not become a leaf. It just disappears as soon as its children are deleted. Over time, this may cause the tree to appear as a chain of single-child virtual clones going from the root down to a deep level, after which there is a small tree with just a few branches and a few nodes. These single-child virtual clones can waste space and time, without contributing.

In some instances, periodically (or sporadically), the system can execute a compression operation (e.g., executed by a processor) to eliminate such single-child versions. For example, if virtual clone 42 has only a single child, which is virtual clone 99, then an operation (e.g., executed by a processor) can be performed on the tables, changing each version attribute value of 42 to a 99, and a sequence update involving the two virtual clones in the tree can be performed, the result being represented as a single virtual clone with version 99.

Although the database may be accessed by several virtual clones, it is acceptable to protect the entire database with a single rule, for example specifying that only one virtual clone's query is processed at a time, and/or that no queries are processed during compression operations. Even before the compression operation is performed (e.g., by a processor), queries can be optimized to reflect long chains within the tree. For example, when a query is performed on version V=99, and if the ancestors of version V=99 are the versions {1, 10, 12, 20, 23, 32, 42}, then the query can be modified (e.g., by a processor) to restrict itself to records with any of those 7 versions. However, if there are no other vertices in the tree with numbers below 23, then the query can be simplified (e.g., by a processor) to ask for {<=23, 32, 42}. In other words, it would ask for records that have version 42 or version 32 or any version number less than or equal to 23. Similarly, if the applicable vertices in the version tree are {1, 10, 12, 20, 23, 32, 42}, but there are no other vertices in the tree between 10 and 32, then the query can be for {1, 10 . . . 32, 42}. In other words, it would match versions that are equal to 1, equal to 42, or any number from 10 to 32 inclusive. These optimizations are particularly useful when many versions have been created and deleted.

The full SQL language is complex, with many powerful commands that a malicious user might use to access information beyond what is accessible via the virtual clone they are querying. In some implementations, this vulnerability can be lessened by allowing only a small subset of full SQL to be used by the user, and to make the node throw an exception when anything outside that subset is received by the user. For example, in some instances, the system may be configured to disallow queries to a table or attribute whose name is built up by string manipulation, because the user might use it to directly access people_ or version_ or versions_. The system can disallow dynamic SQL such as transact-sql statements that are compiled at run time. In some instances, these restrictions can be temporary. If a query requests the names of the attributes in a table, or the names of all tables, then the query can be modified to remove attribute version_ and table versions_, and remove the trailing underscore from other table names.

The above description assumes that the tables and attributes were created at virtual clone 1, and not subsequently modified. However, the user may want to change a schema of the database system after creating fast copies (also referred to herein as "virtual clones"), so that the different versions have different schemas. In some instances, two new tables, named tables_ and attributes_ (both with two underscores), can be defined (e.g., by a processor and stored in a memory). The tables_ table can record the names of the tables in the versions. The attributes_ table can record the attribute names in each table in each version.

In some instances, if any two virtual clones have a table with the same name X, then both can be stored in the same physical table named X_. That X_ table can contain the attributes that appear in either of the X tables. If those two X tables each contain attribute Y, but they have entries of different types, then the X_ table can contain two different attributes with different names, which are mapped to the corresponding Y attributes by the attributes_ table.

If two different tables named X, associated with two different virtual clones, have a different attribute (or set of attributes) as their virtual primary key, then the two tables can be stored separately, and the tables_ table can store what names were assigned to the separate tables.

In some instances, the system can implement a method (e.g., executed by a processor) to serialize and deserialize a single virtual clone, and to obtain the hash of a single virtual clone. Serializing can convert the tables and data visible and/or applicable to that virtual clone into a stream of bytes, which encodes the schema and the data for that virtual clone. Deserialization can turn that stream back into a complete database. In some implementations, both serializing and deserializing can be done by trusted code (e.g., executed by a processor), not by user code. In some instances, deserializing can only be done at the moment that virtual clone 1 is created. Normally, virtual clone 1 is an empty database with no tables visible to the user code. Deserializing a virtual clone regenerates the tables and data that were visible prior to serialization.

In some instances, the hash of a database can be a SHA2-384 hash of that serializing stream, assuming it is being created in some canonical order. Similarly stated, if a database is created by a certain sequence of SQL queries, then that database gives the same hash, no matter what computer executes those queries. So, for example, the system can serialize the tables in the order in which they were created, and serialize the attributes within a table in the order in which they were created. Alternatively, the system can serialize the tables in alphabetical order, and the fields within the table in alphabetical order. In other implementations, this can be optimized by caching the hashes of each table and each record.

Fast-Copies Vs Snapshots

In some implementations, a database or data structure can be copied in three different ways: by defining and/or creating an ordinary copy, or by defining and/or creating a "fast-copy" (virtual clone), or by defining and/or creating a "snapshot." The snapshot differs from the ordinary copy and the fast-copy by being immutable. The ordinary copy and fast-copy are both mutable, but differ in the amount of information stored.

In FIG. 10, initially (left tree, at (a)) the data 1 can be accessed through the "view" X. It is possible to both read and write to the data through view X. Later, a snapshot Y is created (at (b)) from X, which creates a copy 2 of the data, after which 1 becomes immutable (gray). After this, the data in 2 can be modified or read through X, and Y can read the data in 1, but not modify it. Next, at (c), a snapshot Z is created from X, which makes the mutable copy 3, and 2 becomes immutable. These snapshots can be implemented by making 2 a complete copy of 1. Alternatively, the snapshot can be implemented by making 2 only contain the changes that occur after the snapshot was created. Either way, the views Y and Z only allow reading of the data but not writing to the data.

The snapshot behavior differs from ordinary copy behavior. Ordinary copy behavior can be described with respect to FIG. 10. Initially, at (a) in FIG. 10, data 1 can be read or modified by view X. Later (b), an ordinary copy is performed, which creates the view Y, and also creates two copies, 2 and 3, of the data in 1. At that point, 1 can be deleted. After that, 2 can be read or modified by accessing 2 through X, and 3 can be read or modified by accessing 3 through Y.

This ordinary copy behavior differs from fast-copy behavior in the following way, which can be described with respect to FIG. 10. Initially (a), data 1 can be read or modified by view X. Later (b), a fast-copy operation is performed, which creates the view (also called a "fast-copy") Y. This fast-copy operation creates 2 and 3, each of which is initially empty. The data in 1 is not deleted, but it becomes immutable. If a read is immediately performed through either X or Y, it will pass through and read from 1. If a write is performed through X, the change is recorded in 2, and 1 does not change. If a write is performed through Y, the change is recorded in 3, and 1 does not change. If a read is performed on X, and the requested information is part of a change recorded in 2, then that information from 2 is returned. But if 2 does not contain any changes to that piece of data, then the read passes through to 1. Similarly, a read through Y will first check 3, and continue on to 1 only if the answer is not found in 3. The data at the moment of fast-copying is shown as 1, and is gray because it is immutable. Later still (c) the view X is fast-copied to yield Z, which results in the new 4 and 5, and in 2 becoming immutable. Finally, if the view Y is then deleted, the result is as shown at (d) of FIG. 10. At (d) of FIG. 10, there is no 3. It is deleted, because there are no longer any views that can reach 3. In FIG. 10, each of X, Y, and Z is referred to as a "view", and also referred to as a "fast-copy".

In some implementations, a form of garbage collection can eventually be performed on the data structure illustrated at (d) of FIG. 10. It is possible to merge 1 and 2 by taking the data in 1, and applying the changes in 2. It is then possible to replace 2 with this merged data, and delete 1 entirely. This garbage collection can increase the speed of future reads from X and Z. Such reads can be faster because a read from X will only have to check 4 and 2 in the worst case, rather than having to check 4, 2, and 1. Similarly, reads from Z will be faster because they will only have to check 5 and 2 in the worst case, and not 5, 2, and 1.

Fast Copyable Maps

A set of key-value pairs can be implemented in a number of ways, such as a hash table. Such a system (or processor) can add, delete, or modify the value associated with a key in O(1) time. It can also iterate through the key-value pairs in an undefined order in O(1) time per pair. Such a data structure can also implement sets, such as by having an empty string as the value in each pair. That would give O(1) time for checking set membership for an element, though operations like intersection and union would be slower.

A fast copyable map can be implemented several ways. One way (using FIG. 10 as an example), is to create an object for each circle (or virtual clone), each object containing, for example, a Java HashMap, and to create an object for each square that represents a view. Initially, reads and writes through X pass through directly to the underlying map within 1.

After the Y fast-copy is made, empty maps 2 and 3 are created, and 1 is marked as immutable. When a key-value pair is written to X, this will result in a write to 2. A read to X will first result in a read to 2. If the key is not found in 2, then a read to 1 is performed. Similarly, after Z is fast-copied, a read to Z results in a read to 5. If that fails, then it reads 2. And if that fails, then it reads 1. So a write to a given square causes a change to the adjacent circle, and a read will walk up the tree until either the key is found, or the root has been queried. In FIG. 10(b), if a write operation to X deletes a given key-value pair, then the processor can copy that key from 1 into 2 with a "value" that is a special value representing that the key-value pair does not exist. Thus future reads to X for that key-value pair will stop at 2 and report that there is no value for that key, instead of continuing on to 1 and returning the original value for that key.

Iteration on the pairs in Z can be done by iterating through the pairs in 1, then in 2, then in 5. A key-value pair in 1, for example, is used only if a query shows that its key is in neither 2 nor 5. Similarly, a key-value pair in 2, for example, is used only if a query shows that its key is not in 5. A key-value pair in 5, for example, is used without checking any other map, because 5 is a leaf of the tree of circles.

If the underlying map iterates in an arbitrary order, then this approach will also iterate in an arbitrary order. If the underlying map iterates through key-value pairs in the order in which they were last modified, then this approach will do the same. In both those cases, the time per element is O(1) for a tree of fixed depth, or O(log d), if the tree is d levels deep.

If the underlying map iterates in some other order, such as by sorting keys alphabetically, then this approach would not automatically do the same. Instead, the system can first copy the keys to a buffer, then sort them, then iterate through that buffer. That is an expensive operation, increasing the amortized time per element from O(1) to O(log n) for n items. That may still be acceptable, for some applications.

Further optimizations are possible at run time. For example, in FIG. 10(c), the map in 2 can be replaced with a new map that merges 2 and 1. Then, the new 2 would be a root of its own tree, and 1 would lose that child. When 1 no longer has any children, 1 can be deleted. Similarly, in FIG. 10(c), 5 can be replaced with a merging of 1, 2, and 5, and then become its own root. Merging two immutable tables like 1 and 2 may take some time, but it can be done in a background thread. Additionally, once it is finished, the merged map can be swapped for the old map, and the resulting trees become shallower, increasing speeds for reads and iterations.

In addition, if views are deleted, some of the circles become inaccessible and can then be deleted from memory, and any work on merging them can be aborted. This allows the system to reflect FIG. 10(d). This might be triggered by the garbage collection process in the underlying language. Alternatively, the system can implement a method for explicitly deleting a view, and maintain reference counts to determine when a circle is orphaned, at which point it is deleted.

Deletions of key-value pairs can be implemented in the root map by actually deleting the key-value pair. In maps other than the root, such a deletion can be done by changing the value to a special "deleted" object. When merging maps causes a new map to become the root, then an iteration through its key-value pairs can be done to remove the key-value pairs with the "deleted" object.

Another approach is to use a single data structure such as a trie, instead of having a tree of hash tables. For a trie, each key can be a fixed-length hash of a predefined size such as, for example 16, 32, or 64 bits. A map is represented by a binary tree, whose $n^{th}$ level represents the $n^{th}$ bit of a key, and a key is looked up by walking down the 16 (or 32 or 64) levels. The value is then stored at the leaf at the bottom level. To handle key hash collisions, the leaf stores a list of key-value pairs, though that list would be expected to be very short, on average, especially if the hash function is unknown to an attacker who might try to choose keys to cause excessive collisions. It is also possible to improve both speed and memory requirements by using an n-ary tree rather than a binary tree. For example, a 32-ary tree would have only a fifth as many levels, because $32=2^5$.

The foregoing describes a standard trie. To convert a standard trie to a fast-copyable trie, each edge in the tree can be labeled with information about which data versions it applies to. So, in FIG. 10(a) a given key-value pair can be added, and its edges can be marked with a 1. Then, after Y and Z are fast-copied, a key-value pair can be added to Z. That can involve adding more edges to the tree, which can each be marked with a 5. When a key is read from view Z, the system can start at the root, and follow edges matching the bits of the key, but only those edges that are marked with a 1, 2, or 5. Of course, this means that the graph in FIG. 10(c) is explicitly stored in memory, or at least Z can identify (e.g., by storing an association with Z) that its path to the root of the graph in FIG. 10(c) passes through circles marked 1, 2, and 5.

As more fast-copies are made, the conditional check on the edges can become more complex. For example, a query might eventually walk down the trie, following only edges that are marked with one of the numbers {1,2,5,17,32,65,82,97,99}. However, in some applications, it may be the case that the graph in FIG. 10 is expected in the long term to evolve into a long, thin chain from the root to near the bottom, which then branches out into many branches near the bottom. If the numbers in the circles are assigned in numeric order (as is the case in the figures), then instead of checking whether an edge is marked with any number in the long list {1,2,5,17,32,65,82,97,99}, it may be possible to check that the number is in the list {<80,82,97,99}, where that "<80" entry matches any number less than 80. In other words, the boolean condition need not grow in complexity over time, even if the tree in FIG. 10 grows taller over time, as long as the tree is a chain with a small tree at the bottom. To delete a key-value pair, a special "deleted" object can be used, as described above. Or, such a deletion can be done by marking edges as being deleted in certain versions. Then, a version may delete a key, which marks some edges in the trie as deleted for that version. In that case, for FIG. 10(c), an edge counts as being in the trie for view Z if the highest number of {1,2,5} that is mentioned for that edge indicates that the edge is added, rather than deleted.

Fast Copyable Arrays

Once a fast copyable map has been created, fast copyable versions of other data structures can be created. For example, a fast copyable array can be built by combining an actual array with a fast-copyable map, such as the fast-copyable map described in the previous section. Initially, when there is only one virtual clone or view, reads and writes go directly to the array. After fast-copying, writes go to the map, with each key-value pair using the array index as the key and array element as the value. A read first checks the map, and if it does not find the index, then it reads from the array. Multiple fast copy operations can result in a tree of maps. A read from one virtual clone or view will walk up the tree until it finds a map with that key, or until it reaches the root of the tree, which is the actual array.

As before, it is possible to occasionally compress the version tree. For example, in FIG. 10(c), it would be possible to create a new array reflecting 1, 2, and 5. Once the new array is created, view Z can connect to this new array, associated with an empty map. After such a compression, reads and writes will both be faster, until there are further fast-copies that grow the tree again. This process can be repeated/iterated. The same approach applies to almost any collection, not just arrays. The arbitrary collection is wrapped in an object that includes a fast copyable map, and reads and writes check the map before checking the collection. Reads and writes can become slower as multiple fast-copying operations grow the version tree, and then become faster when the tree is compressed.

Fast Copyable Filesystem

In a fast copyable filesystem, a virtual clone or view object can represent an entire filesystem. The virtual clone or view object appears, to a user, to be a separate hard drive containing a tree of directories containing files. A fast copy operation appears, to a user, to create a new hard drive with an exact copy of the original. As such, both drives can be modified independently, and changes to either will not affect the other. This can be implemented by having one actual directory containing the files from all the versions. A fast copyable database, as described herein, stores the directory tree for each version, and pointers to the files in each directory. If two versions both contain an identical file, then the system only needs one actual copy on the real hard drive, and the database can store two pointers to the actual copy. When the last pointer to a file is deleted, by deleting the file from the last view that can see the file, then the system deletes the physical file on the physical hard drive. This approach makes copying an O(1) operation. It also saves hard drive space, by only storing a single copy of duplicate files.

The system can be further optimized by partitioning files into small chunks, such as, for example, 2 KB chunks. Then the database stores a list of pointers for each file, pointing to the chunks that make up that file. In that way, if two files have the same contents for the first 2 KB, then only one copy of that chunk is physically stored, which further saves space. In this way, duplication is reduced, not only for the case of two virtual clones or views having access to the same file, but also for the case in which a single virtual clone or view represents a directory tree having identical files in two different directories.

If there is a need to quickly calculate hashes of files or entire directory subtrees, then that information can also be stored in the database. The hash of each chunk can be stored, and modified when the chunk is modified. In fact, in some instances the filename of the chunk in the underlying filesystem can be defined to be the hash of the file in hexadecimal. If there is only one pointer in existence to a given chunk X, then a modification of the chunk can include a change to the filename. When there are multiple pointers to a given chunk Y, then a modification of the chunk Y can be implemented by making a copy of the chunk, modifying the copy, then renaming the copy with its hash.

In such instances, the hash of a file can be an incremental hash, such as the hash of the concatenation of its chunks. Alternatively, the hash of a file can be defined as the sum of the hashes of (position, data) pairs for the chunks in the file.

The hash of a directory can be the sum of the hashes of the files in the directory. When a file is changed, the database can update the affected hashes, for example in a background thread. Alternatively, the hashes may not be calculated until a call to a method requests the hash. In such instances, the hash can be calculated on demand. This architecture facilitates implementation of an additional feature that is not usually present in traditional file systems. Filesystem "transactions" can be implemented in the database sense. When the system (e.g., via a processor) calls the filesystem methods to manipulate the filesystem, the system can call a method (e.g., executed by a processor) to initiate a transaction, then make multiple calls to add, remove, or modify files, then call a method (e.g., executed by a processor) to commit the transaction. In some such implementations, even if the system were powered down at any time, the filesystem would end up reflecting either all of those operations or none. This ability is generally not added to traditional filesystems because it would involve calls to a traditional database in ways that would slow down the system. The fast copyable filesystem disclosed herein, however, is already paying that computational cost for other reasons, so adding transactions actually has very little additional/incremental cost.

In some implementations, a "transaction" at the level of the filesystem can be implemented as a "transaction" at the level of the database. If there is a crash during the middle of an operation, the database recovery method (e.g., executed by a processor) can include rolling back the database to the beginning of the database transaction. The database recovery method can then do a pass through the stored chunks to see if any are no longer referenced by the database, and delete any such identified chunks. This facilitates fast recovery of a correct state, followed by a longer process (e.g., in a background thread) to recover wasted space. In this approach, chunk files are not deleted until after the commit has been sent to the database, and the database is updated.

The following includes a detailed discussion of a system for a fast copyable filesystem (e.g., accessed from Java). The user program (e.g., written in Java and executed by a processor) calls methods of the fast copyable filesystem platform (e.g., also written in Java and executed by a processor), which supports common filesystem operations, plus a few uncommon ones.

The fast copyable filesystem can allow the user code and/or process (executed by a processor) to access what appear to be volumes, directories, and files. Unlike known filesystems, fast copyable filesystems described herein can facilitate:

fast copying of a file, directory tree, or volume fast calculation of the hash of a file, directory tree, or volume serializing and deserializing a file, directory tree, or volume serializing and deserializing a subset of those (for differential copies)

an emphasis on read speed over write speed automatic de-duplication of redundant directories, files, and portions of files ability to find a file or directory given only its hash (i.e. hashes are pointers)

read-only SQL queries over a database of metadata for the filesystem

In some implementations, the filesystem implements the following:

Volume—a virtual hard drive, with/as its root directory

Directory—some metadata plus a sorted list of 0 or more (<263) files and directories File—some metadata plus a sequence of 0 or more (<263) bytes ACL (Access Control List)—a file or directory containing a group of identities Identity—a public key (stored in an ACL) representing someone who might access the filesystem Entity—a file or directory (may or may not also be an ACL)

Chunk—a sequence of 0 to CHUNK_SIZE bytes (physically stored as a Java file)

Chunk tree—a set of 1 or more chunks, arranged in a tree, to represent 1 entity

CHUNK_SIZE=4096 (or a different constant)

Metadata—information about one entity, including its name, size (calculated multiple ways), access permission, user-defined metadata, etc.

Permissions—an entity has either READ permissions for everyone, or it has a specified ACL group of those who have READ permissions. And similarly for WRITE.

In some implementations, the filesystem does NOT implement the following:

Links—this filesystem has no links, hard links, soft links, symlinks, aliases, etc. But the fast cloning allows something similar: instead of putting a link to a library in a directory, you can simply copy the whole library to your directory, and this will use as little storage as if you had used a link.

Directories . and ..—the data structures don't reflect the existence of the . or .. directories. But the interface can correctly interpret path strings from the user that contain those, such as "/here/../there"

Compressed/encrypted directories—there is no equivalent of a compressed or encrypted directory, as in Windows or OSX. However, a weaker form of compression (deduplicating chunks) is implemented universally. Moreover, if a directory tree has the readAcl flag set to true for each of its files and subdirectories, then data, filenames and directory names will be encrypted, though the topology of the directory tree and the file sizes will still be visible.

Rsync and Time Machine—in some instances differential copying and/or differential backups can be implemented on the filesystem.

Unix-style permissions—because of the nature of the fast copyable filesystem, there is no inherent concept an owner, group, or users for a file or directory. Out of read, write, and execute operations, only the first two are meaningful. Therefore, the fast copyable filesystem can allow each file or folder an optional access control list (ACL) for READ, and another ACL for WRITE. If a user's application needs anything beyond that, the user can add that as part of the user meta data. Furthermore, the exact definitions of READ and WRITE here are slightly different from those in Unix and other systems.

To a user, the filesystem appears to function as follows: A volume is like an external hard drive, with/as the root directory. A volume contains a directory tree. Each directory contains a set of directories and files. It does not contain the two directories . and .. or anything equivalent (though in some instances a user interface can simulate their existence). In some instances, the user cannot create or see hard links, soft links, symlinks, aliases, etc. The visible directory tree appears (to the user) to be a tree, rather than a DAG or a cyclic graph. The user sees the fast copyable filesystem as an ordinary filesystem, but with writes being slower than usual, and with the following operations being faster than usual:

Fast-copy a file, directory, or volume

Obtain the hash of a file or entire directory tree

Obtain the size in bytes of a file, directory, or entire directory tree

Serialize/deserialize a file or directory tree to a stream (e.g., Java stream)

Serialize/deserialize a set of chunks to a stream (e.g., Java stream)

Obtain information that makes it easy to define differential copies (like rsync)

Read-only SQL queries on a database of the metadata for files in a given volume

The system (e.g., using a processor) can perform fast cloning of files and directories, quickly obtain the hash of a file or directory, and serialize/deserialize files and directory trees. In some instances, a Distributed Hash Table (DHT) is added to the fast copyable filesystem platform and users can find and download a file or directory tree from the internet, given its hash. In such instances, that download can be efficient, transferring only the data that the user does not yet have.

The user sees the contents of a volume as being a finite tree of directories—not as being a DAG, a cyclic graph, or an infinite tree. Each of those directories can contain files and other directories. Some of the files and directories can be marked as being ACLs, and are normally hidden, but can be seen by the user when requested.

In some instances, the access permission model includes READ and WRITE, but not EXECUTE, and is built upon hierarchical ACL groups of IDs. A user has READ permissions for a file or folder if its readAll is true, or if its readAll is false and its readAcl includes that user. The WRITE permissions are defined similarly (with writeAll and writeAcl).

In the following table, if the user has the permissions listed at the start of a row, then they are allowed to perform the colored operation (Red=no rights, Yellow=read rights only, Green=read and modify rights) on the thing listed for its column. The first 4 columns are for metadata.

In some instances, the user can copy, serialize, or deserialize a file or directory tree, regardless of its permissions. At the time the user does so, the user may optionally set the write permissions for the file or for everything in the directory tree (i.e., set the writeAll and writeAcl for each of them).

An "entity" can be a file or a directory. Each entity has its own metadata and contents. The "contents" of a file are defined to be the byte sequence within that file. The contents of a directory are defined to be a sorted sequence of hashes of the files and directories within that directory. In some instances, each entity is physically stored in a chunk tree made of chunks, as defined below.

A "chunk" is a sequence of bytes that is physically stored as a single file in the underlying filesystem (e.g., provided by Java). The directories and files and ACLs in the fast copyable filesystem can be virtual. In such implementations, only chunks physically exist on the user's hard drive. While users do not see the chunks, the underlying physical filesystem operates and/or uses chunks.

A chunk has a filename in the hard drive's physical filesystem (e.g., provided by Java). In some instances, that filename can be the 256-bit hash of its contents, in lowercase hexadecimal. Thus, once a chunk is written to disk memory, the chunk is not modified, though it may be deleted. In some instances, the chunks can be stored in a single directory in the physical filesystem (e.g., provided by Java) in a memory. In other instances, a directory containing subdirectories, where the chunks are divided up according to the first few characters of their filename, can be used to store the chunks in a memory.

In some instances, a chunk is not larger than CHUNK_SIZE bytes. This global constant can be defined to be, for example, 4*1024. In other instances, the CHUNK_SIZE is between 4*1024 and 8*1024*1024 used by OSX sparse bundles.

One or more chunks can be combined to form a "chunk tree", which is used to store a single entity (file or directory). The first chunk starts with a "depth" byte, giving the depth of the tree. So 0x01 means the tree is just a single chunk, which is both a root and a leaf, 0x02 means the children of the root are all leaves, etc. The depth byte is followed by the "fixed" metadata elements for the entity, as defined in the metadata section below.

|  | readAll, readAcl | writeAll, writeAcl | name, userMetadata | All other metadata | File contents | Directory contents |
|---|---|---|---|---|---|---|
| None | Read (yellow) | Read (yellow) | (red) | Read (yellow) | (red) | Read (yellow) |
| READ | Read (yellow) | Read (yellow) | Read (yellow) | Read (yellow) | Read (yellow) | Read (yellow) |
| WRITE | Read (yellow) | Read, modify (green) | (red) | Read, modify (green) | (red) | (red) |
| READ, WRITE | Read, modify (green) | Read, modify (green) | Read, modify (green) | Read, modify (green) | Read, modify (green) | Read, modify (green) |

Read=user can read the data

Absence of Read=the user can only read an encrypted version of the data, or copy the file or directory to another location, or serialize/deserialize the data Modify=the user can change any portion of the data. For a directory, that includes changing the directory's own name and adding/deleting files/directories within that directory, but does not necessarily allow reading or modifying filenames of those within that directory.

For a small enough entity, this is followed by the rest of the metadata, then by the contents of the file or directory. (The "contents" of a directory are a sorted list of 32-byte hashes of each file and subdirectory within the directory). As an example, if the data stored is at most CHUNK_SIZE bytes, then the data fits in a single chunk, and that chunk will have a depth of one (0x01), and that chunk includes the entire chunk tree for that entity.

If the entity is too large to fit in one chunk, then the fixed metadata is followed by a sequence of hashes of the children chunks. Each of the children chunks include a sequence of hashes of their children's chunks, and so on, for the interior chunks in the tree.

The leaf chunks, when visited in breadth-first order, contain the rest of the metadata, then the contents of the file or directory. In some instances, the start of the contents is in a separate leaf chunk from the end of the metadata.

In some instances, the tree topology is uniquely defined, as follows. If the tree can fit in a single chunk, then it is fit within a single chunk. Otherwise, the system can define the tree such that if the nodes are visited in breadth-first order, the earlier nodes are as large as possible, subject to the constraint that no single leaf node can contain bytes from both metadata and contents.

In some instances, each entity (file or directory) can contain the following metadata, in the following order, and divided here into 3 categories for convenience: (fixed, variable, sensitive).

Fixed:
1. filesystem—2 bytes—filesystem version when last modified
2. entity type—1 byte:
0x00=ENTITY_FILE=a file
0x01=ENTITY_DIR=a directory
0x80=ACL_FILE=file representing an ACL group
0x81=ACL_DIR=directory representing an ACL group
3. size—8 bytes—number of bytes in this file or single directory, if there weren't any chunk deduping
4. sizeSMetadata—8 bytes—number of bytes of Sensitive metadata
5. sizeVMetadata—8 bytes—number of bytes of Variable metadata
6. sizeTree—8 bytes—only present for directories: total size of the files and directories in this directory tree if there weren't any deduping
7. readAll—1 byte—true (0x01) if everyone has READ permissions on this file or directory. Otherwise false (0x00) to limit them to an ACL.
8. writeAll—1 byte—true (0x01) if everyone has WRITE permissions on this file or directory. Otherwise false (0x00) to limit them to an ACL.

Sensitive:
9. name—the filename or directory name is a non-empty string (e.g., Java string) with String.length( )<=255. Similarly stated, at most 255 UTF-16 code units. In some instances, all Unicode characters are allowed, including the slash and colon. In some instances, there is no limit on path lengths.
10. userMetadata—a list of key-value pairs, where key and value are both strings (e.g., any legal Java String is ok), and multiple pairs can exist for the same key. This is empty unless the user calls the method to add pairs.

Variable:
11. readAcl—32 bytes—present if readAll is false—hash of an ACL file or ACL directory tree representing the ACL group of IDs that have READ permissions. The system can ensure that a directory's readAcl is the hash of an ACL file or ACL directory stored within the directory. A file's readAcl can be the hash of an ACL file or ACL directory stored in the same directory as the file.
12. writeAclHash—32 bytes—present if writeAll is false—a hash similar to the readAcl, though possibly pointing to a different entity.
13. encryptedKeys—present if readAll is false. A list of one encrypted key per public key in the ACL group. The list is stored as an 8-byte count, followed by each of the encrypted keys, in the order corresponding to the sorted list of IDs in the ACL group.

In some instances, in addition to the 4 types of size that are stored, there is a $5^{th}$ kind that is not stored, but is re-calculated (e.g., by a processor) as needed. This is a "deduped size", which is the total size of the unique chunks in this file or directory tree. This would be the size on disk memory if deduping were to occur within this file or directory tree while ignoring chunks outside the file or directory tree.

In some instances, an entity whose readAll is false can be partially encrypted (e.g., using a processor). The "sensitive" metadata is encrypted, but the "fixed" and "variable" metadata are not encrypted. The contents of a file are encrypted, but the contents of a directory are not encrypted.

In some instances, the encryption can be XTS (NIST SP800-38E) with a random key. The XTS "data unit" is each entire chunk, except for any chunk that contains both sensitive and variable metadata, for which the data unit is just the sensitive portion. The encryption of the sensitive metadata can be an XTS encryption using the random key. The encryption of the contents of a file can be a separate XTS encryption using the same key, but with its bits flipped. Thus, if the sensitive metadata is modified by extending its length, part of the metadata can be reencrypted, but the contents are not reencrypted because the contents start at the beginning of a new chunk.

The random key can then be encrypted (e.g., using a processor) with each of the public keys in the sorted list of public keys from the ACL group, and the results are stored as encryptedKeys. For an ACL file, the ACL group is a sorted list of the IDs in the ACL file. For an ACL directory, the ACL group is a sorted list of the IDs in the ACL files within the directory tree whose root is that directory.

In some instances, when the ACL ID group changes by adding an ID, then a new encrypted key can be added to the list of encrypted keys. When an ID is deleted, then a new random key is chosen, the list of encrypted keys is recalculated, and both the sensitive metadata and contents are decrypted with the old key and reencrypted with the new key. Write caching can be used to optimize this process, for example by allowing several changes to the ACL to be made in rapid succession, then conducting the reencryption once for the changes.

User metadata can be a sorted list of (key, value) pairs. Each key is a string (e.g., Java String), and each key is unique. Each value can be a Java List<byte[ ]>, with the order in the list being the order in which various values were added by the user. The user can add and delete values. When there are no values left, the pair is deleted.

These keys can be any String the user wants. In some implementations, an empty string is permissible, but null is not. Examples include "creatorApp" or "openWith", or "source", with the value being a hash of a directory tree (where the first two cases have a single executable in the top directory). Other examples include "thumbnail" associated with a small jpg, or "createdDate" or "modifiedDate" associated with a time and date, or "pinned" associated with the ID of each user that wants this file to continue existing. The fast copyable filesystem platform may use some or all of these, depending upon what keys the user provides.

In some implementations, the size field can be a signed 64-bit integer giving the total size in bytes of every chunk in the chunk tree for this entity. If the same chunk appears twice in the chunk tree, then it is counted twice. Accordingly, the size field is the amount of physical disk memory space the chunk tree for the entity would take up if there were no deduping.

The treeSize field is present for a directory, but not for a file or ACL. The treeSize field can be the sum of the size for this directory, plus the size of each file in this directory, plus the treeSize of each subdirectory in this directory. This is the amount of space this directory tree would take up in memory, if there were no deduping.

In some instances, the fast copyable filesystem platform can also keep track of how many bytes each user is responsible for. For a file, users that pin the file can be charged "size" bytes. For a directory, users that pin the directory can be charged "treeSize" bytes. When a file has no one pinning the file, then an app may decide to delete the file to save memory space. When a directory tree contains no pinned files or directories, then that entire directory tree can be deleted (e.g., using a processor) to save memory space. This means that users are charged for the space they are causing to be used, ignoring the deduping that happens when two users pin the same thing. The fast copyable filesystem platform can ensure that the fast copyable filesystem platform doesn't pin both a directory and an entity inside its directory tree.

The above described filesystem has fast reads and slow writes. It also has a fast hash calculation. If the user requests the hash of a file or directory, the answer is simply the physical filename of the root chunk of its chunk tree. This can be stored in the relational database along with the metadata, and so can be returned quickly. In some instances, the SHAZ-256 hash can be used throughout the filesystem. In other instances, the SHA3-256 hash (or any other suitable hash) can be used throughout the filesystem.

Although in some implementations the filesystem has slow writes, it does have the benefit that whenever two files are created that happen to have the same bytes in one of their chunks, then only a single copy of that chunk is physically stored in the memory, thereby reducing the consumption of storage space and making it possible for a user to make copies that they wouldn't otherwise be able to make. For example, instead of making a link in a directory to a library, the user (e.g., using a processor) can simply copy the entire library into that directory, and that virtual copy will use less storage than an actual copy.

In some instances, if the user copies a file or directory (even from one volume to another), then physically the system (e.g., using a processor) only copies pointers to the entity's root chunk, not the actual chunks themselves. Here, "pointer" can mean a hash of the entity, which is stored in the metadata of other entities, and in the database. If directories /X/ and /Y/ both contain file A with filename N, and the user modifies /X/N, then the system will make B as a copy of A, make the requested modification to B, change the pointer from /X/N to point to B, and leave the original /Y/N still pointing to A.

Initially, the above can be coded as described. That means that each write can involve recalculating hashes and creating new chunks, which are stored in new physical files. In some instances, the system can be made faster by caching writes in RAM, and only writing them to disk memory after a delay, so that multiple writes to the same file will coalesce into a single step of hashing and chunk creation. Additionally, in some such instances, multiple files changing in a single directory can result in a single change to that directory and those above that directory in the directory tree. In that case, reads are preceded by querying the database to see if there are currently any cached writes that would affect the value read.

In some implementations, the chunks that make up a file are not viewable by a user—rather, the user just sees the file itself. In other implementations, however, the system can be configured to perform several methods (e.g., executed in a processor) related to chunk hashes. The system can allow the user to find the hash of the root chunk of a file or directory. This is defined to be the hash of that file or directory, and can be used throughout the system as a pointer to that file or directory.

In some implementations, the user can call a method (e.g., executed by a processor) to serialize a file or directory tree or list of chunks (referenced by their hashes) to a stream of bytes. Alternatively or in addition, in some implementations, the user can call a method (e.g., executed by a processor) to deserialize such a stream, and create a new file or directory within a directory chosen by the user. Deserialized chunks can be transparently/invisibly added to the filesystem, and subsequently converted to visible files and directory trees, for example when the entire file or directory has its chunks present. When the user indicates that they are done deserializing, the system can garbage collect any chunks that weren't used. Such garbage collection can also occur periodically (e.g., once a minute, once an hour, once a day, etc.), sporadically, or at any other predetermined time or time interval.

If the user calls the serialization method (e.g., executed by a processor) for a file, then the processor can serialize the entire file (i.e., the entire chunk tree, in depth-first order, pre-order traversal), and output the contents of each chunk. In some implementations, none of the chunk names are serialized. If a user requests to serialize a directory tree, the processor can serialize the entire directory tree (i.e., the chunk trees of the subdirectories and files in the directory tree), doing a depth first search of its directories. In both cases, serialization works recursively, serializing the root chunk, then each of the hashes it contains, and so on. The system stores an indication of and/or remembers the chunks serialized so far, so the processor doesn't serialize the same chunk twice.

On deserialization, the system can calculate the hash of each chunk from its contents (e.g., to determine the filename for storing that chunk), and after the process is complete, can discard any chunks that didn't end up being a valid part of a complete entity.

If the system serializes a set of chunks (by passing in a set of their hashes), then the system serializes just the bytes in those chunks, in the order given. The method returns a set of chunks referenced by the set of chunks. If the user deserializes such a set of chunks, then the chunks are added to the system, and the system returns a set of the chunks referenced by the set of chunks that are not already present on the user's computer.

The system (or processor) can also execute a method for serializing the non-leaf chunks of a file or directory tree. On deserialization, the system returns to the user the hashes of the leaf chunks that are not already present on the user's system. So, for example, Alice (using the processor at compute device Alice) could serialize to Bob (to the processor at compute device Bob) the leaves then the non-leaves, and Bob would learn as early as possible exactly how many bytes are going to be sent from Alice to Bob. Or, in an alternative system, Alice could serialize to Bob the non-leaf chunks, then Bob could notify Alice of the hashes of the leaves Bob has not yet received, then Alice could serialize just the leaves Bob has not yet received.

One benefit of chunk set serialization is that it allows Alice to efficiently send Bob a directory tree, which happens to contain many files that Bob already has. Alice first serializes just the hash of the root chunk, and sends it. Bob deserializes the hash of the root chunk, into a directory of his choosing. If that method (e.g., executed by a processor at Bob) call returns a non-empty list of hashes, then he sends that list to Alice, and she sends back to a serialization of those chunks. Bob then deserializes the chunks, and sends to Alice the list of chunks they reference that he still doesn't have. This continues until Bob has a copy of the entire directory tree. In this manner, Alice transfers an entire directory tree, without sending a chunk that Bob already has.

In some instances, during deserialization, the relational database can keep track of and/or store the metadata of the new chunks, files, and directories. In some instances, at any given time, the user can see a file or directory as existing in the filesystem once all of its chunks (and its subdirectories' chunks, recursively) have been received.

In some instances, a deserializeDone method executed by the system (or processor) indicates that the user is done deserializing. At that point, the system can discard any chunks that didn't end up as part of a valid entity. At the time of deserialization, the user can request that the new file or directory tree be set to have a given WRITE permission. This can also be done when copying.

The fast copyable filesystem platform can periodically perform an operation including the following steps:
  take a snapshot of the filesystem database and of the current list of events since the last signed state
  serialize that snapshot to disk memory
  change a byte on the disk memory to indicate that these new files are now the official backup After a crash (or even after a normal shutdown and reboot), the fast copyable filesystem platform can perform the following:
  load the latest signed state
  deserialize the events from the latest official backup
  deserialize the database from the latest official backup
  start running the normal fast copyable filesystem platform, with syncing, etc.

In addition, in some implementations, a background thread can be executed for chunk garbage collection. The garbage collection thread can periodically go through the chunk directories, and check those filenames against the database. If the garbage collection thread identifies a chunk that is not referenced by any of the current volumes, and is not referenced by the latest signed state, then the garbage collection thread should delete that chunk from the hard drive. In addition, in some instances, the garbage collection thread can periodically read in the existing chunks and check that each one has a filename matching the hash of its contents. If they do not match, the chunk can be deleted from the hard drive. If the chunk is still needed (according to the database) then steps can be taken to re-download the chunk from the DHT, or from another member.

Some embodiments and/or methods described herein can be performed by software (executed on hardware), hardware, or a combination thereof. Hardware may include, for example, a general-purpose processor, a field programmable gate array (FPGA), and/or an application specific integrated circuit (ASIC). Software (executed on hardware) can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The invention claimed is:

1. An apparatus, comprising:
  a processor; and
  a memory in electronic communication with the processor, the memory storing a database table,
  the processor including instructions executable to cause the processor to:
    generate a hierarchical tree including representations of a plurality of virtual clones of the database table, the plurality of virtual clones including a first virtual clone, a second virtual clone that is a child virtual clone of the first virtual clone, and a third virtual clone that is a successor virtual clone of the second virtual clone;
    modify a successor relationship within the hierarchical tree and associated with the third virtual clone, in response to an instruction to delete the second virtual clone;
    delete the second virtual clone, in response to the instruction to delete the second virtual clone; and
    delete, in response to the instruction to delete the second virtual clone, the first virtual clone from the plurality of virtual clones when the first virtual clone does not have a child virtual clone after the deletion of the second virtual clone.

2. The apparatus of claim 1, wherein the plurality of virtual clones further includes a fourth virtual clone that is a successor virtual clone of the first virtual clone, the instructions are further executable to cause the processor to modify a successor relationship associated with the fourth virtual clone, in response to: the instruction to delete the second virtual clone; and a determination that the fourth virtual clone is a sole descendant of the first virtual clone after deletion of the second virtual clone.

3. The apparatus of claim 1, wherein the instructions are further executable to cause the processor to:
  automatically identify a fourth virtual clone from the plurality of virtual clones and that does not have a child virtual clone; and
  delete the fourth virtual clone based on the automatic identification.

4. The apparatus of claim 1, wherein the instructions are further executable to cause the processor to:
  automatically identify a fourth virtual clone from the plurality of virtual clones and that does not have a child virtual clone; and in response to the automatically identifying:
modify a successor relationship associated with a fifth virtual clone from the plurality of virtual clones; and
delete the fourth virtual clone.

5. The apparatus of claim 1, wherein the instructions are further executable to cause the processor to trigger a deletion of at least one further virtual clone from the plurality of virtual clones in response to modifying the successor relationship associated with the third virtual clone.

6. The apparatus of claim 1, wherein the successor relationship is a first successor relationship, the memory further storing a plurality of successor relationships including the first successor relationship.

7. The apparatus of claim 1, wherein the database table includes a plurality of records and each record from the plurality of records includes a compound key including a version identifier associated with a virtual clone from the plurality of virtual clones.

8. A method, comprising:
generating a hierarchical tree including representations of a plurality of virtual clones of a database table, the database table including a plurality of records, each record from the plurality of records including a compound key having a version identifier associated with a virtual clone from the plurality of virtual clones, the plurality of virtual clones including a first virtual clone, a second virtual clone that is a child virtual clone of the first virtual clone, and a third virtual clone that is a successor virtual clone of the second virtual clone;
receiving an instruction to delete the second virtual clone; and
modifying a successor relationship within the hierarchical tree and associated with the third virtual clone, in response to receiving the instruction to delete the second virtual clone.

9. The method of claim 8, further comprising:
deleting the second virtual clone, in response to the instruction to delete the second virtual clone; and
deleting, in response to the instruction to delete the second virtual clone, the first virtual clone from the plurality of virtual clones when the first virtual clone does not have a child virtual clone after the deletion of the second virtual clone.

10. The method of claim 8, further comprising:
automatically identifying a fourth virtual clone from the plurality of virtual clones and that does not have a child virtual clone; and
in response to the automatically identifying:
modifying a successor relationship associated with a fifth virtual clone from the plurality of virtual clones; and
deleting the fourth virtual clone.

11. The method of claim 9, further comprising triggering a deletion of at least one further virtual clone from the plurality of virtual clones in response to modifying the successor relationship associated with the third virtual clone.

12. The method of claim 9, wherein the plurality of virtual clones further includes a fourth virtual clone that is a successor virtual clone of the first virtual clone, the method further comprising:
modifying a successor relationship associated with the fourth virtual clone, in response to: the instruction to delete the second virtual clone; and a determination that the fourth virtual clone is a sole descendant of the first virtual clone after deletion of the second virtual clone.

13. The method of claim 8, further comprising:
automatically identifying a fourth virtual clone from the plurality of virtual clones and that does not have a child virtual clone; and
deleting the fourth virtual clone based on the automatic identification.

14. A non-transitory, tangible processor-readable medium comprising processor-executable instructions for:
generating a hierarchical tree including representations of a plurality of virtual clones of a database table, the plurality of virtual clones including a first virtual clone, a second virtual clone that is a child virtual clone of the first virtual clone, and a third virtual clone that is a successor virtual clone of the second virtual clone;
modifying a successor relationship within the hierarchical tree and associated with the third virtual clone, in response to an instruction to delete the second virtual clone; and
deleting the second virtual clone, in response to the instruction to delete the second virtual clone.

15. The non-transitory, tangible processor-readable medium of claim 14, further comprising processor-executable instructions for:
deleting, in response to the instruction to delete the second virtual clone, the first virtual clone from the plurality of virtual clones when the first virtual clone does not have a child virtual clone after the deletion of the second virtual clone.

16. The non-transitory, tangible processor-readable medium of claim 14, wherein the plurality of virtual clones further includes a fourth virtual clone that is a successor virtual clone of the first virtual clone, the tangible processor-readable medium further comprising processor-executable instructions for:
modifying a successor relationship associated with the fourth virtual clone, in response to: the instruction to delete the second virtual clone; and a determination that the fourth virtual clone is a sole descendant of the first virtual clone after deletion of the second virtual clone.

17. The non-transitory, tangible processor-readable medium of claim 14, further comprising processor-executable instructions for:
automatically identifying a fourth virtual clone from the plurality of virtual clones and that does not have a child virtual clone; and
deleting the fourth virtual clone based on the automatic identification.

18. The non-transitory, tangible processor-readable medium of claim 14, further comprising processor-executable instructions for:
automatically identifying a fourth virtual clone from the plurality of virtual clones and that does not have a child virtual clone; and
in response to the automatically identifying:
modifying a successor relationship associated with a fifth virtual clone from the plurality of virtual clones; and
deleting the fourth virtual clone.

19. The non-transitory, tangible processor-readable medium of claim 14, further comprising processor-executable instructions for triggering a deletion of at least one further virtual clone from the plurality of virtual clones in response to modifying the successor relationship associated with the third virtual clone.

20. The non-transitory, tangible processor-readable medium of claim 14, wherein the successor relationship is a first successor relationship, the tangible processor-readable medium further comprising processor-executable instructions for storing a plurality of successor relationships including the first successor relationship.

21. The non-transitory, tangible processor-readable medium of claim 14, wherein the database table includes a plurality of records and each record from the plurality of records includes a compound key including a version identifier associated with a virtual clone from the plurality of virtual clones.

* * * * *